US011509072B1

United States Patent
Abdelmonem et al.

(10) Patent No.: US 11,509,072 B1
(45) Date of Patent: Nov. 22, 2022

(54) RADIO FREQUENCY (RF) POLARIZATION ROTATION DEVICES AND SYSTEMS FOR INTERFERENCE MITIGATION

(71) Applicant: ISCO International, LLC, Schaumburg, IL (US)

(72) Inventors: Amr Abdelmonem, Northbrook, IL (US); Anthony Teillet, Trabuco Canyon, CA (US)

(73) Assignee: ISCO International, LLC, Schaumburg, IL (US)

( * ) Notice: Subject to any disclaimer, the term of this patent is extended or adjusted under 35 U.S.C. 154(b) by 0 days.

(21) Appl. No.: 17/825,550

(22) Filed: May 26, 2022

(51) Int. Cl.
*H01Q 21/26* (2006.01)
*H01Q 21/24* (2006.01)
*H04B 1/12* (2006.01)
*H04B 1/10* (2006.01)

(52) U.S. Cl.
CPC .......... *H01Q 21/26* (2013.01); *H01Q 21/245* (2013.01); *H04B 1/1027* (2013.01); *H04B 1/123* (2013.01)

(58) Field of Classification Search
CPC ........ H04B 1/02; H04B 1/1027; H01B 1/123; H01Q 21/26; H01Q 21/243; H01Q 21/245
See application file for complete search history.

(56) References Cited

U.S. PATENT DOCUMENTS

| | | | |
|---|---|---|---|
| 5,940,044 A | 8/1999 | Smith | |
| 6,072,439 A | 6/2000 | Ippolito et al. | |
| 6,310,585 B1 | 10/2001 | Marino | |
| 6,704,557 B1 | 3/2004 | Krishnamurthy et al. | |
| 6,960,650 B2 | 11/2005 | Pulst et al. | |
| 6,998,908 B1 | 2/2006 | Sternowski | |
| 7,023,398 B2 | 4/2006 | Gottl et al. | |
| 8,134,511 B2 | 3/2012 | Koh et al. | |
| 8,976,072 B2 | 3/2015 | Lenormand et al. | |
| 9,271,185 B2 | 2/2016 | Abdelmonem et al. | |
| 9,313,680 B2 | 4/2016 | Galeev et al. | |
| 9,800,355 B1 | 10/2017 | Lee et al. | |
| 9,806,413 B1 | 10/2017 | Chukka et al. | |

(Continued)

FOREIGN PATENT DOCUMENTS

| | | |
|---|---|---|
| CN | 1864302 A | 11/2006 |
| CN | 202523820 U | 11/2012 |

(Continued)

OTHER PUBLICATIONS

Amendment Under Article 34/Response to Written Opinion for PCT/US2021/046881 filed Jun. 16, 2022, 16 pages.

(Continued)

*Primary Examiner* — Thanh C Le

(74) *Attorney, Agent, or Firm* — Guntin & Gust, PLC; Kenneth Kwan

(57) ABSTRACT

Aspects of the subject disclosure may include, for example, receiving, by a radio frequency (RF) mechanical device, signals relating to one or more crossed-dipole radiating elements of an antenna system, performing, by the RF mechanical device, polarization rotation of the signals to derive output signals having polarizations that are rotated in a manner that mimics physical rotation of the one or more crossed-dipole radiating elements, and providing, by the RF mechanical device, the output signals to enable avoidance of interference. Other embodiments are disclosed.

20 Claims, 47 Drawing Sheets

(56) References Cited

U.S. PATENT DOCUMENTS

| | | |
|---|---|---|
| 10,468,781 B1 | 11/2019 | Paulsen et al. |
| 10,581,163 B2 | 3/2020 | Schmutzler et al. |
| 10,652,835 B2 | 5/2020 | Tacconi et al. |
| 10,777,894 B2 | 9/2020 | Mcmichael |
| 10,862,518 B1 | 12/2020 | Labadie et al. |
| 11,289,799 B2 | 3/2022 | Everest et al. |
| 2004/0082335 A1 | 4/2004 | Hirayama et al. |
| 2006/0014491 A1 | 1/2006 | Cleveland et al. |
| 2007/0020224 A1 | 1/2007 | Vetter et al. |
| 2007/0080868 A1 | 4/2007 | Hwang et al. |
| 2008/0280571 A1 | 11/2008 | Rofougaran et al. |
| 2009/0040127 A1 | 2/2009 | Williams |
| 2011/0057849 A1 | 3/2011 | Naym et al. |
| 2011/0059694 A1 | 3/2011 | Audic |
| 2011/0150118 A1 | 6/2011 | Asplund et al. |
| 2012/0063529 A1 | 3/2012 | Choi et al. |
| 2013/0157601 A1 | 6/2013 | O'Keeffee et al. |
| 2014/0022125 A1 | 1/2014 | Zhu et al. |
| 2014/0191924 A1* | 7/2014 | Payne .............. H01Q 1/526 343/905 |
| 2014/0236546 A1 | 8/2014 | Payne |
| 2014/0274094 A1 | 9/2014 | Abdelmonem et al. |
| 2015/0092621 A1 | 4/2015 | Jalloul et al. |
| 2016/0088572 A1 | 3/2016 | Bi et al. |
| 2017/0077612 A1 | 3/2017 | Aryanfar |
| 2017/0353929 A1 | 12/2017 | Tacconi et al. |
| 2018/0083368 A1* | 3/2018 | Teillet .............. H01Q 21/062 |
| 2019/0007078 A1 | 1/2019 | Tsui et al. |
| 2019/0103309 A1 | 4/2019 | Lin |
| 2019/0222329 A1 | 7/2019 | Abdelmonem |
| 2019/0273326 A1 | 9/2019 | Sanford et al. |
| 2019/0334636 A1* | 10/2019 | Li .............. H01P 1/184 |
| 2019/0372237 A1* | 12/2019 | Yman .............. H01P 5/026 |
| 2020/0136247 A1* | 4/2020 | Ai .............. H01Q 21/28 |
| 2020/0185825 A1 | 6/2020 | Palud |
| 2021/0320413 A1* | 10/2021 | Wu .............. H01Q 15/14 |
| 2021/0344122 A1 | 11/2021 | Kaistha et al. |
| 2021/0359406 A1* | 11/2021 | Yang .............. H01Q 19/10 |
| 2022/0069463 A1 | 3/2022 | Abdelmonem et al. |
| 2022/0069853 A1 | 3/2022 | Abdelmonem et al. |
| 2022/0069855 A1 | 3/2022 | Abdelmonem et al. |
| 2022/0069865 A1 | 3/2022 | Abdelmonem et al. |
| 2022/0069897 A1 | 3/2022 | Abdelmonem et al. |
| 2022/0069898 A1* | 3/2022 | Abdelmonem ...... H04B 1/0475 |
| 2022/0069927 A1 | 3/2022 | Abdelmonem et al. |

FOREIGN PATENT DOCUMENTS

| | | |
|---|---|---|
| CN | 108631055 A | 10/2018 |
| CN | 209910515 U | 1/2020 |
| CN | 209963261 U | 1/2020 |
| CN | 112103653 A | 12/2020 |
| CN | 213637748 U | 7/2021 |
| CN | 113922101 A | 1/2022 |
| WO | 2009120237 A1 | 10/2009 |
| WO | 2020064914 A1 | 4/2020 |

OTHER PUBLICATIONS

Amendment Under Article 34 / Response to Written Opinion filed for PCT/US2021/046807 dated Jun. 15, 22, 19 pages.

PCT/US2021/046804, Amendment under Article 34 and response to Written Opinion, filed May 31, 2022, 19 pages.

"Amendment Under Article 34 / Response to Written Opinion", for application No. PCT/US2021/046806, dated Feb. 8, 2022, 8 pages.

"International Preliminary Report on Patentability", PCT/US2021/046872, dated May 4, 2022, 12 pages.

"International Search Report and Written Opinion", for Application No. PCT/US2021/046875, dated Nov. 23, 2021, 10 pages.

"International Search Report and Written Opinion", for Application No. PCT/US2021/46881, dated Dec. 3, 2021, 12 pages.

"International Search Report and Written Opinion", for Application No. PCT/US2021/046872, dated Nov. 23, 2021, 13 pages.

"International Search Report and Written Opinion", for Application No. PCT/US2021/046804, dated Dec. 3, 2021, 14 pages.

"International Search Report and Written Opinion", for Application No. PCT/US2021/46805, dated Nov. 8, 2021, 15 pages.

"International Search Report and Written Opinion", for Application No. PCT/US2021/046807, dated Dec. 3, 2021, 15 pages.

"International Search Report and Written Opinion", for Application No. PCT/US2021/046806, dated Nov. 8, 2021, 9 pages.

"Notification of Transmittal of International Preliminary Report on Patentability", PCT/US2021/046875, dated May 2, 2022, 16 pages.

"Notification of Transmittal of International Preliminary Report on Patentability", PCT/US2021/046806 dated May 4, 2022, dated May 4, 2022, 16 pages.

"PCT/US2021/046872—Article 34 Amendment", dated Feb. 10, 2022, 8 pages.

"PCT/US2021/046875—Article 34 Amendments", dated Apr. 13, 2022, 8 pages.

* cited by examiner

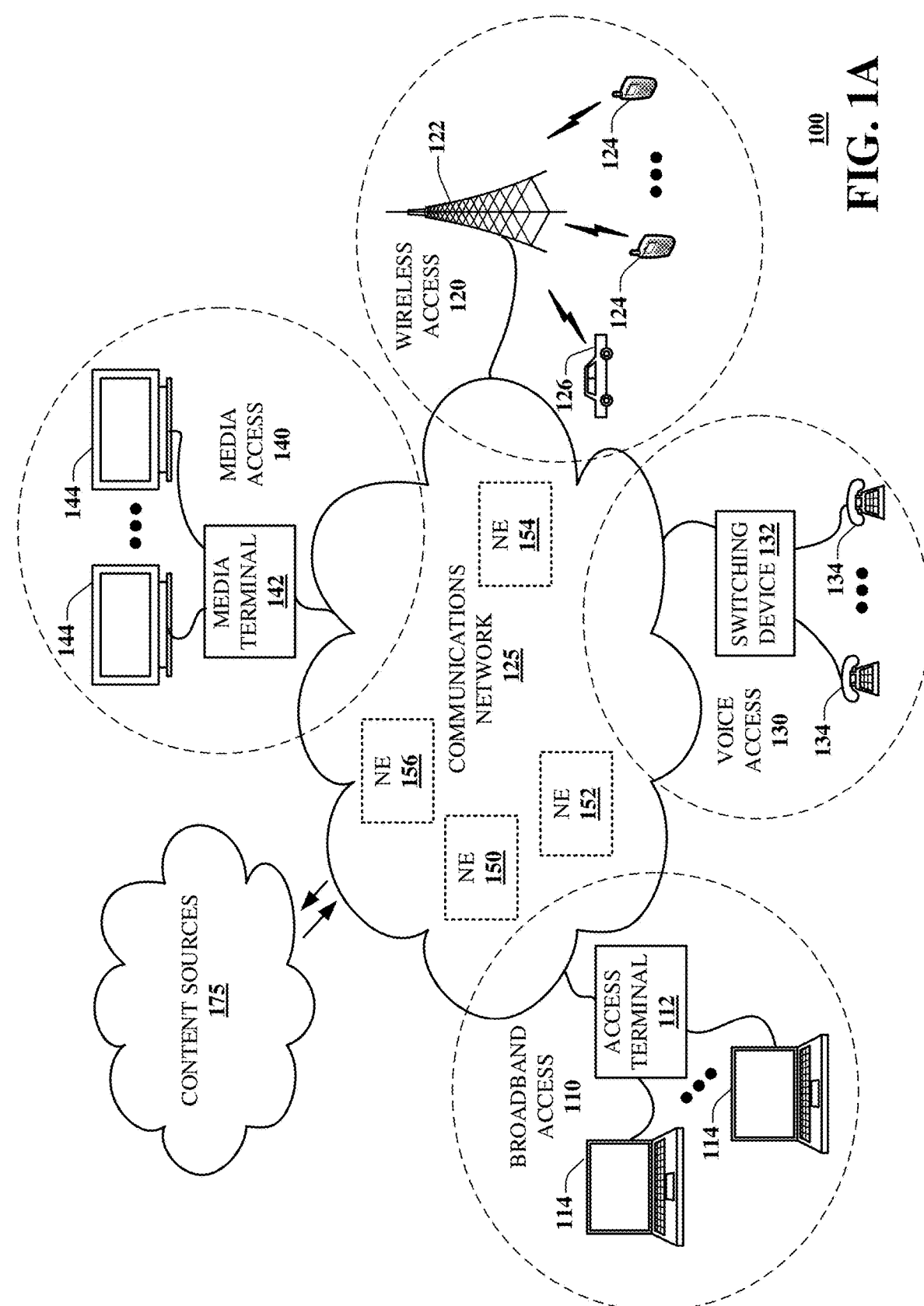

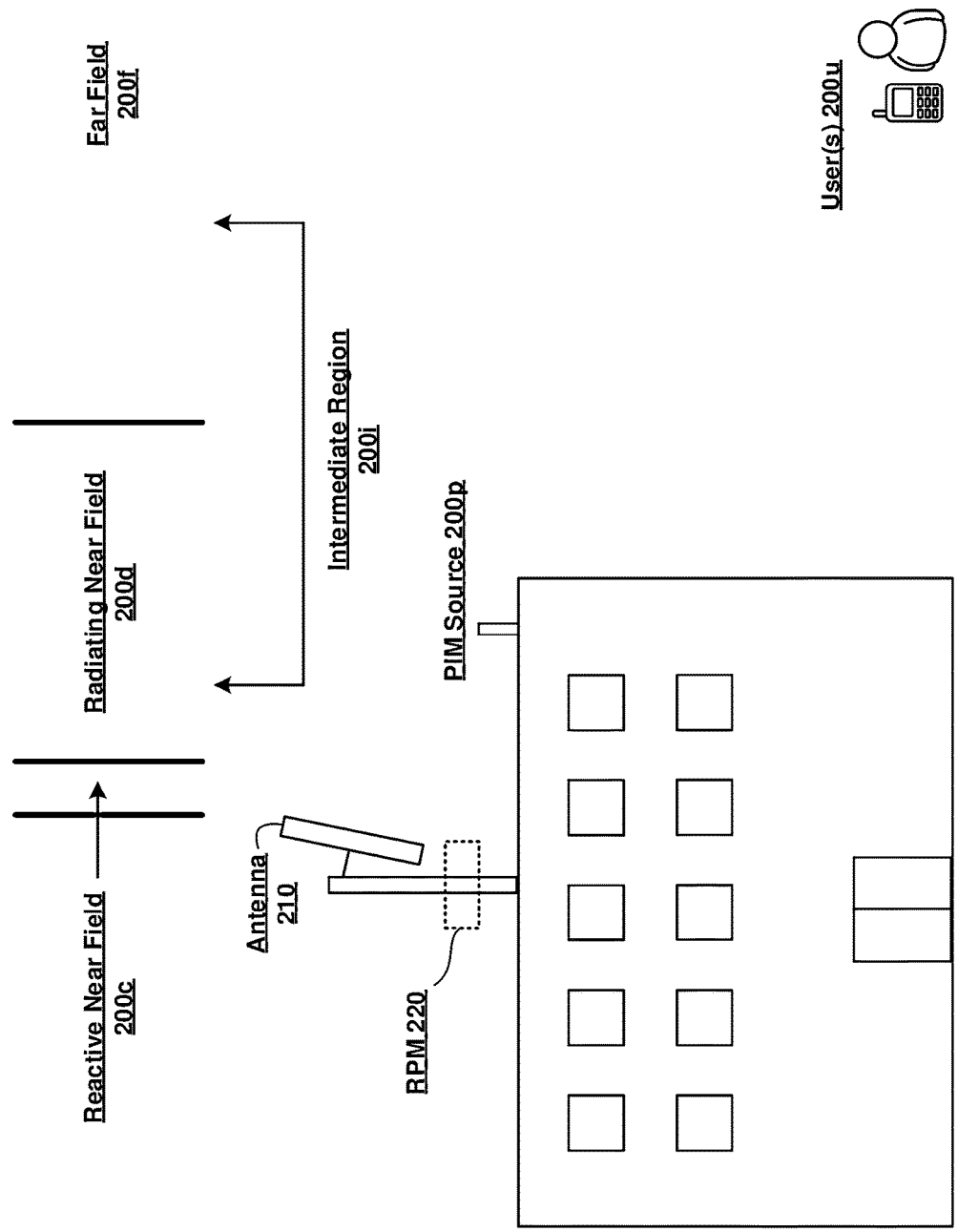

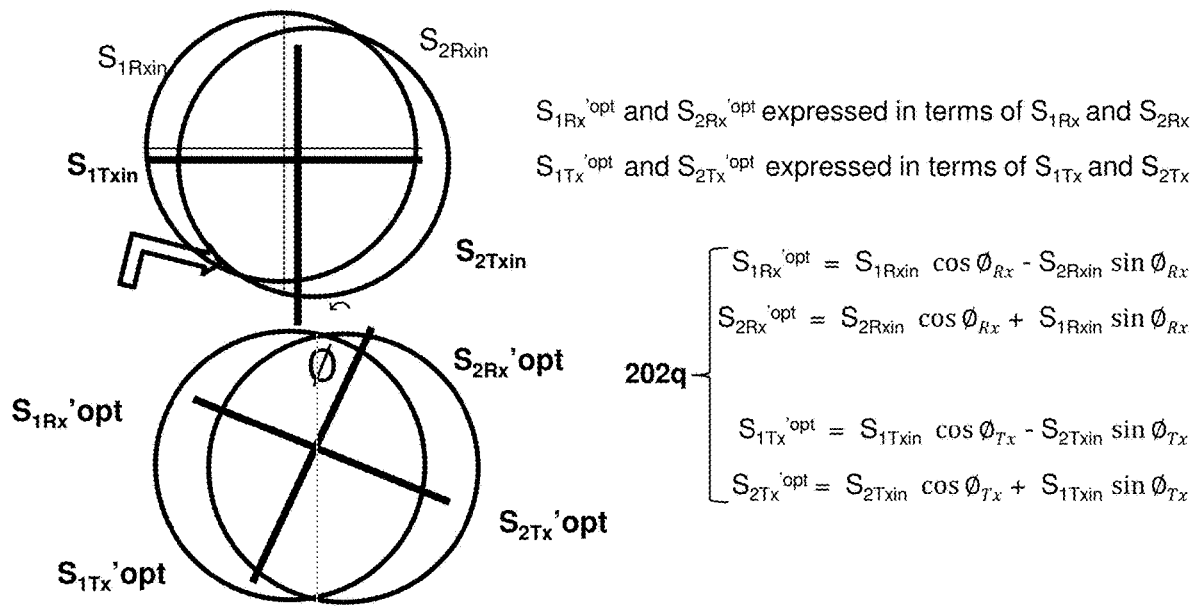

$S_{1Rx}{}^{'opt}$ and $S_{2Rx}{}^{'opt}$ expressed in terms of $S_{1Rx}$ and $S_{2Rx}$
$S_{1Tx}{}^{'opt}$ and $S_{2Tx}{}^{'opt}$ expressed in terms of $S_{1Tx}$ and $S_{2Tx}$ 202q $\begin{cases} S_{1Rx}{}^{'opt} = S_{1Rxin} \cos\emptyset_{Rx} - S_{2Rxin} \sin\emptyset_{Rx} \\ S_{2Rx}{}^{'opt} = S_{2Rxin} \cos\emptyset_{Rx} + S_{1Rxin} \sin\emptyset_{Rx} \\ \\ S_{1Tx}{}^{'opt} = S_{1Txin} \cos\emptyset_{Tx} - S_{2Txin} \sin\emptyset_{Tx} \\ S_{2Tx}{}^{'opt} = S_{2Txin} \cos\emptyset_{Tx} + S_{1Txin} \sin\emptyset_{Tx} \end{cases}$

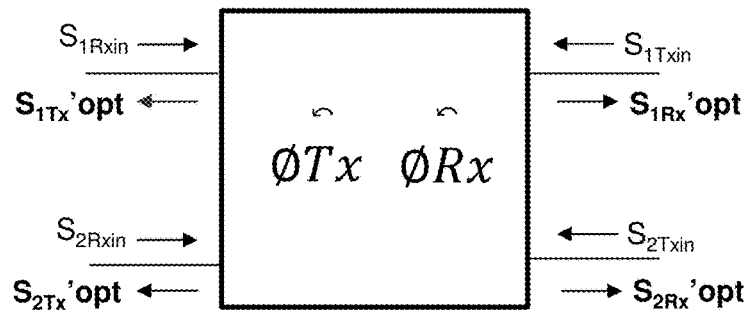

FIG. 2C

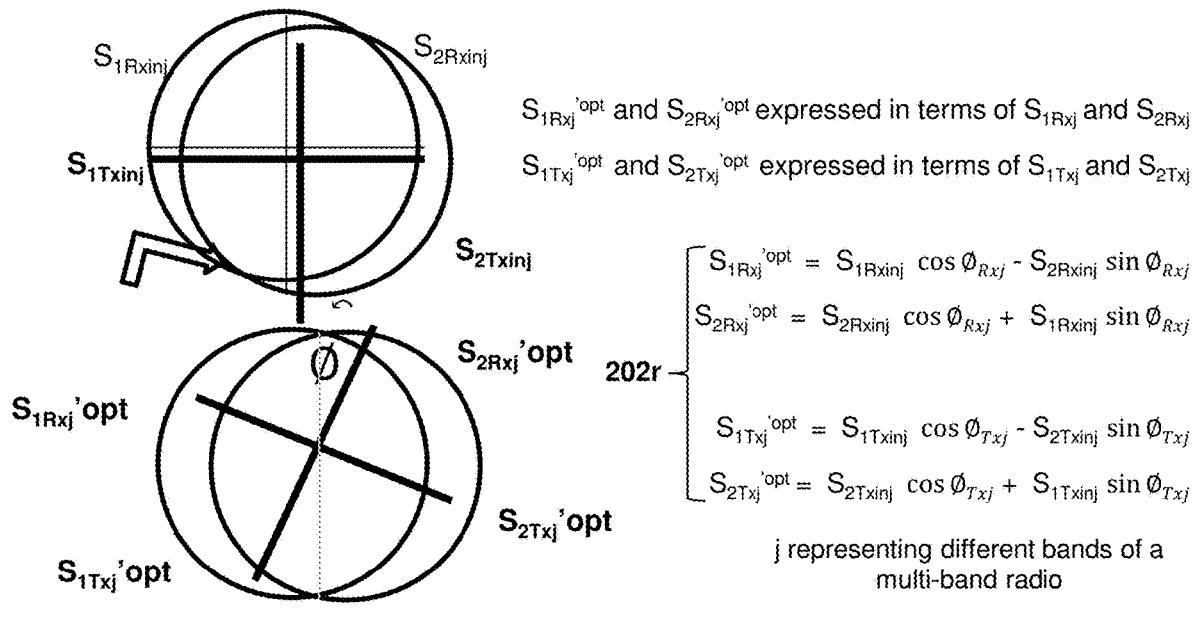
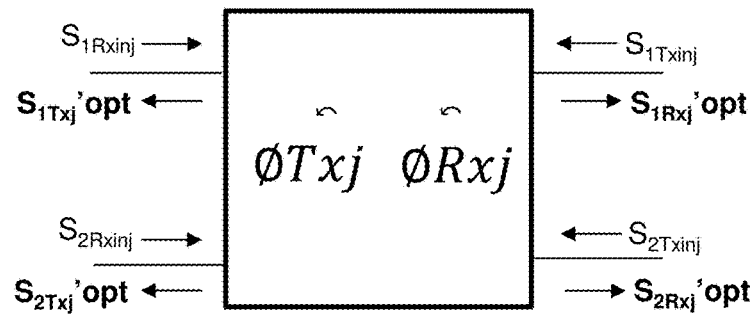
FIG. 2D

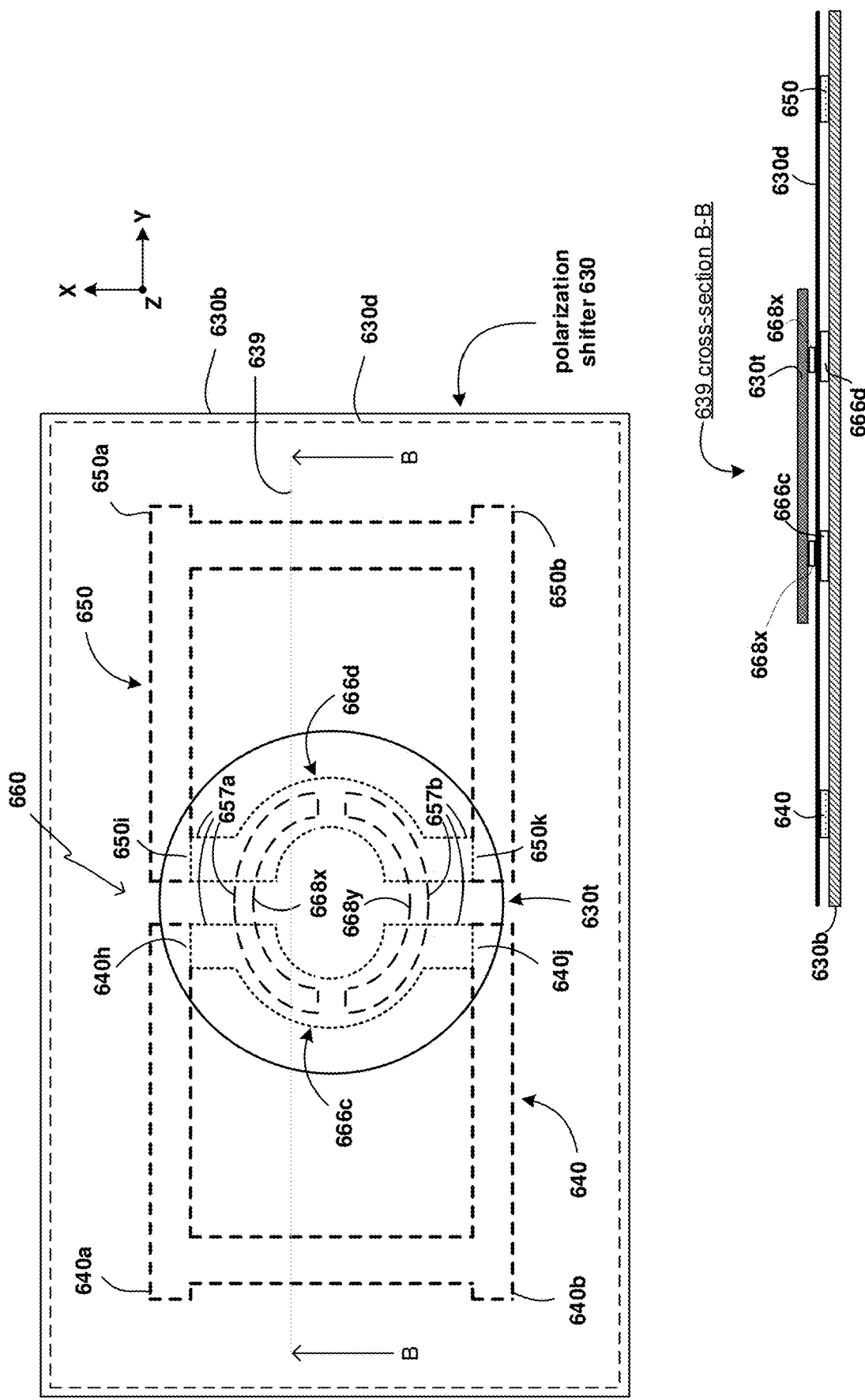

| Reading | RF Det Voltage | | | | |
|---|---|---|---|---|---|
| | | | | | ↓ 920a ↓ 920b ↓ 920c |
| 1 | 2.6 | 2.5 | 2.4 | 2.6 | 2.7 |
| 2 | 1.2 | 1.0 | 1.3 | 1.1 | 1.3 |
| 3 | 2.3 | 2.2 | 2.4 | 2.4 | 2.4 |

| Position | Freq A | | ABS | Average Power | | ABS | Freq B | | ABS |
|---|---|---|---|---|---|---|---|---|---|
| 1 | 2.56 | 1.18 | 0.77 | 2.34 | 2.6 | | 2.5 | 2.4 | 0.1 |
| 2 | 0.5 | 0.5 | 0.9 | 0.7 | 0.6 | | 0.5 | 0.7 | 0.95 |
| 3 | 2.3 | 2.2 | 0.1 | 2.4 | 2.3 | | 2.2 | 2.4 | 0.1 |
| 4 | 2.4 | 2.5 | 0.05 | 2.5 | 2.4 | | 2.5 | 2.5 | 0.05 |
| 5 | 2.6 | 2.7 | 0.25 | 2.9 | 2.6 | | 2.7 | 2.9 | 0.25 |
| 6 | 2.6 | 2.5 | 0.1 | 2.4 | 2.6 | | 2.5 | 2.4 | 0.1 |
| 7 | 2.0 | 2.2 | 0.3 | 2.1 | 2.0 | | 2.2 | 2.1 | 0.3 |
| 8 | 2.6 | 2.7 | 0.25 | 2.9 | 2.6 | | 2.7 | 2.9 | 0.25 |
| 9 | 2.5 | 2.6 | 0.1 | 2.6 | 2.5 | | 2.6 | 2.6 | 0.1 |
| 10 | 2.4 | 2.7 | 0.35 | 2.9 | 2.5 | | 2.7 | 2.9 | 0.35 |
| 11 | 2.5 | 2.4 | 0.1 | 2.4 | 2.4 | | 2.4 | 2.4 | 0.1 |
| 12 | 2.8 | 2.6 | 0.7 | 1.3 | 2.8 | | 2.6 | 1.3 | 0.7 |
| 13 | 2.4 | 2.3 | 0.1 | 2.4 | 2.3 | | 2.3 | 2.4 | 0.1 |
| 14 | 2.3 | 2.5 | 0.1 | 2.5 | 2.5 | | 2.5 | 2.5 | 0.1 |
| 15 | 2.5 | 2.7 | 0.3 | 2.9 | 2.5 | | 2.7 | 2.9 | 0.3 |
| 16 | 2.4 | 2.7 | 0.35 | 2.9 | 2.4 | | 2.7 | 2.9 | 0.35 |

Receiving, by a double trombone shifter device, signals relating to one or more crossed-dipole radiating elements of an antenna system 1222

Performing, by the double trombone shifter device, polarization adjusting of the signals to derive output signals having polarizations that are adjusted in a manner that mimics physical rotation of the one or more crossed-dipole radiating elements 1224

Providing, by the double trombone shifter device, the output signals to enable avoidance of interference or PIM 1226

Obtaining data regarding interference or PIM originating from one or more interference sources 1232

↓

Electronically adjusting polarizations of signals relating to radiating elements of an antenna system, the electronically adjusting being performed for multiple frequency bands and facilitating mitigation of the interference or the PIM 1234

RADIO FREQUENCY (RF) POLARIZATION ROTATION DEVICES AND SYSTEMS FOR INTERFERENCE MITIGATION

FIELD OF THE DISCLOSURE

The subject disclosure relates to polarization rotation devices and systems for interference/passive intermodulation (PIM) mitigation or avoidance.

BACKGROUND

In most environments involving short range or long range wireless communications, interference from unexpected sources can negatively impact system performance. For instance, interference can result in lower throughput, dropped calls, and reduced bandwidth, and undesirably lead to traffic congestion or other adverse effects. Some wireless service providers have addressed interference issues by adding more communication nodes, policing interferers, or utilizing antenna steering techniques to avoid interferers.

BRIEF DESCRIPTION OF THE DRAWINGS

Reference will now be made to the accompanying drawings, which are not necessarily drawn to scale, and wherein:

FIG. 1A is a block diagram illustrating an exemplary, non-limiting embodiment of a communications network in accordance with various aspects described herein.

FIG. 2A is a block diagram illustrating an example, non-limiting embodiment of a system functioning within, or operatively overlaid upon, the communications network of FIG. 1A and/or the communications system of FIG. 1B in accordance with various aspects described herein.

FIGS. 2B-2D are diagrams illustrating example, non-limiting embodiments of polarization adjusting and associated equations in accordance with various aspects described herein.

FIG. 6 shows various views of an example, non-limiting embodiment of a polarization shifter of an RPM in accordance with various aspects described herein.

FIG. 9A shows an example orthogonal signal voltage reading table in accordance with various aspects described herein.

FIG. 9B shows an example component/substrate position table in accordance with various aspects described herein.

FIG. 12C depicts an illustrative embodiment of a method in accordance with various aspects described herein.

FIG. 12D depicts an illustrative embodiment of a method in accordance with various aspects described herein.

DETAILED DESCRIPTION

Figure 1B:
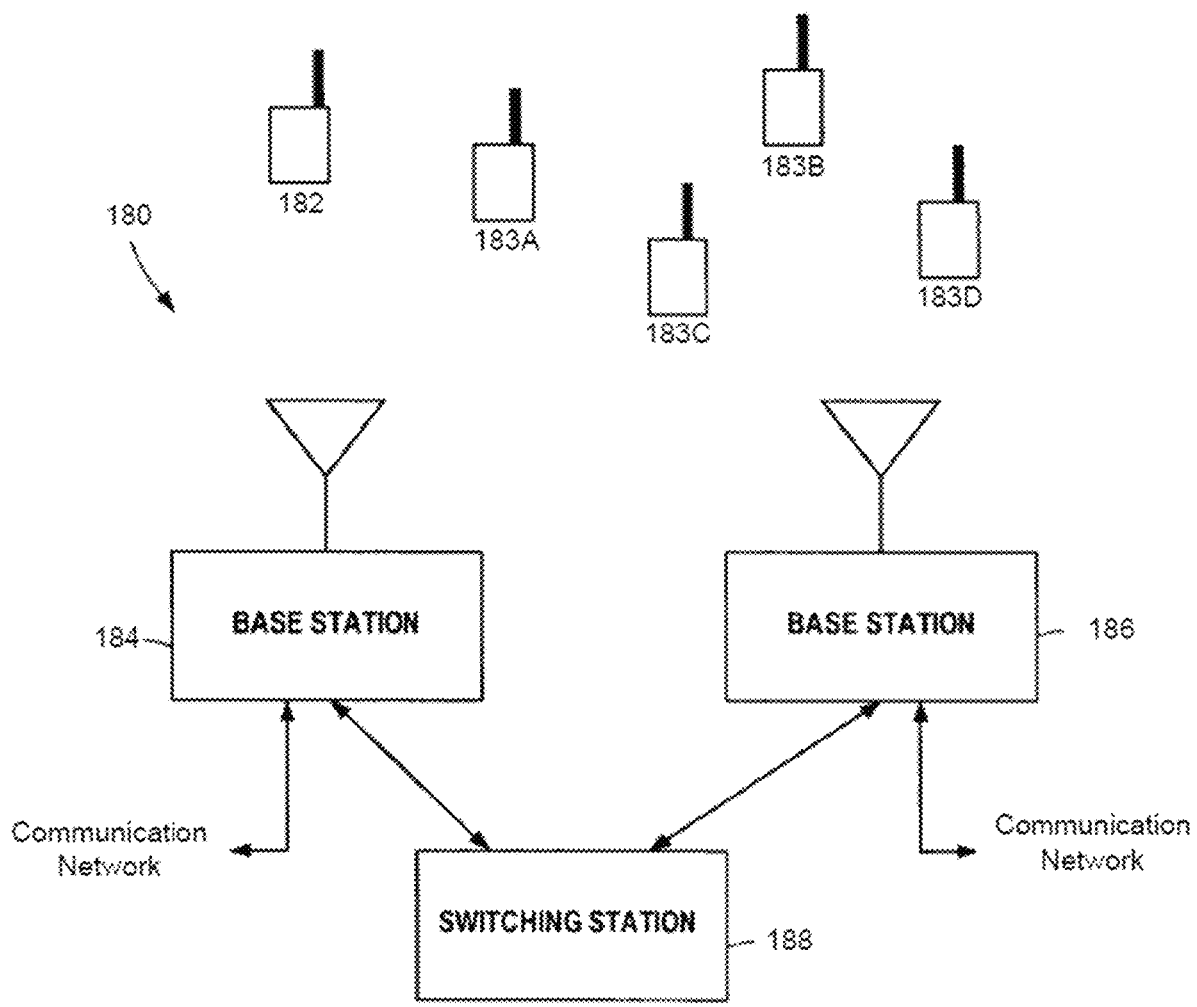
FIG. 1B depicts an exemplary, non-limiting embodiment of a communications system functioning within, or operatively overlaid upon, the communications network of FIG. 1A in accordance with various aspects described herein.

In a communications system, a main objective is to increase the signal to interference plus noise ratio (SINR) of a communication channel. Let's take a 2×2 multiple-input-multiple-output (MIMO) case as an example. MIMO gains over single-input-single-output (SISO) is achieved when the SINR of the channel is higher than is necessary to support the maximum SISO data rate. Such high SINR conditions occur when the user is near the cell center, or when interference from adjacent cells is low. When practical field deployments are taken into account, in a typical urban macro environment, it is estimated that 2×2 MIMO only provides approximately 20% gain over SISO. The 2×2 MIMO configuration can be increased by adding more antennas at each end of the link. In the original $3^{rd}$ Generation Partnership Project (3GPP) Release 8 Long-Term Evolution (LTE) standard in 2008, 2× and 4× operation was specified, and 8×8 was added later in Release 10. As the number of antennas increases, it becomes less likely that the channel will support orthogonal transmission paths. These orthogonal paths are known as Eigenmodes.

The subject disclosure describes, among other things, illustrative embodiments of polarization shifting (or adjusting) of signals for interference/PIM mitigation or avoidance. Polarization shifting (or adjusting) of a signal may be effected via a (e.g., mathematical) rotation of the signal. In exemplary embodiments, polarization shifting (or adjusting) may include polarization rotation of orthogonal signals without affecting their orthogonality. In the context of a communications system that includes an antenna with crossed-dipole radiating elements, polarization shifting of each signal in a pair of orthogonal signals corresponding to a given radiating element may involve defining polarizations/projections that provide a "mixing" effect, where the signals are projected in a different set of axes (e.g., represented by equations $202p/202q/202r$ described in more detail below with respect to FIGS. 2B-2D). For instance, crossed-dipole radiating elements may be oriented in a default (e.g., +45/−45 degree) polarization configuration, and signals associated with these radiating elements may be orthogonal and oriented in that default polarization (e.g., +45/−45 degrees). Polarization shifting may involve adjusting the orientations of orthogonal signals corresponding to the radiating elements—e.g., from a +45/−45 degree default orientation to a different orientation, such as a +30/−60 degree orientation—to effect "rotation" of the two signals. This mimics actual, physical rotation of those radiating elements without requiring or involving any movement of the radiating elements or the antenna system housing. Consequently, one resulting polarization direction (or signal in that polarization) may receive/include the interference/PIM and the other polarization direction (or signal in the other polarization) may receive/include little to none of the interference/PIM, thereby enabling mitigation or avoidance of the interference/PIM via selective signal extraction/usage.

Exemplary embodiments provide for a radio frequency (RF) polarization shifting module/system (or RF PIM mitigator) (RPM) that is capable of performing the polarization shifting (or adjusting) of signals in the RF (or analog) domain.

In one or more embodiments, the RPM may be implemented as an RF mechanical device that is configured to manipulate orthogonal RF signals. In various embodiments, the RF mechanical device may include input ports for receiving orthogonal RF signals, and output ports that provide polarization-adjusted RF signals. In certain embodiments, the ports of the RF mechanical device may be reciprocal or symmetrical in that each port may simultaneously function as an input port and an output port. In these embodiments, where a given dipole element corresponding to an RF line (and port of a communications system) operates in both the transmit (Tx) and receive (Rx) directions and/or operates in multiple frequency bands, signal manipulation by the RF mechanical device may (e.g., equally) affect both the Tx and Rx signals on that RF line across the multiple bands.

In exemplary embodiments, the RF mechanical device may include hybrid coupler(s) and mechanically-adjustable dual simultaneous phase-shifting coupler(s). In one or more embodiments, a mechanically-adjustable dual simultaneous phase-shifting coupler may be implemented as a dual trombone shifter that is linearly adjustable. In alternative embodiments, a mechanically-adjustable dual simultaneous phase-shifting coupler may be implemented as a dual (overlapping) arch shifter that is rotatably adjustable.

Referring to the dual trombone shifter implementation as an example, the device may include two 90 degree hybrid couplers for coupling to input and output (feed) networks. Each hybrid coupler may be coupled to a respective transmission line disposed on a bottom substrate, where the two transmission lines have curved portions and are separated from one another by a predefined distance. The device may also include a top substrate positioned adjacent to (e.g., over) the bottom substrate and having disposed thereon two curved transmission lines that at least partially overlap with the transmission lines on the bottom substrate and that, along with portions of the bottom transmission lines, form the dual trombone shifter. A dielectric layer may reside between the bottom substrate and the top substrate for transmission line coupling. By virtue of the arrangement of the hybrid couplers and the dual trombone shifter, the overlapping coupling between the transmission lines on the top substrate and the transmission lines on the bottom substrate, and the curved shapes and dimensions of the top and bottom transmission lines, mechanical adjustments to the dual trombone shifter—e.g., via controlled linear movement of the top substrate relative to the bottom substrate (resembling the sliding in/out of two trombones; hence, the descriptive "dual trombone")—may provide dual, simultaneous phase shifting effects that result in the above-described "rotation" of the respective polarizations of orthogonal RF input signals, without affecting orthogonality of the signals.

Embodiments of the RPM may be implemented in any portion of an RF chain of a communications system. For instance, in various embodiments, some or all of the aspects of the RPM may be implemented/integrated in a (e.g., standalone) construction or device that interfaces an antenna system and a radio (e.g., a remote radio head (RRH) or a remote radio unit (RRU)) of the communications system, and may provide for interference/PIM mitigation or avoidance independently of the radio and/or based on commands from the radio.

In one or more embodiments, some or all of the aspects of the RPM may additionally, or alternatively, be integrated in the antenna system (i.e., within a housing of the antenna system (e.g., as part of smart antenna functionality)) independently of the radio and/or based on commands from the radio.

In one or more embodiments, some or all of the aspects of the RPM may additionally, or alternatively, be implemented/integrated in the radio, where polarization adjusting may be performed for Tx only, for Rx only, or for both Tx and Rx. Polarization adjustments for Tx and Rx may be the same, similar, or different. Polarization adjusting may also be performed in the same manner, in a similar manner, or differently for Tx and Rx. In some of these embodiments, where the radio provides access to individual Tx and Rx signals across the different RF lines and/or across the different frequency bands (thus obviating the need to consider constraints relating to reciprocity and nonlinearities associated with high power RF), the design of the RPM may be simplified. For instance, while in certain embodiments, the RPM may be implemented in a radio using the above-described RF mechanical device (e.g., with hybrid coupler(s) and mechanically-adjustable dual simultaneous phase-shifting coupler(s)), in other embodiments, the RPM may additionally or alternatively be implemented using other RF devices and/or RF-based techniques to manipulate signals in an RF path.

It is to be understood and appreciated that, regardless of where the RPM is implemented (whether in the radio, the antenna, or as a standalone device), some or all of the aspects of the RPM may nevertheless include, or be implemented in, one or more RF devices, such as RF circuits and/or components configured to alter/combine (in the RF domain) phase(s) and/or amplitudes of signals to be transmitted and/or signals that are received.

Exemplary embodiments described herein also provide for polarization shifting (or adjusting) of signals that is effected electronically and/or in the digital domain. Electronic and/or digital manipulation of signals involves both real and complex (I/Q) values, and thus enables processing techniques that are difficult to implement using real numbers alone (i.e., in the RF domain). In any case, electronic and/or digital processing or manipulation (e.g., based on the equations $202p/202q/202r$ described in more detail below with respect to FIGS. 2B-2D or equivalents of equations $202p/202q/202r$) can similarly effect the above-described (e.g., mathematical) rotation of signals to mimic actual, physical rotation of radiating elements without requiring or involving any movement of the radiating elements or the antenna system housing.

In various embodiments, electronic and/or digital manipulation of signals may be implemented in a radio. With access to individual Tx and Rx signals across different RF lines and/or across different frequency bands, electronic- or digital-based polarization shifting of signals can be flexibly implemented without the need to consider constraints relating to reciprocity and nonlinearities associated with high power RF.

A Common Public Radio Interface (CPRI) device (e.g., server) may be deployed on a CPRI uplink (UL) between a radio and a baseband unit (BBU) of a communications system, and may be configured to analyze and manipulate baseband I/Q data to remove various types and sources of interference and provide insight into overall spectrum health. For instance, a CPRI device may be capable of performing PIM cancellation, SINR optimization, narrow/wideband interference cancellation, etc. In one or more embodiments, electronic and/or digital manipulation of signals may additionally, or alternatively, be implemented in a CPRI device. While a CPRI device might not have flexible access to individual Tx and Rx signals across different RF lines and/or across different frequency bands, electronic and/or digital manipulation of signals (e.g., based on the equations $202p/202q/202r$ described in more detail below with respect to FIGS. 2B-2D or equivalents of equations $202p/202q/202r$) may nevertheless be performed based on I/Q data to effect signal rotations.

Based on an analysis of known or likely interference/PIM levels, characteristics, and/or combinations, proper selection of polarization shifting/adjusting parameters/values, phase shifts, and/or the like may be determined and utilized to facilitate interference/PIM mitigation or avoidance. For instance, adjusting the polarization of orthogonal RF signals such that one resulting polarization direction (or signal in that polarization) receives/includes the interference/PIM and the other polarization direction (or signal in the other polarization) receives/includes little to none of the interference/PIM enables mitigation or avoidance of the interference/PIM via selective signal extraction/usage. Additionally, or alternatively, downlink (DL) signals can be manipulated or otherwise influenced in a way that minimizes or reduces the amount of interference/PIM that is received in the UL, which can improve overall UL performance and coverage. The principle of orthogonality between the different modes of transmission can also be taken into account, where interference/PIM source(s) minimally interact with transmissions, thereby reducing the level of interference/PIM detected/received by a communications system.

In various embodiments, some or all of the polarization shifting functionality provided by any of the RPM implementation(s) or via electronic and/or digital processing may be performed automatically (based on detected interference/PIM levels) by one or more smart detection/mitigation/cancellation devices, systems, and/or algorithms. In certain embodiments, some or all of the polarization shifting functionality may be performed manually—e.g., by one or more operators or administrators in light of detected interference/PIM level(s). In these embodiments, one or more preset conditions or settings (e.g., relating to particular adjustments, such as physical (e.g., linear and/or rotational) displacement values, polarization/projection amounts or values, etc.) may be available for user selection, and may, when selected, cause the appropriate polarization shifting to be effected accordingly.

It is to be understood and appreciated that implementations of the RPM may perform interference/PIM mitigation similar to that provided by physical rotation of radiating elements and/or CPRI-based PIM mitigation, but is distinguished therefrom since the RPM intercepts signals in the RF domain.

In certain embodiments, some or all of the aspects of the polarization shifting functionality provided by any of the RPM implementation(s) or via electronic and/or digital processing may be combined with each other and/or with one or more other interference/PIM mitigation or avoidance techniques. For instance, either or both of RPM-based polarization adjusting and electronic-/digital-based polarization adjusting may be combined with physical rotation of radiating elements and/or hardware-based (and/or software-based) signal conditioning of (e.g., UL) signals to provide overall (e.g., complementary) interference/PIM mitigation or avoidance.

In some embodiments, various polarization shifting techniques described herein can be exploited in time-division duplex (TDD) systems and/or frequency-division duplex (FDD) systems to relax, loosen, or otherwise decrease the number of system implementation requirements, such as those relating to guard times/bands in TDD and frequency separation in FDD.

One or more aspects of the subject disclosure include a polarization rotation system. The polarization rotation system may include a radio frequency (RF) mechanical device. The polarization rotation system may further include a plurality of reciprocal ports for the RF mechanical device, the plurality of reciprocal ports including a first pair of reciprocal ports as inputs for the RF mechanical device, and a second pair of reciprocal ports as outputs for the RF mechanical device, the RF mechanical device being configured to perform polarization rotation of signals to enable avoidance of interference.

One or more aspects of the subject disclosure include a method. The method may include receiving, by a radio frequency (RF) mechanical device, signals relating to one or more crossed-dipole radiating elements of an antenna system, performing, by the RF mechanical device, polarization rotation of the signals to derive output signals having polarizations that are rotated in a manner that mimics physical rotation of the one or more crossed-dipole radiating elements, and providing, by the RF mechanical device, the output signals to enable avoidance of interference.

One or more aspects of the subject disclosure include a communications system. The communications system may include an antenna having multiple arrays of orthogonally-polarized radiating elements, and a device arranged to communicatively couple with one or more arrays of the multiple arrays of orthogonally-polarized radiating elements, the device being configured to perform polarization rotation of signals relating to the one or more arrays, the polarization rotation mimicking physical rotation of the one or more arrays and enabling mitigation of interference.

Other embodiments are described in the subject disclosure.

Referring now to FIG. 1A, a block diagram is shown illustrating an example, non-limiting embodiment of a system 100 in accordance with various aspects described herein. For example, system 100 can facilitate, in whole or in part, providing or effecting of polarization shifting to mitigate or avoid detected interference/PIM. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, Ultra-wideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 1B depicts an exemplary, non-limiting embodiment of a telecommunication system 180 functioning within, or operatively overlaid upon, the communications network 100 of FIG. 1A in accordance with various aspects described herein. For example, system 180 can facilitate, in whole or in part, providing or effecting of polarization shifting to mitigate or avoid detected interference/PIM. As shown in FIG. 1B, the telecommunication system 180 may include mobile units 182, 183A, 183B, 183C, and 183D, a number of base stations, two of which are shown in FIG. 1B at reference numerals 184 and 186, and a switching station 188 to which each of the base stations 184, 186 may be interfaced. The base stations 184, 186 and the switching station 188 may be collectively referred to as network infrastructure.

During operation, the mobile units 182, 183A, 183B, 183C, and 183D exchange voice, data or other information with one of the base stations 184, 186, each of which is connected to a conventional land line communications network. For instance, information, such as voice information, transferred from the mobile unit 182 to one of the base stations 184, 186 is coupled from the base station to the communications network to thereby connect the mobile unit 182 with, for example, a land line telephone so that the land line telephone may receive the voice information. Conversely, information, such as voice information may be transferred from a land line communications network to one of the base stations 184, 186, which in turn transfers the information to the mobile unit 182.

The mobile units 182, 183A, 183B, 183C, and 183D and the base stations 184, 186 may exchange information in either narrow band or wide band format. For the purposes of this description, it is assumed that the mobile unit 182 is a narrowband unit and that the mobile units 183A, 183B, 183C, and 183D are wideband units. Additionally, it is assumed that the base station 184 is a narrowband base station that communicates with the mobile unit 182 and that the base station 186 is a wideband digital base station that communicates with the mobile units 183A, 183B, 183C, and 183D.

Narrow band format communication takes place using, for example, narrowband 200 kilohertz (KHz) channels. The Global system for mobile phone systems (GSM) is one example of a narrow band communication system in which the mobile unit 182 communicates with the base station 184 using narrowband channels. Alternatively, the mobile units 183A, 183B, 183C, and 183D communicate with the base station 186 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths. The terms narrowband and wideband referred to above can be replaced with sub-bands, concatenated bands, bands between carrier frequencies (carrier aggregation), and so on, without departing from the scope of the subject disclosure.

The switching station 188 is generally responsible for coordinating the activities of the base stations 184, 186 to ensure that the mobile units 182, 183A, 183B, 183C, and 183D are constantly in communication with the base station 184, 186 or with some other base stations that are geographically dispersed. For example, the switching station 188 may coordinate communication handoffs of the mobile unit 182 between the base station 184 and another base station as the mobile unit 182 roams between geographic areas that are covered by the two base stations.

In various circumstances, the telecommunication system 180, and more particularly, one or more of the base stations 184, 186 can be undesirably subjected to interference. Interference can represent emissions within band (narrowband or wideband), out-of-band interferers, interference sources outside cellular (e.g., TV stations, commercial radio or public safety radio), interference signals from other carriers (inter-carrier interference), interference signals from UEs operating in adjacent base stations, PIM, and so on. Interference can represent any foreign signal that can affect communications between communication devices (e.g., a UE served by a particular base station).

FIG. 2A is a block diagram illustrating an example, non-limiting embodiment of a system 200 functioning within, or operatively overlaid upon, the communications network 100 of FIG. 1A and/or the communications system 180 of FIG. 1B in accordance with various aspects described herein. As depicted, the system 200 can include an antenna (or antenna system) 210 and an RPM 220. In various embodiments, the antenna 210 may include multiple radiating elements. In one or more embodiments, the antenna 210 may include multiple columns and/or rows of radiating elements, forming one or more antenna arrays or panels. As shown in FIG. 2A, the antenna 210 can be associated with various spatial regions, including a reactive near-field region 200c, a radiating near-field region 200d, a far-field region 200f, and an intermediate region 200i. One or more UEs/users 200u may be located in the far-field region 200f. The intermediate region 200i may include a zone that overlaps a portion of the radiating near-field region 200d and a portion of the far-field region 200f.

As depicted in FIG. 2A, the antenna 210 and/or the RPM 220 may be disposed or deployed on a structure, such as a building rooftop. It is to be appreciated and understood that the antenna 210 and the RPM 220 may be deployed in any suitable manner. As one example, the antenna 210 and/or the RPM 220 may be mounted on one or more towers where few or no objects may be located nearby (e.g., an unobstructed antenna on a tower), and thus a far-field representation may be adequate. As another example, multiple antennas 210 and/or multiple RPMs 220 may be located within close proximity to one another (e.g., within a threshold distance from one another), where the antennas 210 may or may not have overlapping degrees of coverage, and thus the near-field region may have an impact on antenna performance. As yet another example, one or more antennas 210 and/or one or more RPMs 220 may be deployed on building rooftop(s) in densely-populated areas (e.g., towns or cities).

In various antenna deployments, antennas (or more particularly, the UL) may be subject to interference and/or PIM—e.g., a PIM source 200p. PIM interference may be due to nonlinearities external to antennas that, when subjected to electromagnetic waves emitted by antenna elements in the DL frequency band, generate reflections at frequencies in the UL frequency band. PIM interference may also be due to antenna(s) of a base station transmitting and receiving in DL and UL frequency bands that are close to one another, or due to different antennas of different base stations transmitting in frequency bands that are close to one another. In these cases, intermodulation of signals transmitted in different (but sufficiently close) frequencies can result in passive signals falling into an UL frequency band. In any case, interference/PIM decreases UL sensitivity and thus negatively impacts UL coverage, reliability, performance, and data speeds.

In exemplary embodiments, the RPM 220 may be capable of effecting polarization shifting (or adjusting) of orthogonal signals in the RF domain. In various embodiments, the RPM 220 may be implemented as (or may include) one or more RF mechanical devices. In these embodiments, the RPM 220 may include a respective RF mechanical device for each set or column of radiating elements of the antenna 210 (or for two or more sets or columns of radiating elements of the antenna 210). In certain embodiments, the RF mechanical device may include hybrid coupler(s) and mechanically-adjustable simultaneous phase-shifting coupler(s) (e.g., as described in more detail below with respect to one or more of FIGS. 5A-5C and 6).

Figure 2B:
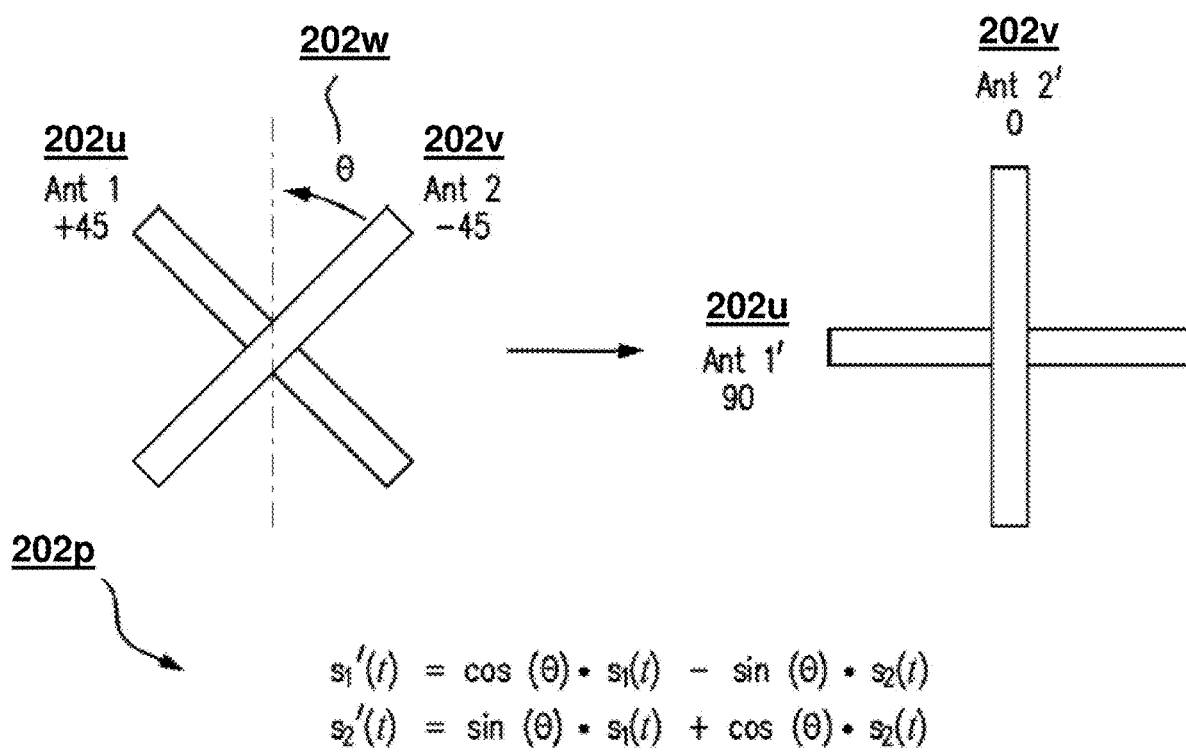

FIGS. 2B-2D are diagrams illustrating example, non-limiting embodiments of polarization adjusting and associated equations in accordance with various aspects described herein. As shown in FIG. 2B, the polarizations of signals transmitted/received by an orthogonally-polarized pair of elements, such as a crossed-dipole antenna 202u, 202v, may be changed. Here, suppose signals $s_1(t)$ and $s_2(t)$ are transmitted/received by the +45 degree dipole 202u and the −45 degree dipole 202v, respectively—that is, where signal $s_1(t)$ may be transmitted/received with a +45 degree polarization and signal $s_2(t)$ may be transmitted/received with a −45 degree polarization. In a case where (e.g., based on a desire to mitigate or cancel interference/PIM, such as likely PIM combinations) there is a need to "rotate" or modify the polarization of the signal $s_1(t)$ to 90 degrees (e.g., horizontal) and the polarization of the signal $s_2(t)$ to 0 degrees (e.g., vertical), equations 202p can be applied to derive new signals $s_1'(t)$ and $s_2'(t)$. As shown, the new signals can be computed or derived by processing/manipulating (or mixing) the original signals $s_1(t)$ and $s_2(t)$, which is equivalent to a "rotation" of the crossed-dipole antenna by an angle 202w (here, for example, 45 degrees in the counter-clockwise direction). In this way, when signals $s_1'(t)$ and $s_2'(t)$ are transmitted/received from the +45 dipole and the −45 dipole, it is equivalent to transmitting/receiving $s_1(t)$ and $s_2(t)$ from dipoles oriented at 90 degrees and 0 degrees. Selection of certain polarizations can be viewed as a projection of signals in different axes. The weights in the polarization shifting equations 202p are real values (rather than complex values), and operate to mathematically adjust the orthogonal signals to desired polarizations. In exemplary embodiments, the RPM 220 may be configured to perform polarization adjusting of orthogonal signals (in the RF domain) in accordance with the equations 202p.

In various embodiments, the RPM 220 may be configured to perform polarization shifting of orthogonal signals (in the RF domain) for Tx only, for Rx only, or for both Tx and Rx. FIG. 2C shows example equations 202q (similar to equations 202p) that the RPM 220 may implement to effect shifting in Tx/Rx directions. The polarization adjusting (via angle $\theta_{Tx}$) of orthogonal signals on the Tx side ($s_{1Tx}$ and $s_{2Tx}$) may be the same as or different from the polarization adjusting (via angle $\theta_{Rx}$) of orthogonal signals on the Rx side ($s_{1Rx}$ and $s_{2Rx}$). Implementation of the RPM 220 in a radio, where there might be access to individual Tx and Rx signals across the different RF lines, can enable more flexible polarization adjusting for Tx and Rx (i.e., where angles $\theta_{Tx}$ and $\theta_{Rx}$ may be different).

Figure 2E:
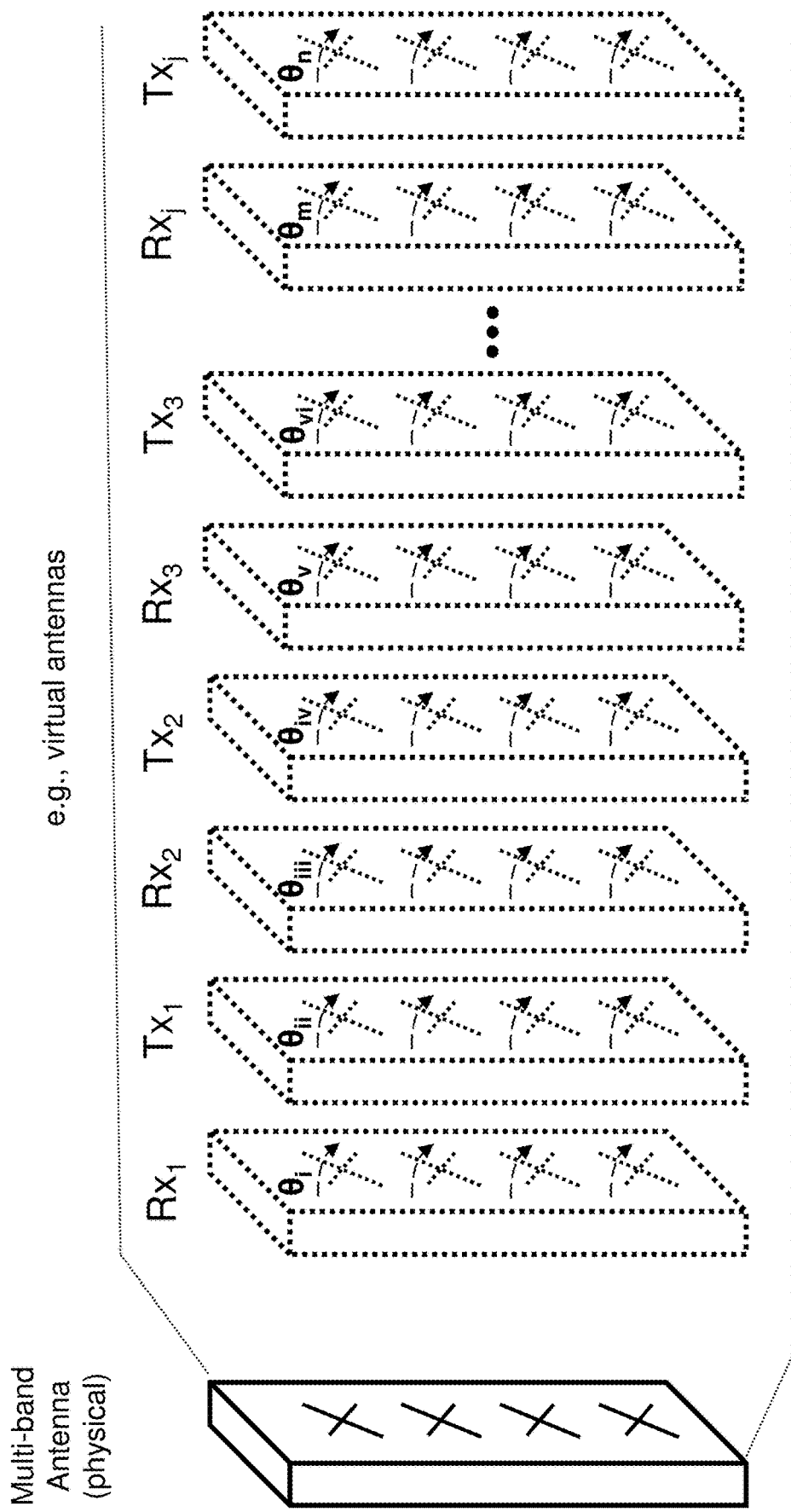
FIG. 2E illustrates a conceptualization of flexible polarization adjusting for transmit (Tx) and receive (Rx) across various frequency bands of an example multi-band antenna in accordance with various aspects described herein.

In antenna implementations where each radiating element operates in multiple frequency bands (e.g., a multi-band radio system), the RPM 220 may be configured to perform polarization shifting of orthogonal signals (in the RF domain) for one or more of the bands and for Tx only, for Rx only, or for both Tx and Rx. FIG. 2D shows example equations 202r that the RPM 220 may implement to effect polarization shifting in a multi-band communications system, where "j" represents the different bands (e.g., Band 1, Band 2, etc.) of the system. Implementation of the RPM 220 in a radio, where there might be access to individual Tx and Rx signals across the different RF lines and across the different bands, can enable more flexible polarization adjusting for Tx and Rx across the different frequency bands (i.e., where an angle $\theta_{Tx}$ for one band may be the same as or different from an angle $\theta_{Tx}$ for another band and/or where an angle $\theta_{Rx}$ for one band may be the same as or different from an angle $\theta_{Rx}$ for another band). FIG. 2E illustrates a conceptualization of flexible polarization adjusting for Tx and Rx across various frequency bands of an example multi-band antenna in accordance with various aspects described herein. As shown in FIG. 2E, the multi-band antenna may include crossed-dipole radiating elements—here, a single column of four crossed-dipole radiating elements is shown, although the column may include more or fewer crossed-dipole radiating elements and/or there may be additional columns of crossed-dipole radiating elements in the antenna. The crossed-dipole radiating elements in this example may each be designed to operate in Tx and Rx across multiple adjacent frequency bands 1, 2, 3, . . . , j, and can be treated as a stack or layer of virtual antennas as shown—i.e., as a set of crossed-dipole radiating elements for Rx in Band 1 ($Rx_1$), a set of crossed-dipole radiating elements for Tx in Band 1 ($Tx_1$), a set of crossed-dipole radiating elements for Rx in Band 2 ($Rx_2$), a set of crossed-dipole radiating elements for Tx in Band 2 ($Tx_2$), and so on. The virtual antennas may be mathematically or virtually rotated (e.g., in accordance with equations 202r of FIG. 2D) independently, where their virtual rotations are mutually distinct from one another. In this way, the virtual rotation angle or polarization rotation angles ($\theta_i$, $\theta_{ii}$, $\theta_{iii}$, $\theta_{iv}$, $\theta_v$, $\theta_{vi}$, . . . $\theta_m$, $\theta_n$) may be the same as or different from one another as needed to avoid interference in the Rx and Tx directions and across the multiple frequency bands. For example, $\theta_i$ may be the same as or different from $\theta_{ii}$, which may be the same as or different from $\theta_{iii}$, and so on. It is to be appreciated and understood that, while the various virtual rotation angles are shown in the clockwise direction, some or all of them may alternatively be in the counterclockwise direction.

Figure 3A:
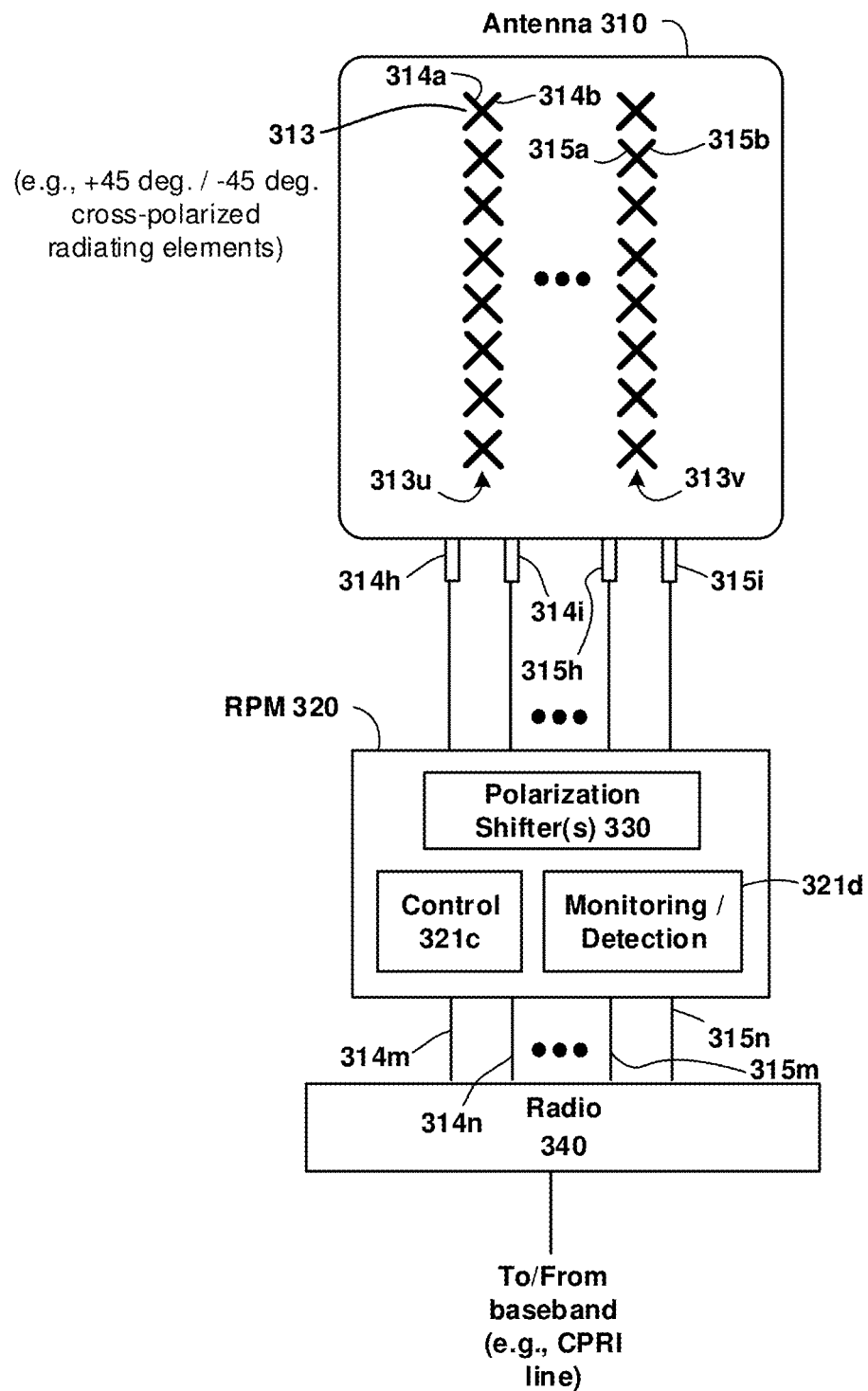
FIG. 3A is a block diagram illustrating an example, non-limiting embodiment of a communications system that includes an antenna and a radio frequency (RF) polarization shifting module/system (or RF PIM mitigator) (RPM) for interference/PIM detection and mitigation/avoidance, and that functions within, or is operatively overlaid upon, the communications network of FIG. 1A and/or the communications system of FIG. 1B in accordance with various aspects described herein.

FIG. 3A is a block diagram illustrating an example, non-limiting embodiment of a communications system that includes an antenna 310 and an RPM 320 for interference/PIM detection and mitigation/avoidance in accordance with various aspects described herein. In various embodiments, the antenna 310 may be the same as, may be similar to, or may otherwise correspond to the antenna 210 of FIG. 2A, and the RPM 320 may be the same as, may be similar to, or may otherwise correspond to the RPM 220 of FIG. 2A.

As depicted in FIG. 3A, the antenna 310 may be configured with multiple columns 313u, 313v, etc. of radiating elements 313 and multiple ports 314h, 314i, 315h, 315i, etc. The antenna 310 and/or the radiating elements 313 therein (e.g., enclosed within an antenna housing) may have any shape or combination of shapes with any suitable dimensions, polarizations, etc. In various embodiments, each of the radiating elements 313 may be designed and positioned such that their radiation pattern(s) exhibit directional, sectoral coverage.

In exemplary embodiments, each radiating element 313 may include an orthogonally-polarized pair of elements. For instance, as depicted, each radiating element 313 in column 313u may include orthogonally-polarized elements 314a (e.g., oriented for +45 degree polarization) and 314b (e.g., oriented for −45 degree polarization), and each radiating element 313 in column 313v may include orthogonally-polarized elements 315a (e.g., oriented for +45 degree polarization) and 315b (e.g., oriented for −45 degree polarization).

As depicted in FIG. 3A, the RPM 320 may be communicatively coupled (e.g., via analog/RF line(s)) to the outputs/ports 314*h*, 314*i*, 315*h*, 315*i*, etc. The radiating elements 313 may be dual port, and although not shown in FIG. 3A, the arrays 313*u*, 313*v*, etc. may be coupled to the outputs/ports 314*h*, 314*i*, 315*h*, 315*i*, etc. via one or more RF feed networks. In one or more embodiments, sub-arrays may be independently fed to the respective antenna ports—e.g., one port for each sub-array. For instance, the orthogonally-polarized elements 314*a* of the radiating elements 313 in column 313*u* may (e.g., each) be communicatively coupled with the port 314*h*, the orthogonally-polarized elements 314*b* of the radiating elements 313 in column 313*u* may (e.g., each) be communicatively coupled with the port 314*i*, the orthogonally-polarized elements 315*a* of the radiating elements 313 in column 313*v* may (e.g., each) be communicatively coupled with the port 315*h*, the orthogonally-polarized elements 315*b* of the radiating elements 313 in column 313*v* may (e.g., each) be communicatively coupled with the port 315*i*, and so on. In one or more embodiments, the sub-elements in a dipole pair may be independent of (e.g., operated independently from) one another. For example, in certain embodiments, the sub-elements in a dipole pair may transmit and/or receive independently of one another. In various embodiments, each sub-element in a dipole pair (and corresponding RF line and port) may operate in both Tx and Rx directions (i.e., where Tx and Rx may occur simultaneously) and/or operate in multiple frequency bands (i.e., where there may be Tx and Rx occurring in each of multiple bands).

It is to be appreciated and understood that the antenna 310 may have a port/array configuration other than that shown, such as a configuration with more or fewer radiating elements 313, more or fewer arrays of radiating elements 313, and/or more or fewer ports.

As shown in FIG. 3A, the RPM 320 may include one or more polarization shifters 330, a control unit 321*c*, and one or more monitoring/detection units 321*d*. In one or more embodiments, the polarization shifter(s) 330, the control unit 321*c*, and the monitoring/detection unit(s) 321*d* may be communicatively coupled with one another, with (e.g., each of) the radiating elements 313, and/or with various components of a radio 340 (e.g., an RRH or RRU). As depicted, the RPM 320 may be communicatively coupled to the radio 340 via analog/RF line(s) 314*m*, 314*n*, 315*m*, 315*n*, etc.

In various embodiments, the polarization shifter(s) 330 of the RPM 320 may be implemented as (or may include) one or more RF mechanical devices. In these embodiments, the RPM 320 may include a respective RF mechanical device for each column of radiating elements 313 (or for two or more columns of radiating elements 313). In certain embodiments, the RF mechanical device may include hybrid coupler(s) and mechanically-adjustable dual simultaneous phase-shifting coupler(s) (e.g., as described in more detail below with respect to one or more of FIGS. 5A-5C and 6).

The monitoring/detection unit(s) 321*d* may be configured to perform measurements on signals inputted to the polarization shifter(s) 330 and/or signals outputted from the polarization shifter(s) 330. In certain embodiments, the RPM 320 may include a respective polarization shifter 330 and a respective monitoring/detection unit 321*d* for each array of radiating elements 313. For instance, in the implementation shown in FIG. 3A, each of a first polarization shifter 330 and a first monitoring/detection unit 321*d* may be coupled to each of the radiating elements 313 in array 313*u*, each of a second polarization shifter 330 and a second monitoring/detection unit 321*d* may be coupled to each of the radiating elements 313 in array 313*v*, and so on. In this example, one sub-array of dipole elements in the array 313*u* may be coupled to the first polarization shifter 330 and to the first monitoring/detection unit 321*d* over one or more communication lines, and the other orthogonal sub-array of dipole elements in the array 313*u* may be coupled to the first polarization shifter 330 and to the first monitoring/detection unit 321*d* over one or more other communication lines. Continuing the example, one sub-array of dipole elements in the array 313*v* may be coupled to the second polarization shifter 330 and to the second monitoring/detection unit 321*d* over one or more communication lines, and the other orthogonal sub-array of dipole elements in the array 313*v* may be coupled to the second polarization shifter 330 and to the second monitoring/detection unit 321*d* over one or more other communication lines, and so on. Further continuing the example, in certain embodiments, output ports of the first polarization shifter 330 may also be coupled to the first monitoring/detection unit 321*d* via respective communication lines, output ports of the second polarization shifter 330 may also be coupled to the second monitoring/detection unit 321*d* via respective communication lines, and so on. In some alternate embodiments, a single monitoring/detection unit 321*d* may be coupled to multiple (e.g., some or all of the) arrays of radiating elements 313 and/or to multiple (e.g., some or all of the) polarization shifters 330. In these embodiments, the single monitoring/detection unit 321*d* may be coupled to some or all of the input ports and output ports of the multiple polarization shifters 330 via respective communication lines.

In exemplary embodiments, the control unit 321*c* may be configured to receive detection outputs from the monitoring/detection unit(s) 321*d* (e.g., over any suitable interface, such as a Serial Peripheral Interface (SPI), a Recommended Standard interface (e.g., RS-232 or the like), a Universal Serial Bus (USB) interface, and/or the like), process the detection outputs to determine the optimal (or best) polarization (or angle) for each pair of orthogonal RF signals, and effect polarization shifting of those RF signals according to the best polarization. Effecting polarization shifting may include causing, via a motor and drive assembly (e.g., described in more detail below with respect to FIG. 7A), one or more components of one or more polarization shifter(s) 330 that are disposed to intercept the orthogonal RF signals to move so as to manipulate the orthogonal RF signals accordingly. The polarization shifting may result in a maximum in difference between the orthogonal RF signals associated with the dipole elements in one polarization (e.g., +45 degrees) relative to signals associated with the dipole elements in the orthogonal polarization (e.g., −45 degrees)—e.g., where one of the polarization-adjusted signals includes interference/PIM and the other of the polarization-adjusted signals does not include (or includes only minimal) interference/PIM. In this way, the polarization shifting may mimic physical rotation of the radiating elements, thereby enabling mitigation or avoidance of the interference/PIM—e.g., by selecting/using (e.g., only) the polarization-adjusted signal(s) that include no (or minimal) interference/PIM.

It is to be understood and appreciated that the functionality of control unit 321*c* and the monitoring/detection unit(s) 321*d* may be implemented in any desired number of boards. As an example, the control unit 321*c* may be implemented in a single board and the monitoring/detection unit(s) 321*d* may be implemented in multiple boards. As another example, the control unit 321*c* may be implemented in a single board and the monitoring/detection unit(s) 321*d* may also be implemented in a separate single board. As yet another example, the control unit 321*c* may be implemented in multiple boards and the monitoring/detection unit(s) 321*d* may be implemented in a single board. In certain embodiments, the control functionality and monitoring/detection functionality may be implemented in a single integrated board.

In various embodiments, the control unit 321c (whether implemented as a standalone controller board or integrated with one or more other devices, such as the monitoring/detection unit(s) 321d) may include a variety of components configured to provide the control functionality described herein. In one or more embodiments, the control unit 321c may include, among other components, one or more microcontrollers, one or more analog-to-digital (A/D) converters, and/or hardware, firmware, or a combination of hardware and software for motor position management. In exemplary embodiments, the control unit 321c may be employed to configure the monitoring/detection unit(s) 321d with desired settings, such as values for base frequencies, attenuation, and/or other parameters.

Figure 3B:
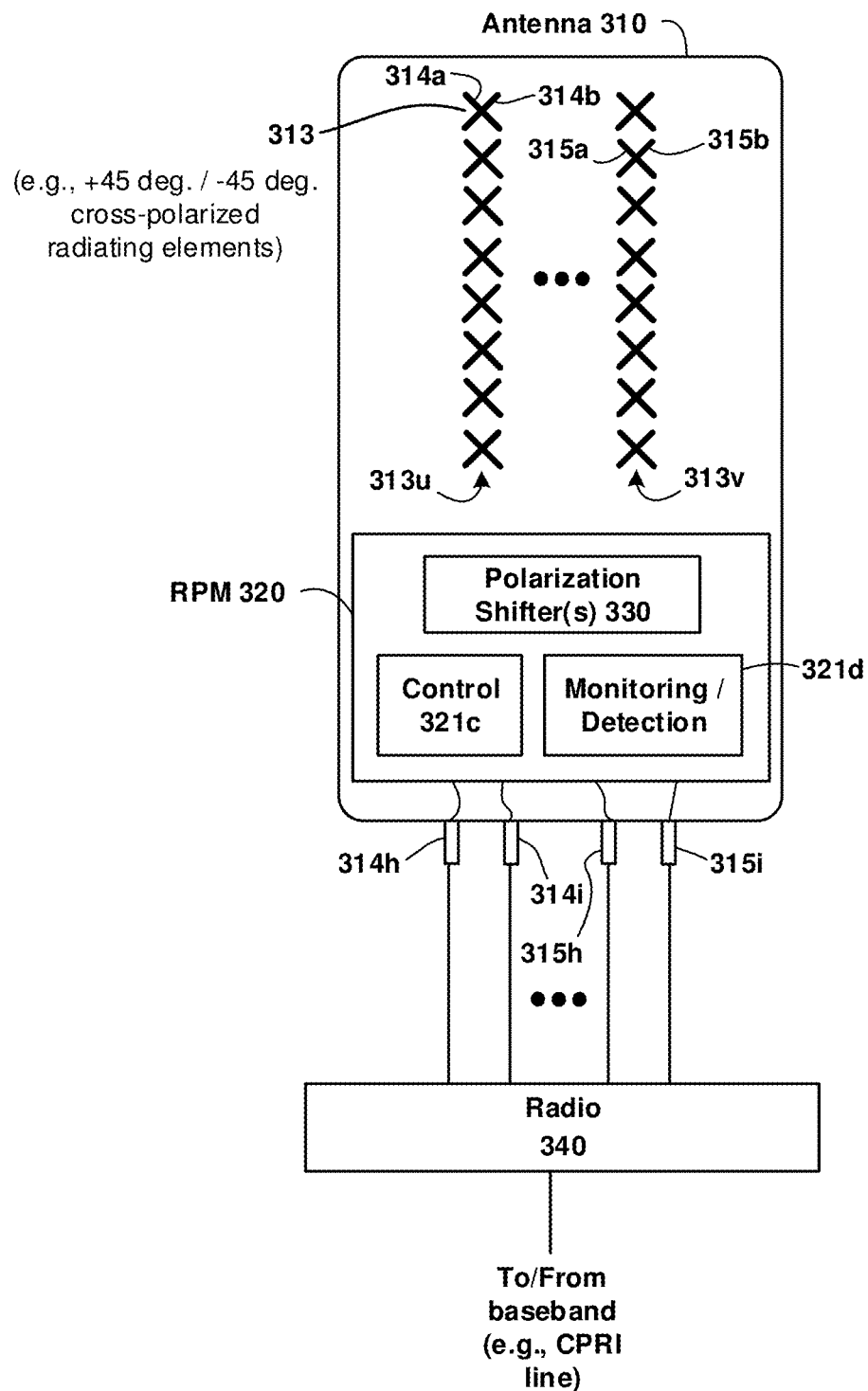
FIGS. 3B and 3C are block diagrams illustrating alternate example non-limiting embodiments of a communications system, functioning within, or operatively overlaid upon, the communications network of FIG. 1A and/or the communications system of FIG. 1B in accordance with various aspects described herein.

Although FIG. 3A shows the RPM 320 as being a standalone device or module, in certain embodiments, some or all of the components/functionality thereof (e.g., the polarization shifter(s) 330, the control unit 321c, and/or the monitoring/detection unit(s) 321d) may instead be implemented elsewhere, such as, for example, in the antenna 310 (e.g., FIG. 3B). In either implementation (whether as a standalone device or in the antenna 310), and where a dipole element, corresponding RF line, and corresponding port of the communications system operate in both the Tx and Rx directions and/or operate in multiple frequency bands, signal manipulation by the polarization shifter(s) 330 may (e.g., equally) affect both the Tx and Rx signals on that RF line across the multiple bands.

In alternate embodiments, the RPM 320 may be implemented/integrated in the radio 340 (e.g., FIG. 3C), where polarization adjusting may be performed for Tx only, for Rx only, or for both Tx and Rx as well as across multiple bands in a case where a multi-band system is involved. Polarization adjustments (e.g., "rotation" angles) for Tx and Rx in a given band may be the same, similar, or different, and the polarization adjusting may be performed in the same manner, in a similar manner, or differently for Tx and Rx in the band. Tx in one band may also be subjected to polarization adjusting in the same, similar, or different manner (e.g., by the same or a different angle) as Tx in a different band, and Rx in one band may also be subjected to polarization adjusting in the same, similar, or different manner (e.g., by the same or a different angle) as Rx in a different band. Where the radio 340 provides access to individual Tx and Rx across the different RF lines and/or across the different frequency bands (thus obviating the need to consider constraints relating to reciprocity and nonlinearities associated with high power RF), the design of the RPM 320 may be simplified relative to the design of the components of the RPM 320 in either FIG. 3A or FIG. 3B. As an example, certain RF circuitry and/or RF-based techniques (rather than RF mechanical device(s)) may be employed to manipulate signals in an RF path. As another example, certain aspects of the control system may be additionally simplified—e.g., motor(s) may or may not be needed, certain control functionality of the control unit 321d relating to motor control may or may not be needed, and so on.

Figure 3C:
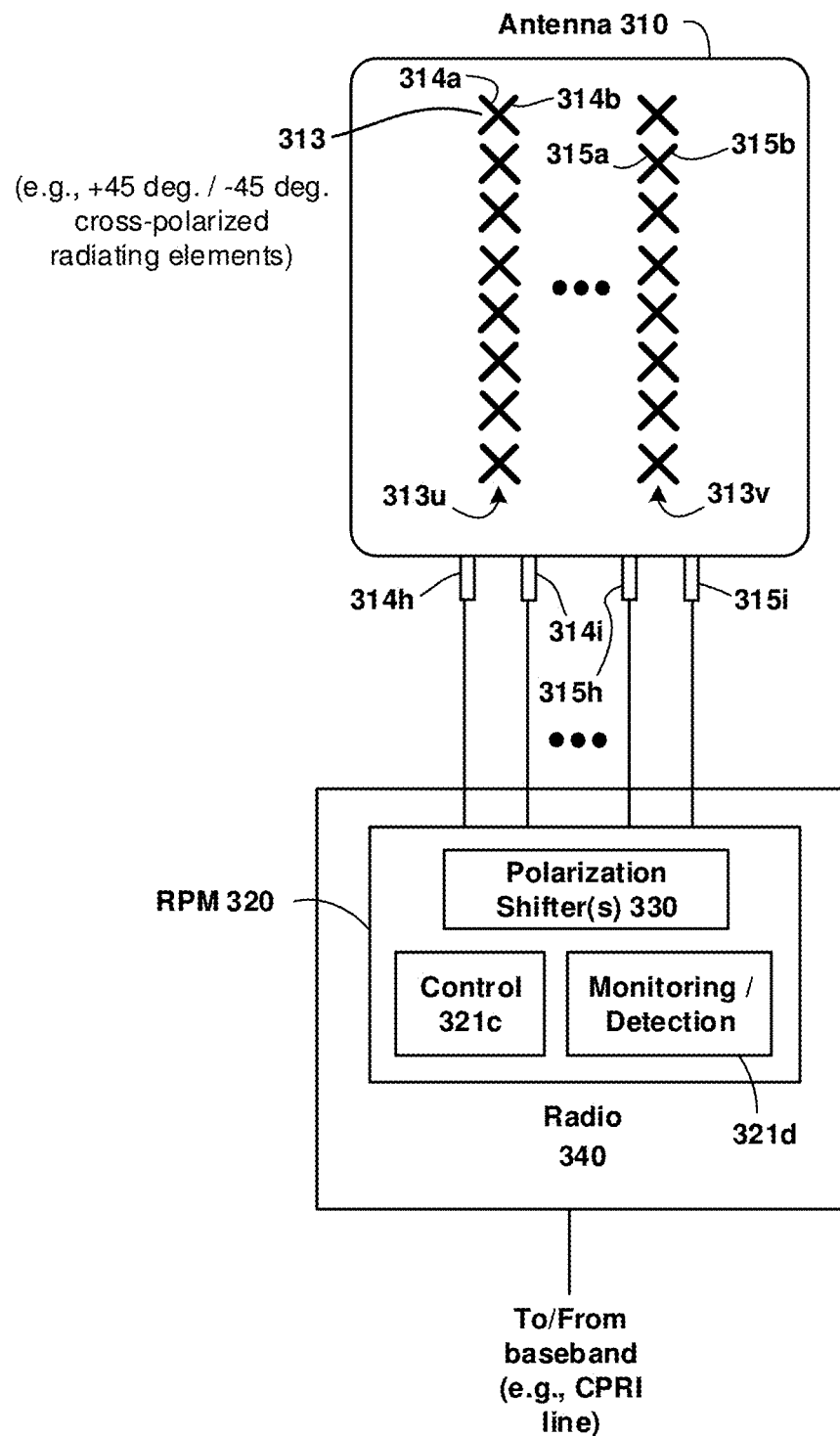

It is to be appreciated and understood that the quantities of the devices/components shown in each of FIGS. 3A-3C are merely exemplary. That is, any of the systems shown in FIGS. 3A-3C may include any number of (e.g., more or fewer) antennas 310, radiating elements 313, ports, analog/RF lines, RPMs 320, polarization shifter(s) 330, control units 321c, and/or monitoring/detection units 321d. Furthermore, some of these devices/components may be combined with one another or with other devices/components.

FIGS. 4A-4E are block diagrams illustrating example polarization shifters 430a-430e in accordance with various aspects described herein. In various embodiments, each of the polarization shifters 430a-430e may be the same as, may be similar to, or may otherwise correspond to any of the polarization shifters 330 of FIGS. 3A, 3B, and 3C.

Figure 4A:
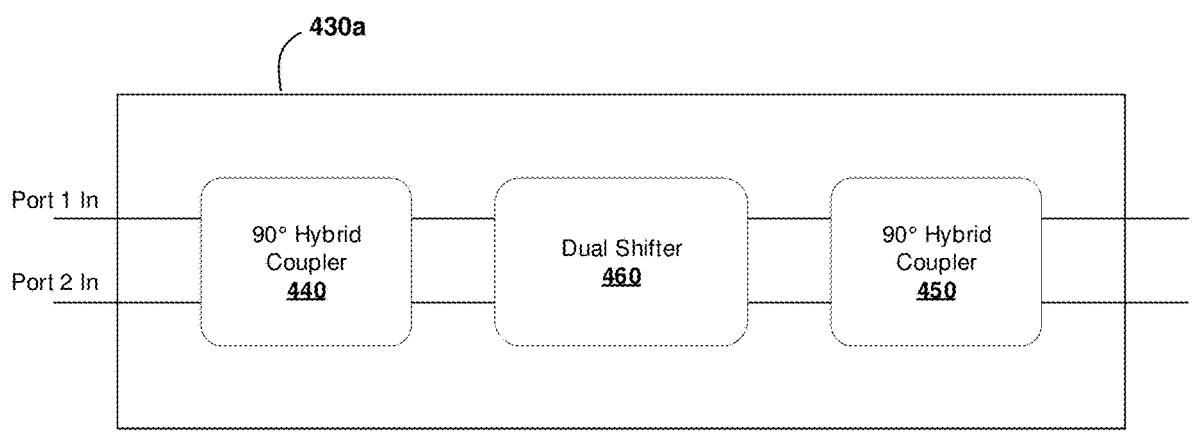
FIGS. 4A-4F are block diagrams illustrating example polarization shifters in accordance with various aspects described herein.

Referring to FIG. 4A, the polarization shifter 430a may include a dual shifter 460 interfacing two 90° hybrid couplers 440 and 450. The 90° hybrid coupler 440 may receive inputs at "Port 1 in" and "Port 2 in" (which, in the system implementation of FIG. 3A, for example, may correspond to ports 314h and 314i, respectively, or ports 315h, 315i, respectively). The 90° hybrid coupler 450 may provide outputs (which, in the system implementation of FIG. 3A, for example, may correspond to outputs coupled to lines 314m and 314n, respectively, or outputs coupled to lines 315m and 315n, respectively). The dual shifter 460 may include various components that, in conjunction with the two 90° hybrid couplers 440 and 450, are operable to effect polarization shifting of signals (i.e., orthogonal RF signals at Port 1 in and Port 2 in) in the RF (or analog) domain. The polarization adjusting may mimic physical rotation of radiating elements, thereby enabling mitigation or avoidance of the interference/PIM—e.g., by selecting only the signal, of two orthogonal RF signals, that is (e.g., near) PIM-free. Example implementations of the hybrid couplers and the dual shifter (which, together, provide a transfer function that is equivalent to the formulas 202p/202r/202q for angular rotation of orthogonal RF signals) are described below with respect to FIGS. 5A-5D and 6.

In exemplary embodiments, each of the 90° hybrid couplers 440 and 450 may be reciprocal or symmetrical devices, and thus, in embodiments where the Ports 1 and 2 operate in both Tx and Rx directions (i.e., where Tx and Rx may occur simultaneously) and/or operate in multiple frequency bands (i.e., where there may be Tx and Rx occurring in each of multiple bands), each of the 90° hybrid couplers 440 and 450 may, on a given line, input and output signals across one or more frequency bands. For instance, what is shown as "Port 1 in" for the 90° hybrid coupler 440 may receive signals (Rx) and simultaneously output signals (Tx), what is shown as "Port 2 in" for the 90° hybrid coupler 440 may receive signals (Rx) and simultaneously output signals (Tx), and the two lines on the opposite end of the 90° hybrid coupler 440 may each receive and output signals (Rx and Tx).

Figure 4B:
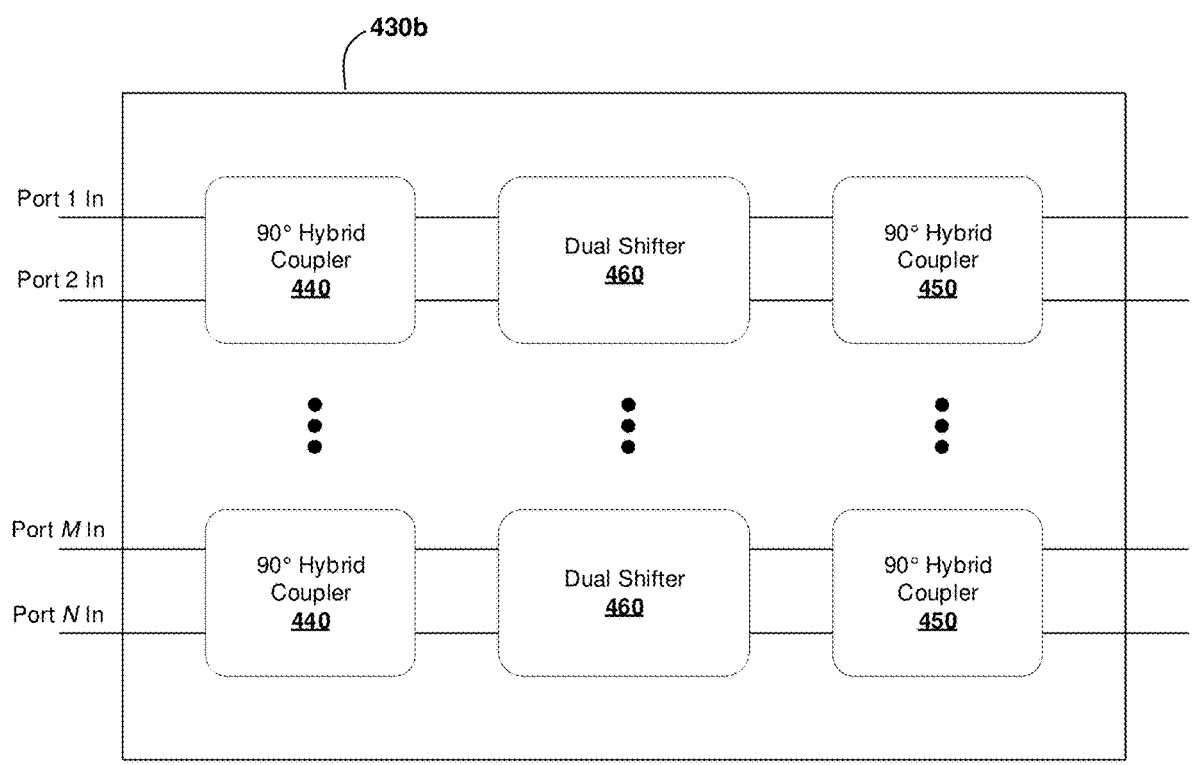
Figure 4C:
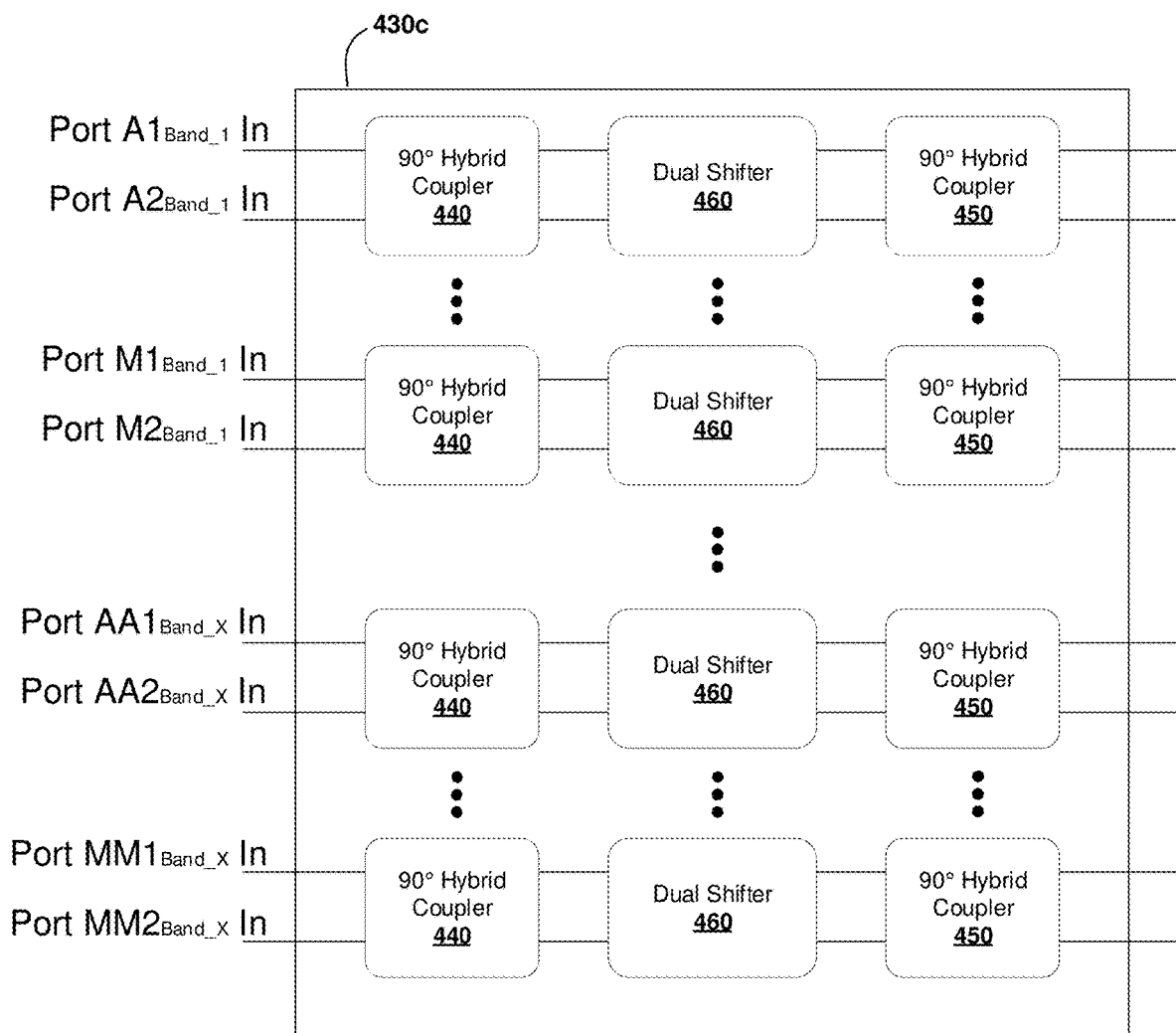
Figure 4D:
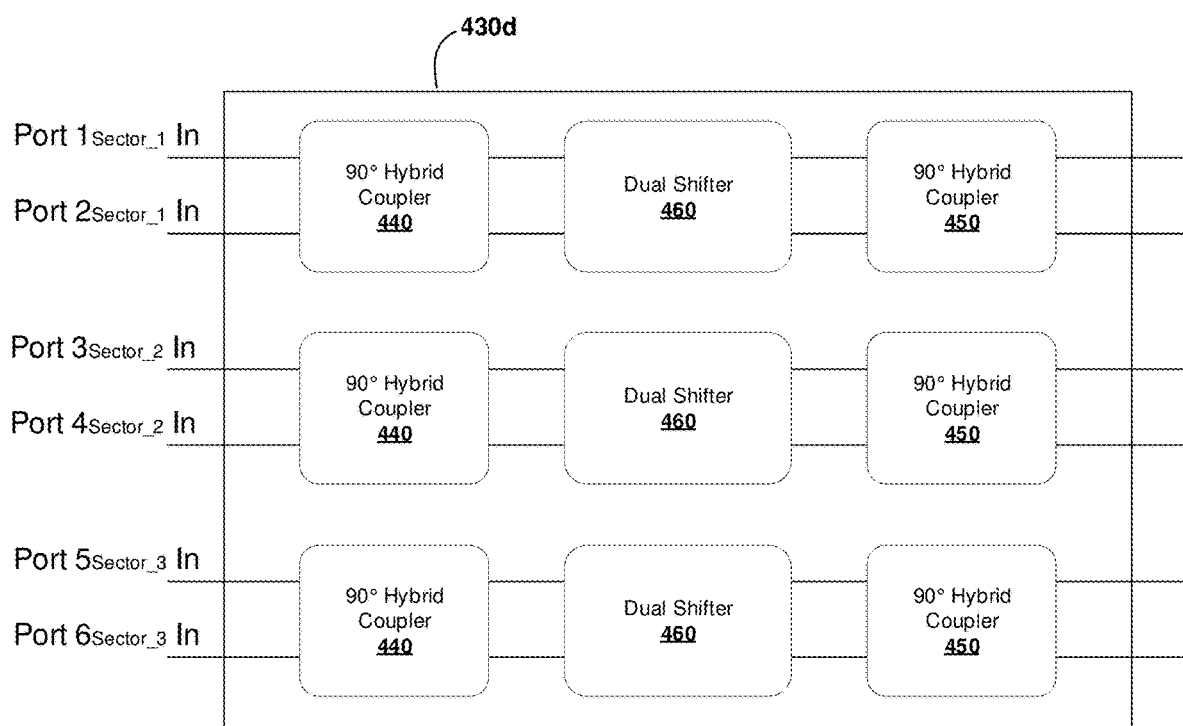
Figure 4E:
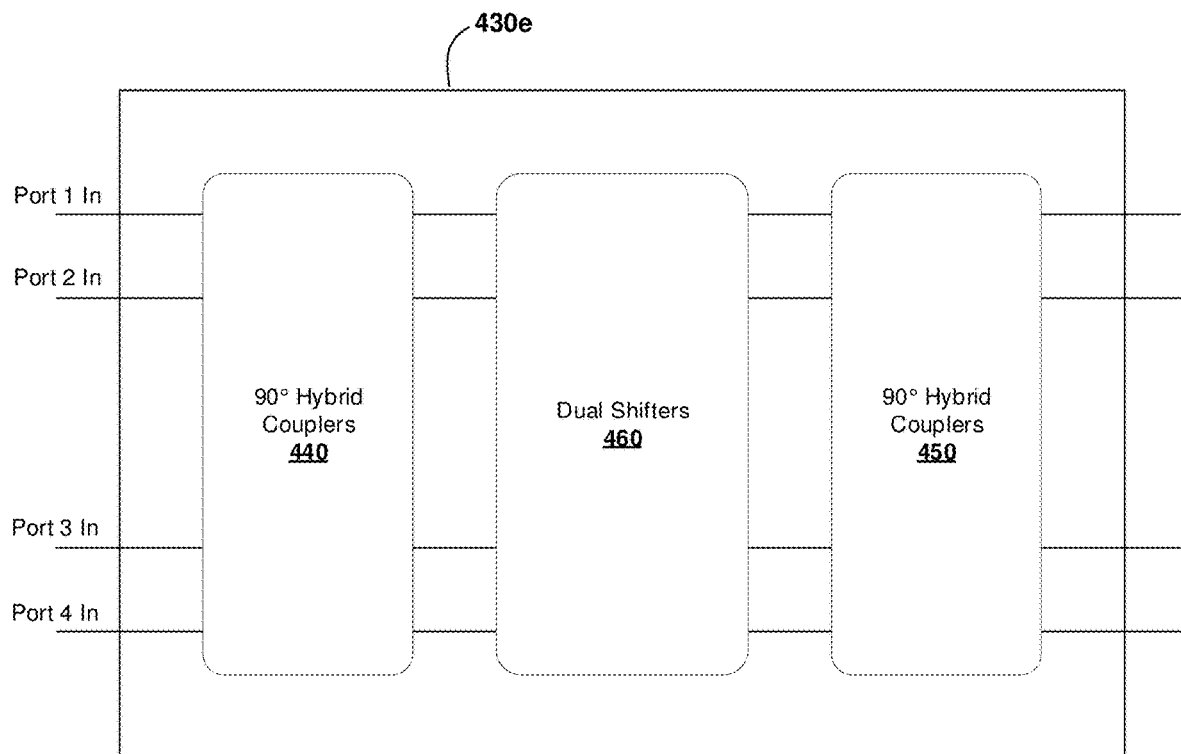

With reference to FIG. 4B, the polarization shifter 430b may be similar to the polarization shifter 430a of FIG. 4A, but may be adapted to include one or more additional (e.g., independent) sets of the 90° hybrid couplers 440 and 450 and the dual shifter 460 for one or more additional pairs of input ports and corresponding pair(s) of output ports (e.g., for each additional column of radiating elements 313). For instance, the polarization shifter 430b may be employed in a 4 Tx/Rx system. In systems where each port or RF line operates in multiple bands (e.g., 2 bands, 3 bands, etc.), the polarization shifter 430b of FIG. 4B should suffice since the interference/PIM to be addressed is likely to impact the different bands in the same or a similar manner, and thus the same polarization adjustment across all of the bands should be adequate. With reference to FIG. 4C, the polarization shifter 430c may be similar to the polarization shifter 430b of FIG. 4B, but may be adapted for multi-band communications systems where each port or RF line operates in only a single band. With reference to FIG. 4D, the polarization shifter 430*d* may be similar to the polarization shifter 430*b*, but may be adapted for use with a 3 sector site (e.g., where 3 antennas are mounted on a tower top or roof). With reference to FIG. 4E, the polarization shifter 430*e* may be similar to the polarization shifter 430*b*, but where the additional sets of the 90° hybrid couplers 440 and 450 and the dual shifter 460 are implemented in individual constructions—i.e., a construction that includes multiple 90° hybrid couplers 440, a construction that includes multiple 90° hybrid couplers 450, and a construction that includes multiple dual shifters 460. Here, one or more of the constructions may be implemented in multiple stages, and polarization adjusting may, via these stages, be selectively effected on some or all of the RF lines (e.g., 2 of 4 RF lines or all 4 RF lines) simultaneously.

Figure 4F:
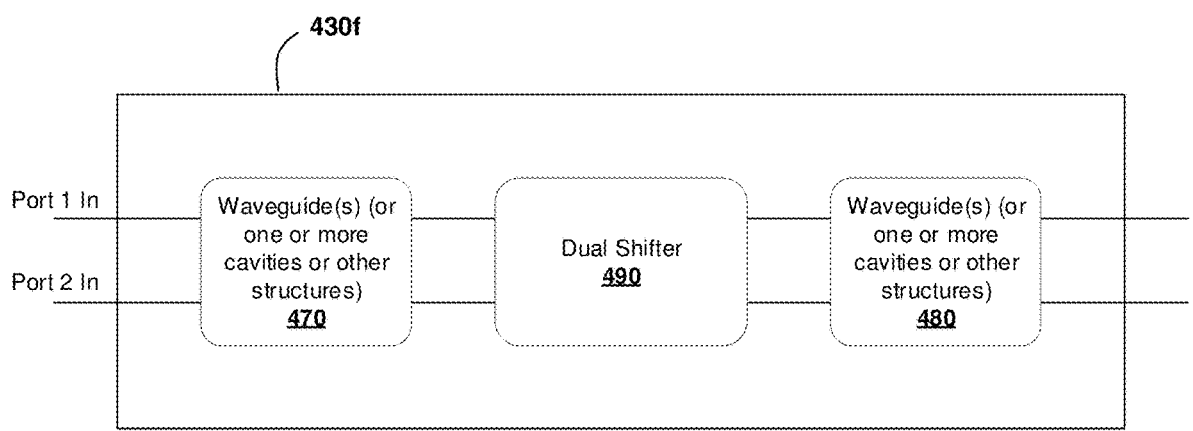

It is to be appreciated and understood that the quantities of the couplers, dual shifters, and lines/ports shown in each of FIGS. 4A-4E are merely exemplary. That is, the polarization shifters in FIGS. 4A-4E may each include any number of (e.g., more or fewer) hybrid couplers 440, hybrid couplers 450, dual shifters 460, and lines/ports. Further, some of these devices/components may be combined with one another or with other devices/components. For instance, a given 90° hybrid coupler may be formed in combination with a dual shifter 460. Furthermore, other types of couplers, such as 180° hybrid couplers (e.g., two or more 180° hybrid couplers along with a dual shifter 460), may alternatively be used or may be used in combination with one or more 90° hybrid couplers and dual shifters. Moreover, as described in more detail below, certain polarization shifter embodiments may be configured with strip lines, which may be applicable to certain narrowband applications (e.g., where the bandwidth ratio relative to a center frequency can be up to 15%). However, other constructions applicable to wideband applications (e.g., where the bandwidth ratio relative to a center frequency can be up to 40%) are also possible. For instance, FIG. 4F is a block diagram of an example, non-limiting embodiment of a (e.g., broadband) polarization shifter 430*f* that is similar to the polarization shifter 430*a*, but that is implemented using a dual shifter 490, one or more waveguides, cavities, or other structures 470, and one or more waveguides, cavities, or other structures 480. In certain embodiments, the dual shifter 490 may be also implemented using one or more waveguides, cavities or other structures. In any case, various polarization shifter configurations similar to those shown in FIGS. 4B-4E may also be provided based on the construction shown in FIG. 4F. Additionally, the polarization shifter 430*f* may include any number of (e.g., more or fewer) waveguide(s) (or cavities/structures), dual shifters, and lines/ports than that shown.

Figure 5A:
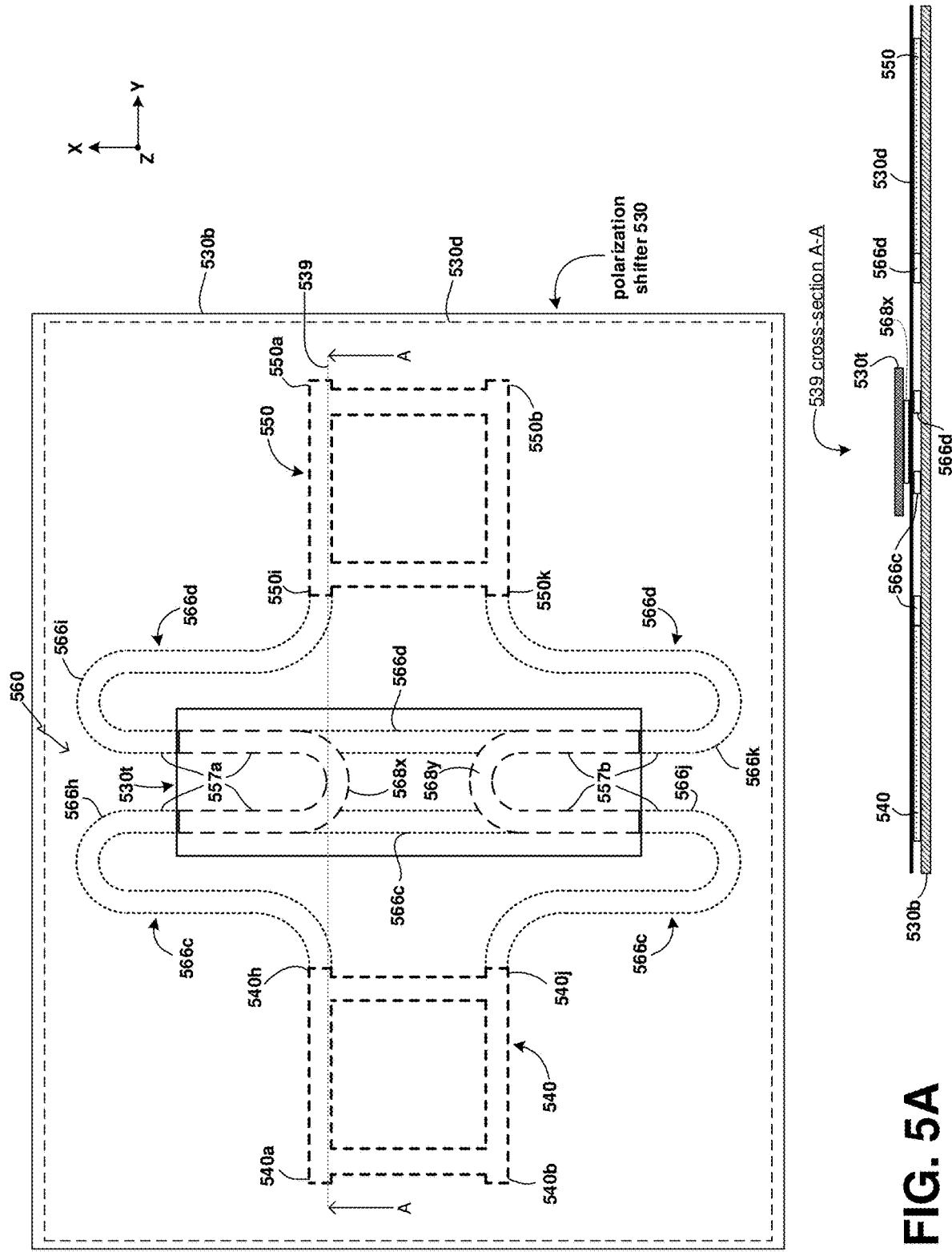
FIGS. 5A-5D show views of various portions of an example, non-limiting embodiment of a polarization shifter of an RPM in accordance with various aspects described herein.
Figure 5B:
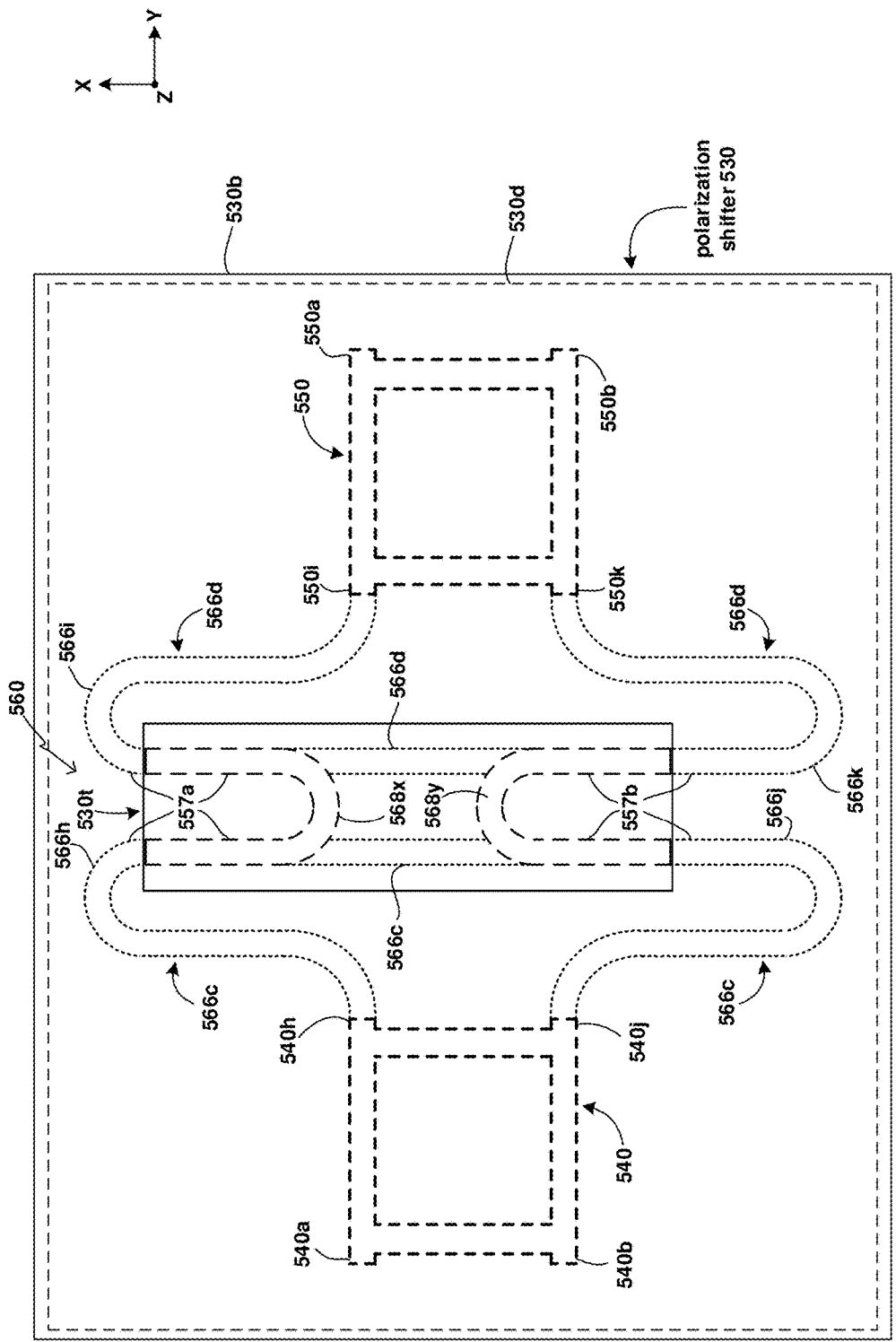
Figure 5C:
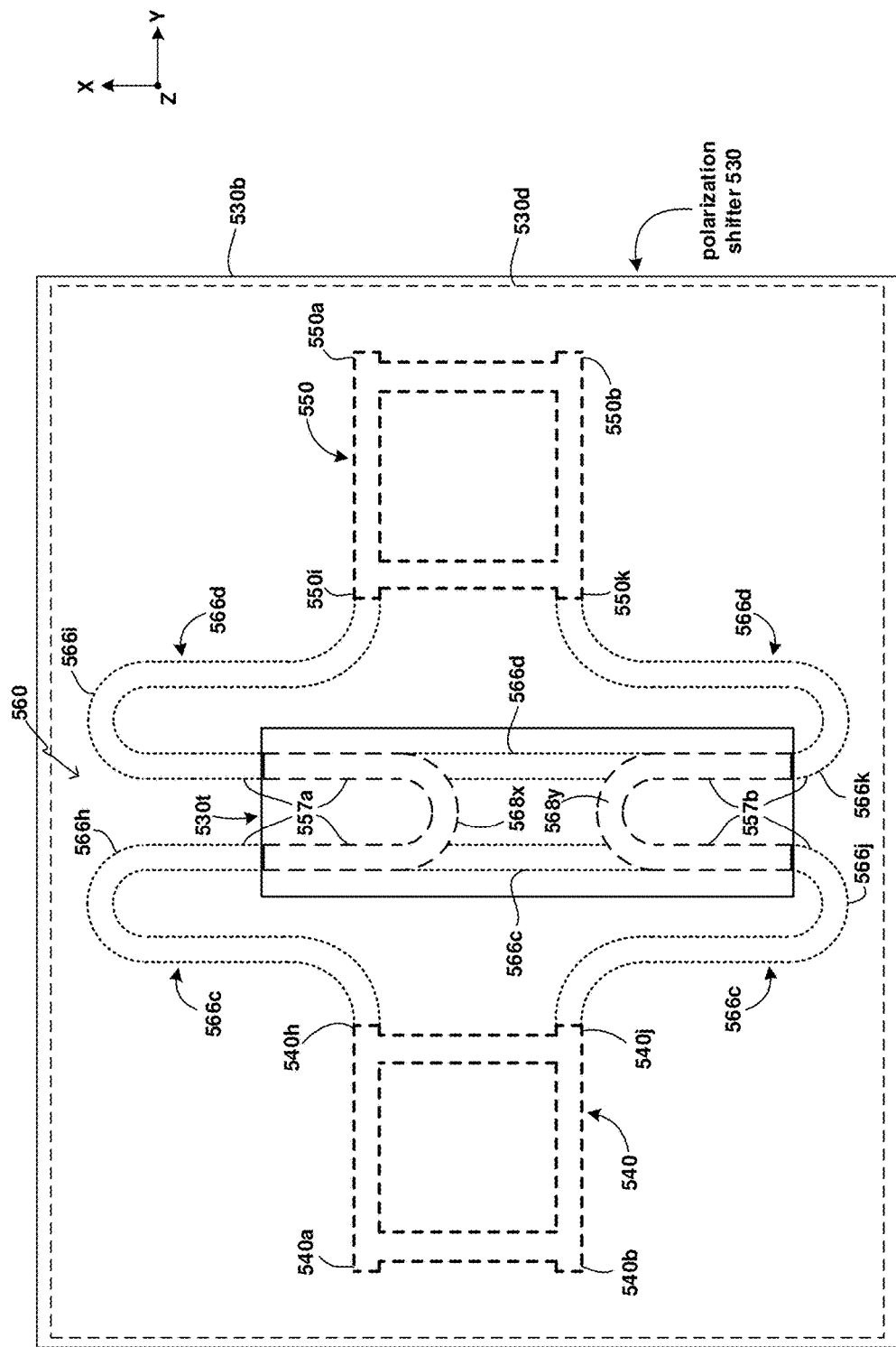

FIGS. 5A-5D show views of various portions of an example, non-limiting embodiment of a polarization shifter 530 in accordance with various aspects described herein. In various embodiments, the polarization shifter 530 may be the same as, may be similar to, or may otherwise correspond to the polarization shifter 430*a* of FIG. 4A, or may be the same as, may be similar to, or may otherwise correspond to a portion of any of the polarization shifters 430*b*, 430*c*, 430*d*, and 430*e* of FIGS. 4B-4E. As shown in FIG. 5A, the polarization shifter 530 may include a bottom (or lower) substrate 530*b*, a top (or upper) substrate 530*t*, and a (e.g., thin) dielectric layer 530*d* disposed between the two substrates 530*b* and 530*t*.

Figure 5D:
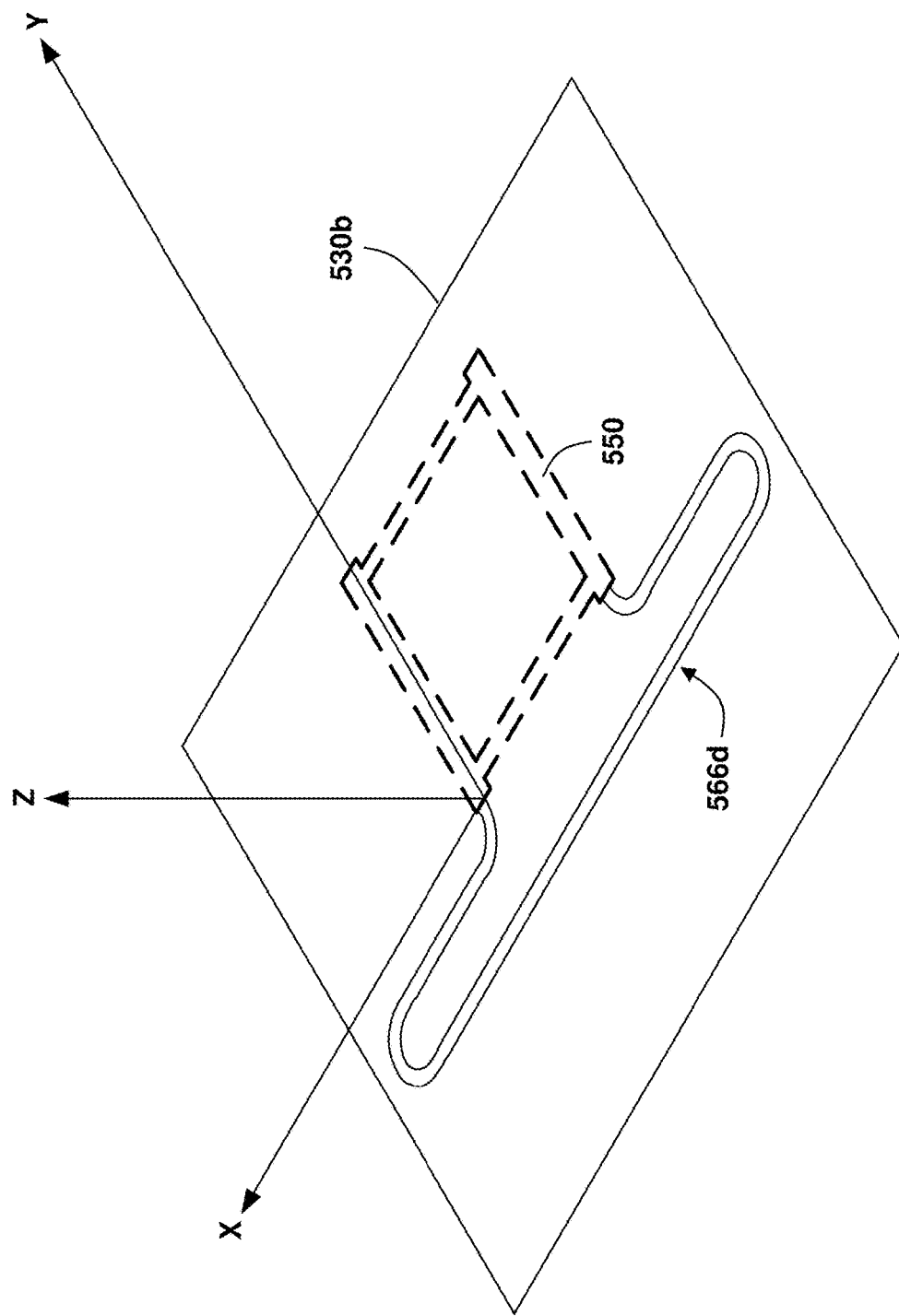

The bottom substrate 530*b* may include two transmission lines 566*c* and 566*d* disposed thereon—i.e., on an upper surface of the bottom substrate 530*b*. Each of the transmission lines 566*c* and 566*d* may be a microstrip or the like composed of conductive material, and may have one or more curved portions. FIG. 5D is a perspective view of the transmission line 566*d* disposed on the bottom substrate 530*b*.

Referring to FIG. 5A, the top substrate 530*t* may include two transmission lines 568*x* and 568*y* disposed thereunder—i.e., on an undersurface of the top substrate 530*t*. Each of the transmission lines 568*x* and 568*y* may be a microstrip or the like composed of conductive material, and may have one or more curved portions. In various embodiments, the dielectric layer 530*d* may serve to couple the transmission lines 568*x* and 568*y* with the transmission lines 566*c* and 566*d*.

In various embodiments, each of the substrates 530*b* and 530*t* may be a printed circuit board (PCB) or the like. In one or more embodiments, the dielectric layer 530*d* may be composed of polytetrafluoroethylene (PTFE) or the like (e.g., Teflon tape or film), and may function as a low friction insulator/buffer between the bottom substrate 530*b* and the top substrate 530*t*. Although the bottom substrate 530*b*, the top substrate 530*t*, and the dielectric layer 530*d* are each shown to have a specific shape and particular dimensions, each of these components can have any other shape or combination of shapes and can have any suitable dimensions depending on design/performance parameters. For instance, an area of the top substrate 530*t* may be the same as, larger than, or slightly smaller than an area of the bottom substrate 530*b*.

In exemplary embodiments, the dielectric layer 530*d* may be coupled (e.g., adhesively fixed) to an undersurface of the top substrate 530*t*, and may have an area that is larger than an area of the top substrate 530*t*. In some alternate embodiments, the dielectric layer 530*d* may be coupled (e.g., adhesively fixed) to an upper surface of the bottom substrate 530*b*. In other alternate embodiments, there may be two dielectric layers 530*d*—one layer 530*d* coupled (e.g., adhesively fixed) to an undersurface of the top substrate 530*t* and another layer 530*d* coupled (e.g., adhesively fixed) to an upper surface of the bottom substrate 530*b*, which may further reduce friction between the two substrates.

As shown in FIG. 5A, the polarization shifter 530 may include a pair of hybrid couplers 540 and 550 disposed on the bottom substrate 530*b*. In exemplary embodiments, each of the hybrid couplers 540 and 550 may be a 90° hybrid coupler (e.g., a square or near square structure with about equal sides, where each side may correspond to about one signal wavelength). In alternate embodiments, one or more of the hybrid couplers 540 and 550 may be a different type of coupler, such as a 180° hybrid coupler.

As depicted, the hybrid coupler 540 may include ports 540*a*, 540*b*, 540*h*, and 540*j*, and the hybrid coupler 550 may include ports 550*a*, 550*b*, 550*i*, and 500*k*. Each of the ports 540*a*, 540*b*, 540*h*, 540*j*, 550*a*, 550*b*, 550*i*, and 550*k* may be reciprocal or duplex in that it can simultaneously function as both an input port and an output port. Each of the hybrid couplers 540 and 550 may be configured to combine portions of signals at input ports and provide combined signals at output ports. For example, where signals $s_1$ and $s_2$ are respectively fed to inputs 540*a* and 540*b* of hybrid coupler 540, the hybrid coupler 540 may combine a portion of signal $s_1$ and a portion of signal $s_2$ (rotated by 90°) for output at output 540*h* (e.g., to portion 566*h* of the transmission line 566*c*) and may combine a portion of signal $s_2$ and a portion of signal $s_1$ (rotated by 90°) for output at output 540*j* (e.g., to portion 566*j* of the transmission line 566*c*). Continuing the example, the hybrid coupler 550 may combine a portion of a resulting signal at input 550*i* and a portion of a resulting signal at input 550*k* (rotated by 90°) for output at output 550a and may combine a portion of the resulting signal at input 550k and a portion of the resulting signal at input 550i (rotated by 90°) for output at output 550b. Each of the hybrid couplers 540 and 550 may thus take an input on one port and provide an even power split thereof on two output ports with a 90° phase shift between them.

In the implementation described above with respect to FIG. 3A, the ports 540a and 540b of the hybrid coupler 540 may be communicatively coupled to a set of ports of the antenna 310 (e.g., ports 314h and 314i or ports 315h and 315i), and the ports 550a and 550b of the hybrid coupler 550 may be coupled to a set of lines interfacing the RPM 320 and the radio 340 (e.g., lines 314m and 314n or lines 315m and 315n).

In the implementation shown in FIG. 3B (where the RPM 320 is alternatively included in the antenna 310), the ports 540a and 540b of the hybrid coupler 540 may be communicatively coupled to an array of radiating elements 313 (e.g., a feed network of array 313u or a feed network of array 313v), and the ports 550a and 550b of the hybrid coupler 550 may be coupled to a set of ports of the antenna 310 (e.g., ports 314h and 314i or ports 315h and 315i).

As depicted in FIG. 5A, the transmission lines 568x and 568y may at least partially overlap the transmission lines 566c and 566d. By virtue of the overlapping as well as the close proximity of the transmission lines 568x and 568y and the transmission lines 566c and 566d, portions of the transmission lines 566c and 566d may be coupled to one another to form a coupled line 557a in the upper half of the construction and a coupled line 557b in the lower half of the construction (i.e., yielding a dual shifter 560). As shown, the coupled line 557a may include the transmission line 568x, a portion 566h of the transmission line 566c, and a portion 566i of the transmission line 566d; and the coupled line 557b may include the transmission line 568y, a portion 566j of the transmission line 566c, and portion 566k of the transmission line 566d. Each of the coupled lines 557a and 557b may behave as a line with minimal to no additional losses as compared to a single transmission line of the same length. In other words, most or all of the signal energy on the coupled line 557a may be transmitted through the coupled line 557a with little to none of the energy being lost or reflected, and similarly, most or all of the signal energy on the coupled line 557b may be transmitted through the coupled line 557b with little to none of the energy being lost or reflected.

In certain embodiments, the transmission lines 566c, 566d, 568x, and 568y may be designed and constructed (with select shapes, curvature, dimensions, etc.) such that impedance of each of the coupled lines 557a and 557b is kept matched regardless of the "rotational" position for an output line portion or regardless of a length of overlap of the "rotated" output line portion and the corresponding input line portion. The shapes and/or dimensions of the transmission lines 566c, 566d, 568x, and 568y may also be defined to minimize insertion losses and/or return losses.

Although not shown, in certain embodiments, the two coupled lines 557a and 557b may be separated by one or more ground strips (e.g., via plated through-holes in between the coupled lines 557a and 557b) in order to improve isolation between the two signal polarizations.

In exemplary embodiments, the top substrate 530t may be configured to move relative to the bottom substrate 530b in the +X/−X direction. By virtue of the partial overlapping of the transmission lines 568x and 568y on the transmission lines 566c and 566d as well as the dimensions and shapes of the transmission lines 568x and 568y (e.g., U-shapes) and the transmission lines 566c and 566d (e.g., portions thereof being parallel to one another), relative movement of the top substrate 530t and the bottom substrate 530b—resembling the sliding in/out of two trombones (hence, the descriptive "double trombone" phase shifter device)—may affect or change the coupled lines 557a and 557b and provide double simultaneous phase shifting effects to RF signals carried by these coupled lines. For instance, where signals $s_1$ and $s_2$ are respectively fed to inputs 540a and 540b of hybrid coupler 540, the difference in phase between the combined $s_1$, $s_2$ signal carried by portion 566h of the transmission line 566c and the combined $s_1$, $s_2$ signal carried by portion 566i of the transmission line 566d may change based on movement of the top substrate 530t relative to the bottom substrate 530b, and the difference in phase between the combined $s_1$, $s_2$ signal carried by portion 566j of the transmission line 566c and the combined $s_1$, $s_2$ signal carried by portion 566k of the transmission line 566d may similarly change based on movement of the top substrate 530t relative to the bottom substrate 530b. Changes in these phases may result in polarization shifting of the input signals $s_1$ and $s_2$ that mimics physical rotation of radiating element(s). In various embodiments, the amplitudes of signals on the coupled lines 557a and 557b may change in a manner similar to the cosine and sine operations in equations 202q/202r of FIGS. 2C/2D—e.g., where movement of the top substrate 530t in the +X direction in FIG. 5A may cause there to be more signal energy on the coupled line 557a than on the coupled line 557b, and thus a signal at the (e.g., output) port 550a may have a larger amplitude than a signal at the (e.g., output) port 550b.

FIG. 5A shows the top substrate 530t in a centered position relative to the bottom substrate 530b—e.g., in a zero or neutral position where there is a symmetrical overlapping of the transmission lines 568x and 568y with the transmission lines 566c and 566d, and thus symmetry between the coupled lines 557a and 557b. In exemplary embodiments, movement of the top substrate 530t may be made in increments that each corresponds to a certain angular increment or "rotation"—a 1 degree rotation per increment, 2.25 degree rotation per increment, a 3 degree rotation per increment, a 5.625 degree rotation increment, etc.—of orthogonal signals that, together, span a 90-degree range (corresponding to orthogonality of the signals). Movement of the top substrate 530t to a "maximum" position of the top substrate 530t in a +X direction (FIG. 5B) (i.e., full asymmetry between the coupled lines 557a and 557b in one direction) may correspond to a +45 degree rotation, and movement of the top substrate 530t to a "maximum" position of the top substrate 530t in a −X direction (FIG. 5C) (i.e., full asymmetry between the coupled lines 557a and 557b in the other direction) may correspond to a −45 degree rotation. In this way, the two polarizations of orthogonal RF input signals may be rotated together by the same amount by mechanically moving the top substrate 530t. That is, changing the position of the top substrate 530t may effect polarization adjusting (or a manipulation that is mathematically similar to phase rotation) of orthogonal RF signals (e.g., angle θ and thus the "weights" in equations 202q and 202r of FIGS. 2C and 2D) that mimics the physical rotation of radiating elements. In the presence of PIM or interference, there will be an optimal (or best) top substrate 530t position in which one of the orthogonal RF signals will be "rotated" such that it is (e.g., near) PIM/interference-free and the other orthogonal RF signal will be "rotated" such that it includes most or all of the PIM/interference.

It is to be appreciated and understood that the shapes and/or dimensions of the transmission lines 566c, 566d, 568*x*, and 568*y* may be defined to yield any desired extent of overlap between coupled lines when the polarization shifter 530 is operated. Thus, in certain embodiments, movement of the top substrate 530*t* may or may not result in the same overlap or coupling between the transmission line 568*x* and the transmission lines 566*c* and 566*d* (e.g., transmission line 568*x* may overlap transmission line 566*c* more or less than transmission line 566*d*), and may or may not result in the same overlap or coupling between the transmission line 568*y* and the transmission lines 566*c* and 566*d* (e.g., transmission line 568*y* may overlap transmission line 566*c* more or less than transmission line 566*d*). In exemplary embodiments, the shapes and/or dimensions of the transmission lines 566*c*, 566*d*, 568*x*, and 568*y* may be defined or adjusted such that the angle θ of rotation of orthogonal RF signals is proportional to a distance of travel of the top substrate 530*t* from its center/neutral position.

Reference number 539 of FIG. 5A shows a partial cross-sectional view of the portion of the polarization shifter 530 taken along line A-A. In exemplary embodiments, the bottom substrate 530*b* may be (e.g., a part of) a ground plane of the antenna 310.

While the partial cross-sectional view 539 of FIG. 5A shows the top and bottom substrates 530*t* and 530*b* and the dielectric layer 530*d* as being separated from one another based on the dimensions of the various transmission lines, in certain embodiments, some or all of the transmission lines may be at least partially embedded in a surface of the respective substrate. In these embodiments, the top and bottom substrates 530*t* and 530*b* may be in contact with one another, separated only by the dielectric layer 530*d*.

Although not shown, in some embodiments, one or more of the transmission lines 566*c* and 566*d* may further extend (or may couple with one or more other lines that extend) beyond the portion of the bottom substrate 530*b* shown. In one or more embodiments, the transmission lines 566*c* and 566*d* may be coupled to the control unit 321*c* and/or the monitoring/detection unit 321*d* (e.g., via respective connection lines).

In various embodiments, a respective polarization shifter 530 may be coupled to each column of radiating elements of an antenna. In the example implementation of the antenna 310 shown in FIG. 3A, for instance, a first polarization shifter 530 may be coupled to the array 313*u* of radiating elements (e.g., ports 540*a* and 540*b* of the first polarization shifter 530 may be respectively coupled to ports 314*h* and 314*i*), and a second polarization shifter 530 may be coupled to the array 313*v* of radiating elements (e.g., ports 540*a* and 540*b* of the second polarization shifter 530 may be respectively coupled to ports 315*h* and 315*i*).

FIG. 6 shows views of an example, non-limiting embodiment of a polarization shifter 630 in accordance with various aspects described herein. In various embodiments, the polarization shifter 630 may be the same as, may be similar to, or may otherwise correspond to the polarization shifter 430*a* of FIG. 4A, or may be the same as, may be similar to, or may otherwise correspond to a portion of any of the polarization shifters 430*b*, 430*c*, 430*d*, and 430*e* of FIGS. 4B-4E. In one or more embodiments, the polarization shifter 630 may be similar to the polarization shifter 530 (various aspects of the polarization shifter 530 may be the same for the polarization shifter 630), but may be mechanically adjustable in a rotational manner (rather than in a linear manner). As shown in FIG. 6, the polarization shifter 630 include a bottom (or lower) substrate 630*b*, a top (or upper) substrate 630*t*, and a (e.g., thin) dielectric layer 630*d* disposed between the two substrates 630*b* and 630*t*.

As shown in FIG. 6, the polarization shifter 630 may include a pair of hybrid couplers 640 and 650 disposed on the bottom substrate 630*b*. In exemplary embodiments, each of the hybrid couplers 640 and 650 may be a 90° hybrid coupler similar to that of the polarization shifter 530. However, a portion of each of the hybrid couplers 640 and 650 may be adapted to include or couple to a curved (e.g. semicircular) transmission line—i.e., transmission lines 666*c* and 666*d*. Each of the transmission lines 666*c* and 666*d* may be a microstrip or the like composed of conductive material.

As shown in FIG. 6, the top substrate 630*t* may include two transmission lines 668*x* and 668*y* disposed thereunder—i.e., on an undersurface of the top substrate 630*t*. Each of the transmission lines 668*x* and 668*y* may be a microstrip or the like composed of conductive material, and may have one or more curved portions.

Although the bottom substrate 630*b*, the top substrate 630*t*, and the dielectric layer 630*d* are each shown to have a specific shape and particular dimensions, each of these components can have any other shape or combination of shapes and can have any suitable dimensions depending on design/performance parameters. For instance, an area of the top substrate 630*t* may be the same as, larger than, or slightly smaller than an area of the bottom substrate 630*b*.

As depicted in FIG. 6, the transmission lines 668*x* and 668*y* may at least partially overlap the transmission lines 666*c* and 666*d*. By virtue of the overlapping as well as the close proximity of the transmission lines 668*x* and 668*y* and the transmission lines 666*c* and 666*d*, portions of the transmission lines 666*c* and 666*d* may be coupled to one another to form a coupled line 657*a* in the upper half of the construction and a coupled line 657*b* in the lower half of the construction (i.e., yielding a dual shifter 660). As shown, the coupled line 657*a* may include the transmission line 668*x*, a portion of the transmission line 666*c*, and a portion of the transmission line 666*d*; and the coupled line 657*b* may include the transmission line 668*y*, a portion of the transmission line 666*c*, and portion of the transmission line 666*d*.

In exemplary embodiments, the top substrate 630*t* may be configured to move rotationally relative to the bottom substrate 630*b* in the XY plane. By virtue of the partial overlapping of the transmission lines 668*x* and 668*y* on the transmission lines 666*c* and 666*d* as well as the dimensions and shapes of the transmission lines 668*x* and 668*y* (e.g., arch or semicircular shapes) and the transmission lines 666*c* and 666*d*, rotational movement of the top substrate 630*t* relative to the bottom substrate 630*b* may affect or change the coupled lines 657*a* and 657*b* and provide double simultaneous phase shifting effects to RF signals carried by these coupled lines similar to that described above with respect to the polarization shifter 530. Changes in these phases may result in polarization shifting of input signals that mimics physical rotation of radiating element(s).

FIG. 6 shows the top substrate 630*t* in a particular orientation relative to the bottom substrate 630*b*—e.g., in a zero or neutral position where there is a symmetrical overlapping of the transmission lines 668*x* and 668*y* with the transmission lines 666*c* and 666*d*, and thus symmetry between the coupled lines 657*a* and 657*b*. In exemplary embodiments, rotational movement of the top substrate 630*t* may be made in increments that each corresponds to a certain angular increment or "rotation"—a 1 degree increment, 2.25 degree increment, a 3 degree increment, a 5.625 degree rotation, etc.—of orthogonal signals that, together, span a 90-degree range (corresponding to orthogonality of the signals). Movement of the top substrate 630*t* to a "maximum" position of the top substrate 630b in a clockwise direction may correspond to a +45 degree rotation, and rotational movement of the top substrate 630t to a "maximum" rotational position of the top substrate 630b in a counterclockwise direction may correspond to a −45 degree rotation. In this way, the two polarizations of orthogonal RF input signals may be rotated together by the same amount by mechanically rotating the top substrate 630b. That is, changing the position of the top substrate 630b may effect polarization adjusting (or a manipulation that is mathematically similar to phase rotation) of orthogonal RF signals (e.g., angle θ and thus the "weights" in equations 202q/202r of FIGS. 2C/2D) that mimics the physical rotation of radiating elements. In the presence of PIM or interference, there will be an optimal (or best) top substrate 630t position or orientation in which one of the orthogonal RF signals will be "rotated" such that it is (e.g., near) PIM/interference-free and the other orthogonal RF signal will be "rotated" such that it includes most or all of the PIM/interference.

Reference number 639 of FIG. 6 shows a partial cross-sectional view of the portion of the polarization shifter 630 taken along line B-B. In exemplary embodiments, the bottom substrate 630b may be (e.g., a part of) a ground plane of the antenna 310.

Figure 7A:
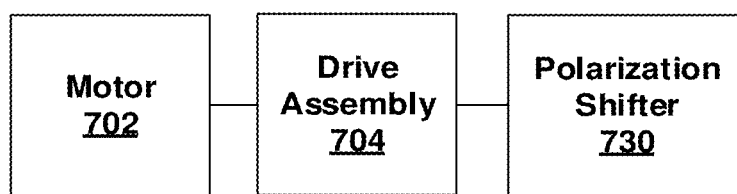
FIG. 7A is a block diagram of an example, non-limiting embodiment of a polarization shifter of an RPM in operation with a motor and a drive assembly in accordance with various aspects described herein.

In exemplary embodiments, mechanical movement of a polarization shifter (e.g., the polarization shifter 530 or the polarization shifter 630) may be achieved via control of a motorized device and a drive assembly. FIG. 7A is a block diagram of an example, non-limiting embodiment of a polarization shifter 730 in operation with a motor 702 and a drive assembly 704 in accordance with various aspects described herein.

In various embodiments, the polarization shifter 730 may be the same as, may be similar to, or may otherwise correspond to the polarization shifter 530 of FIG. 5A, or may be the same as, may be similar to, or may otherwise correspond to the polarization shifter 630 of FIG. 6. In various embodiments, the motor 702 may be communicatively coupled with a control unit, such as any of the control units 321c of FIGS. 3A-3C, over any suitable interface— e.g., a Serial Peripheral Interface (SPI), a Recommended Standard interface (e.g., RS-232 or the like), a Universal Serial Bus (USB) interface, and/or the like. The motor 702 may be configured to transmit force(s) to the drive assembly 704 based on commands received from the control unit 321c.

An RPM may include any desired number of motors 702 and drive assemblies 704. For instance, in some embodiments, an RPM 220 or 320 may include a motor 702 and a drive assembly 704 for each polarization shifter, such as one motor 702 and one drive assembly 704 for a first polarization shifter 530, another motor 702 and another drive assembly 704 for a second polarization shifter 530, and so on. As an example, a respective motor 702 and a respective drive assembly 704 may be arranged for each pair of RF lines in a 4 Tx/Rx system (e.g., FIG. 4B). In other embodiments, an RPM 220 or 320 may include a single motor 702 and one or more drive assemblies 704 coupled to the various polarization shifters. In these embodiments, the single motor 702 may include, or may be integrated with, one or more (e.g., electronic) gears and/or latches, such as relay(s), contactor(s), solenoid(s), and/or the like, to enable differing linear/rotational movements of components/substrates of the polarization shifters. In certain embodiments, the control unit 321c, the monitoring/detection unit(s) 321d, and one or more motors 702 may be implemented in a single, integrated construction.

Figure 7B:
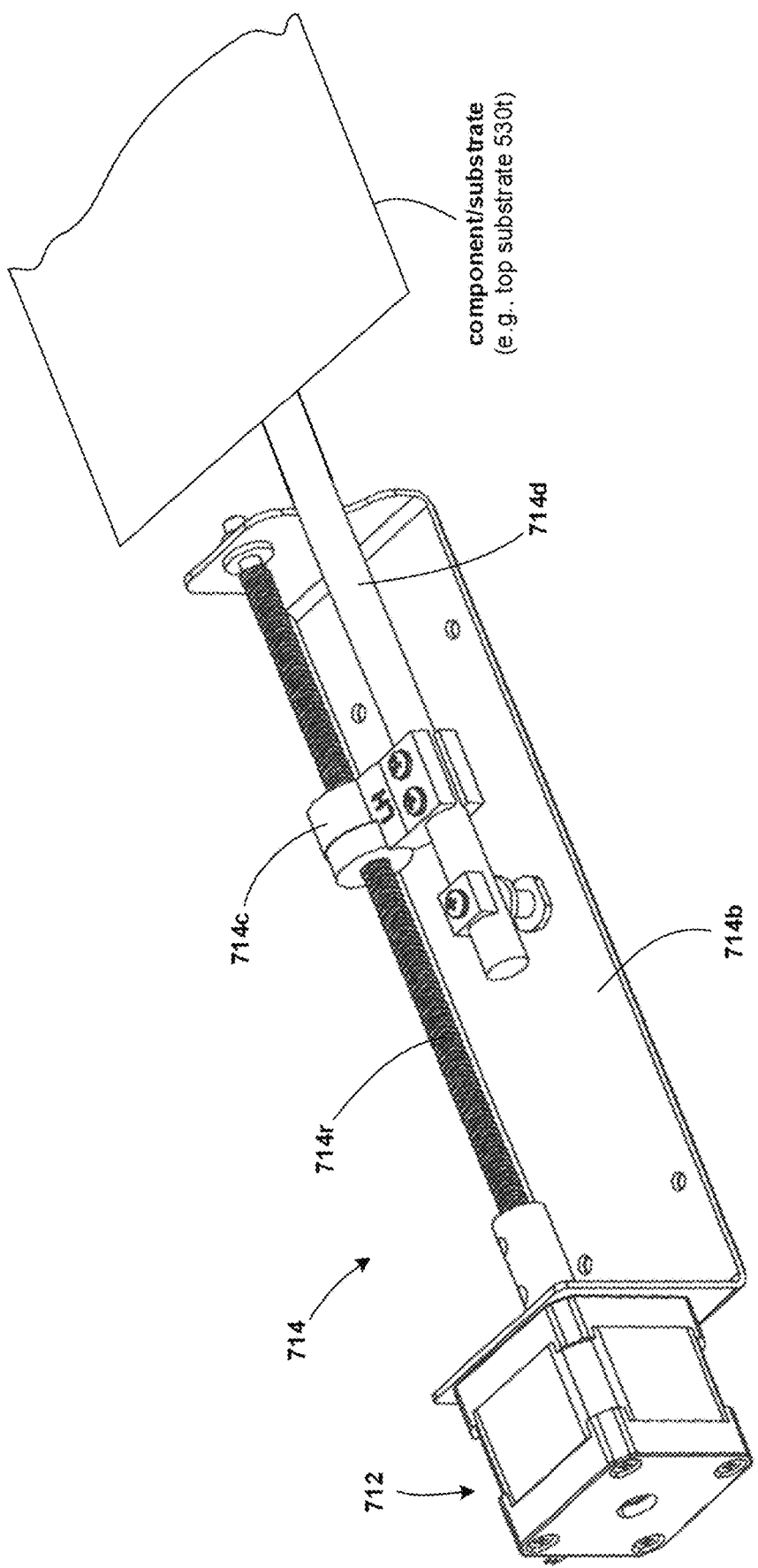
FIG. 7B is a perspective view of an example, non-limiting embodiment of a motor and a drive assembly adapted to provide linear forces to a polarization shifter in accordance with various aspects described herein.

FIG. 7B is a perspective view of an example, non-limiting embodiment of a motor 712 and a drive assembly 714 adapted to provide linear forces in accordance with various aspects described herein. As shown in FIG. 7B, the motor 712 may be configured to transmit forces to the drive assembly 714 via a threaded rod 714r. The drive assembly 714 may include a control rod 714d and a carriage/carrier 714c. The carriage 714c may be threadably coupled to the threaded rod 714r, which may be secured to a bracket 714b. Rotation of the motor 712 (e.g., clockwise or counterclockwise) may correspondingly turn the threaded rod 714r, and thus the carriage 714c, and cause the control rod 714d to move linearly with respect to the threaded rod 714r. With a portion of the control rod 714d coupled to a component/substrate, such as a portion of the top substrate 530t of the polarization shifter 530, linear movement of the control rod 714d may impart linear force to the substrate 530t (e.g., in the +X/−X directions shown in FIG. 5A) to thereby effect polarization shifting/adjusting.

Figure 7C:
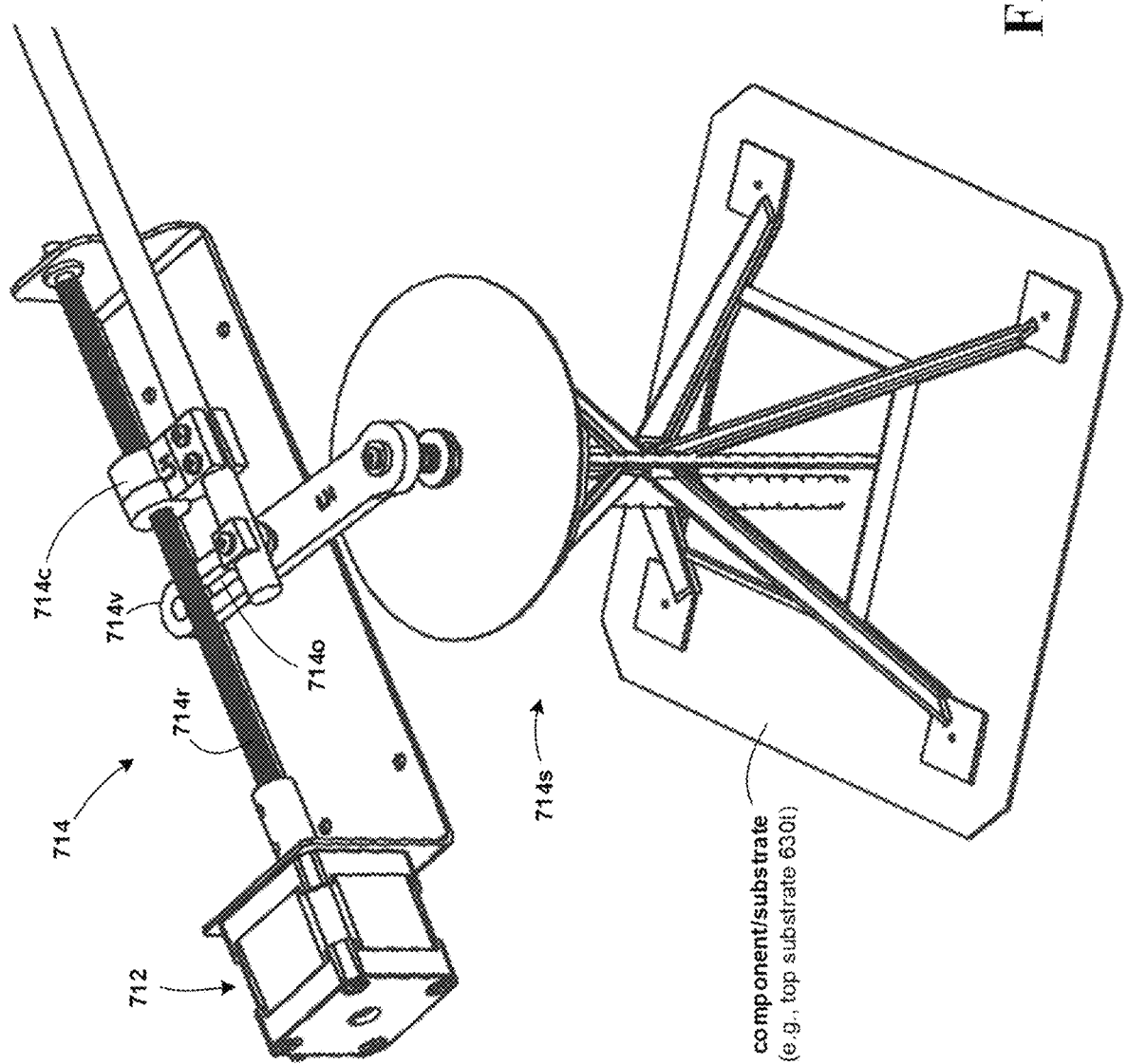
FIG. 7C is a perspective view of an example, non-limiting embodiment of the motor and the drive assembly of FIG. 7B adapted to provide rotational forces to a polarization shifter in accordance with various aspects described herein.

FIG. 7C is a perspective view of an example, non-limiting embodiment of the motor 712 and the drive assembly 714 adapted to provide rotational forces in accordance with various aspects described herein. As shown in FIG. 7C, the drive assembly 714 may be adapted to include a slotted lever 714v coupled to the control rod 714d. A rotatable structure 714s may be coupled, at one end, to the slotted lever 714v, and, at another end, to a substrate, such as the top substrate 630t of the polarization shifter 630. Here, rotation of the motor 712 (e.g., clockwise or counterclockwise) may correspondingly turn the threaded rod 714r, and thus the carriage 714c, and cause the control rod 714d to move linearly with respect to the threaded rod 714r. With the control rod 714d coupled to a slot 714o of the slotted lever 714v, movement of the control rod 714d may impart rotational force to the rotatable structure 714s and thus the top substrate 630t (e.g., in the XY plane shown in FIG. 6) to thereby effect polarization shifting/adjusting.

Figure 8A:
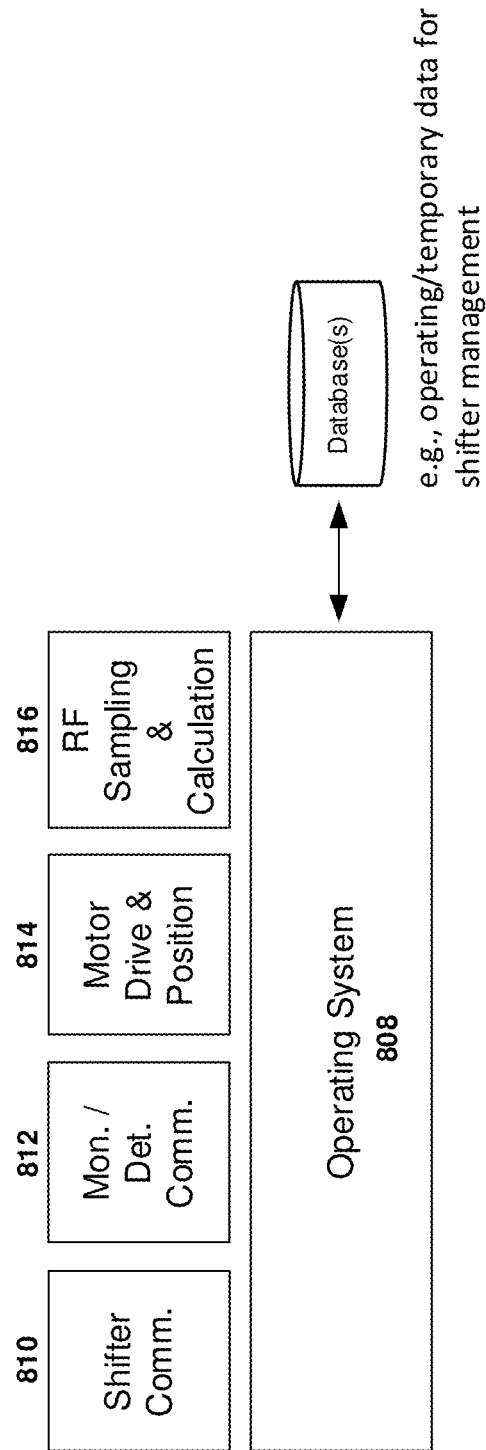
FIG. 8A is a block diagram of an exemplary, non-limiting embodiment of a functional architecture of a control unit of an RPM in accordance with various aspects described herein.

FIG. 8A is a block diagram of an exemplary, non-limiting embodiment of a functional architecture of the control unit 321c in accordance with various aspects described herein. In exemplary embodiments, the control unit 321c may be configured to obtain/read power level(s) of orthogonal signals from the monitoring/detection unit(s) 321d, calculate average power value(s), analyze the calculations, select an optimal (or best) component/substrate position (e.g., the best linear position of the top substrate 530t of the polarization shifter 530 or the best rotational position of the top substrate 630t of the polarization shifter 630) based on the analysis, and/or control motion of the motor(s) 702 to facilitate interference/PIM mitigation or avoidance.

In some embodiments, the control unit 321c may be equipped with an operating system (OS) 808 configured to manage power state (e.g., idle, active, etc.), memory allocation, software updates, system and default data configuration, interrupt management and time-sharing execution of tasks, etc. In certain embodiments, the OS may be configured to manage and control various (e.g., modular) functionality relating to the RPM 220 or 320. Example functionality may include shifter communication functionality 810, monitoring/detection unit communication functionality 812, motor driver and positioning functionality 814, and/or monitoring/detection sampling/calculation functionality 816. It is to be appreciated and understood that the various functionality may be implemented in any suitable manner (in a modular manner or a non-modular manner), and may be used or combined with other additional functionality not shown.

In various embodiments, the shifter communication function 810 may provide the necessary functions for exchanging messages with an external source, such as, a user computing device, an automated system, and/or another device/system to configure/manage orthogonal signal power readings/measurements, monitor system performance, etc. The function 810 may employ any suitable communication protocol, such as, for example, Transmission Control Protocol/Internet Protocol (TCP/IP), RS485 serial, User Datagram Protocol (UDP), and/or the like.

In various embodiments, the monitoring/detection unit communication function 812 may provide the necessary functions for exchanging messages with the monitoring/detection unit(s) 321d to configure/manage detector settings, receive detector errors, obtain power readings/measurements, etc. The function 812 may employ any suitable communication protocol, such as, for example, USB, SPI, RS485 serial, and/or the like.

In various embodiments, the motor driver and positioning function 814 may be configured to control rotary motion of the motor(s) 702, speed of the motor(s) 702, and/or displacement or distance of travel of the motor(s) 702. Positioning functionality (or circuitry) may monitor and validate motor movements relative to desired component/substrate positions.

In various embodiments, the monitoring/detection sampling/calculation functionality 816 may sample RF voltage detection outputs provided by the monitoring/detection unit(s) 321d, calculate the optimal (e.g., best) component/substrate position(s), and provide instructions to the motor driver and positioning function 814 to move the motor(s) 702 accordingly.

The following is an overview of an exemplary implementation for mitigating or avoiding PIM or interference. PIM, for instance, generally does not have random characteristics, but is rather highly-directionally polarized in space. Depending on the orientation of the PIM source, the polarizations of orthogonal RF signals may be shifted or adjusted to facilitate avoidance of the PIM. For example, in the RPM 220, for a given pair of orthogonal RF signals, power measurements (e.g., peak, average, and/or root mean square) may be made for each signal in the pair, and a ratio of the two measurements may be calculated to identify the PIM. Where there is no PIM or interference in the signals, the measurements are expected to be essentially equal. However, in the presence of PIM or interference, there will be an optimal (or best) "rotation" (or orientation) of the orthogonal RF signals where one of the orthogonal signals becomes/is (e.g., near) PIM/interference-free and the other orthogonal signal includes most or all of the PIM/interference. In implementations of the RPM 220 or 320, a component/substrate (e.g., the top substrate 530t of the polarization shifter 530 or the top substrate 630t of the polarization shifter 630) can be incrementally moved to occupy different positions in a continuous or sequential manner, and signal power measurements may be made at each of the incremental steps to identify the optimal (or best) component/substrate position.

Figure 8B:
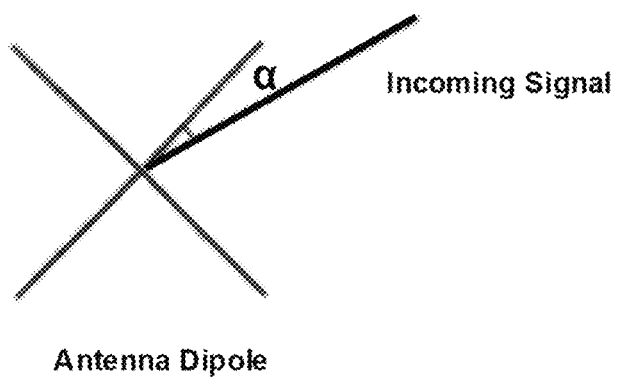
FIG. 8B illustrates a radiating element and an incoming signal in accordance with various aspects described herein.

In exemplary embodiments, identifying an angle of incoming interference/PIM enables effective mitigation or avoidance thereof. FIG. 8B illustrates a crossed-dipole radiating element and an incoming signal in accordance with various aspects described herein. Orthogonal RF signals received by each dipole element of the dipole pair may be inputted to the RPM 220 or 320 (and, e.g., detected by a monitoring/detection unit 321d). As depicted in FIG. 8B, relative polarization angle α is the angle between the incoming linearly-polarized signal and one of the dipole elements (and thus the angle relative to one of the orthogonal signals). The power of each of the orthogonal signals may be proportional to both an amplitude A of the incoming signal and the angle α, and therefore, may not be effectively used to determine the angle α unless the amplitude A is known:

$$P(-45)=A*\sin(\alpha); \text{ and}$$

$$P(+45)=A*\cos(\alpha).$$

In fact, even if multiple power measurements of the incoming signal are taken at different polarization angles, it would still be difficult to accurately determine the smallest angle α, since the amplitude A of the signal might change due to varying traffic during the measurement period. However, by (e.g., simultaneously) measuring the signal power of both orthogonal signals, and computing the ratio of the power levels, the result will not be affected by the signal amplitude A, but (e.g., only) by the polarization angle:

$$P(+45)/P(-45)=A*\cos(\alpha)/A*\sin(\alpha)=\cot(\alpha).$$

Therefore, the largest power ratio will indicate the smallest angle α regardless of signal amplitude A. Since, for linearly-polarized signals, the angle α is fairly constant over time and amplitude variations, different kinds of power measurements may be made (such as root mean square (RMS), peak, instantaneous, average, or a combination of one or more of these kinds of power measurements), so long as both polarizations are measured simultaneously and using the same measurement method. When measuring the power of a communication signal in the field environment, care must generally be taken to detect only the signal of interest and avoid contributions from any overlapping or adjacent signals. A narrow bandwidth power detector may be employed in various embodiments to enable such selective detection.

Figure 8C:
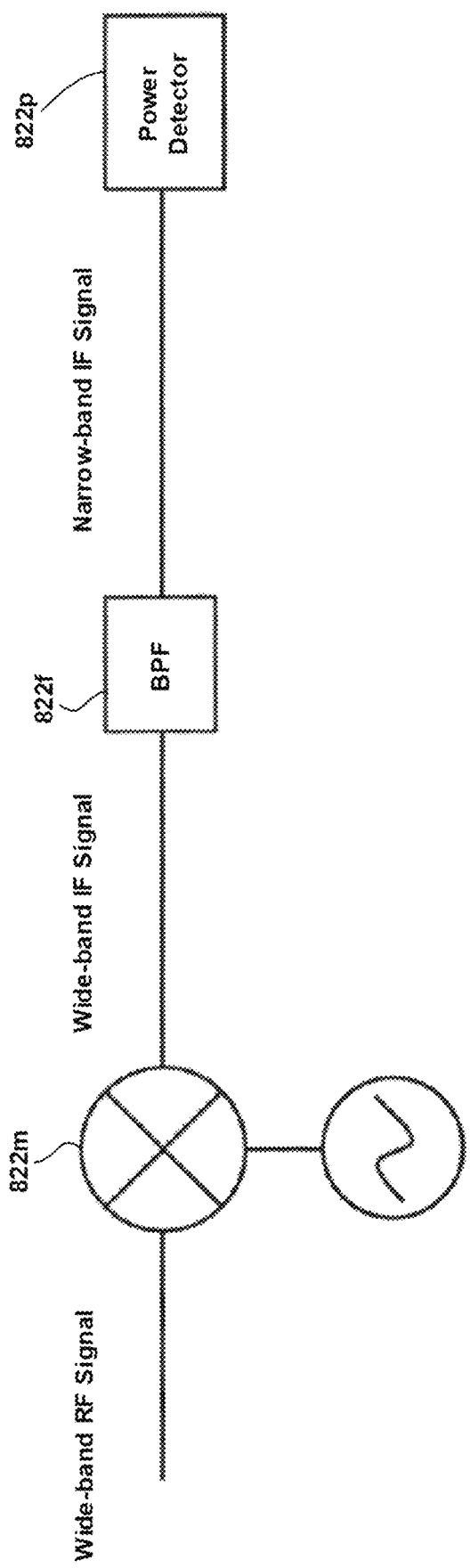
FIG. 8C is a block diagram of an exemplary, non-limiting implementation of a monitoring/detection unit of an RPM in accordance with various aspects described herein.

FIG. 8C is a block diagram of an exemplary, non-limiting implementation of the monitoring/detection unit 321d in accordance with various aspects described herein. In exemplary embodiments, the implementation 822d may be a polarization alignment detector system/circuit, or more particularly, a narrow bandwidth power detector 822d, that enables differential power measurements to be made for determining the relative polarization angle α.

In various embodiments, the narrow bandwidth power detector 822d may include a (e.g., standard commercially available) power detector 822p configured to measure power only over a selected, narrow portion of the signal without external interference. Because RF power detectors generally do not discriminate between signals in the frequency spectrum (they detect a very wide range of frequencies, such as several GHz-wide), the implementation 822d may include a high rejection, narrow bandwidth band-pass filter 822f in front of the power detector 822p to provide a narrow detection range. To add frequency selectivity to the system, the narrow bandwidth band-pass filter 822f may be designed or chosen to be selective in the intermediate frequency (IF) band, and a down-converter mixer 822m may be utilized to translate the RF frequency of interest to the pass-band of the filter 822f. Adjustments to the local oscillator (LO) frequency of the down-converter mixer 822m may enable narrow bandwidth power measurements to be made at different frequencies. As the power detector 822p is configured to operate across the same narrow bandwidth of the band-pass filter 822f, the overall system/circuit 822d provides suitable stability.

PIM occurs when two or more signals are present in passive (mechanical) components of a wireless system.

Figure 8D:
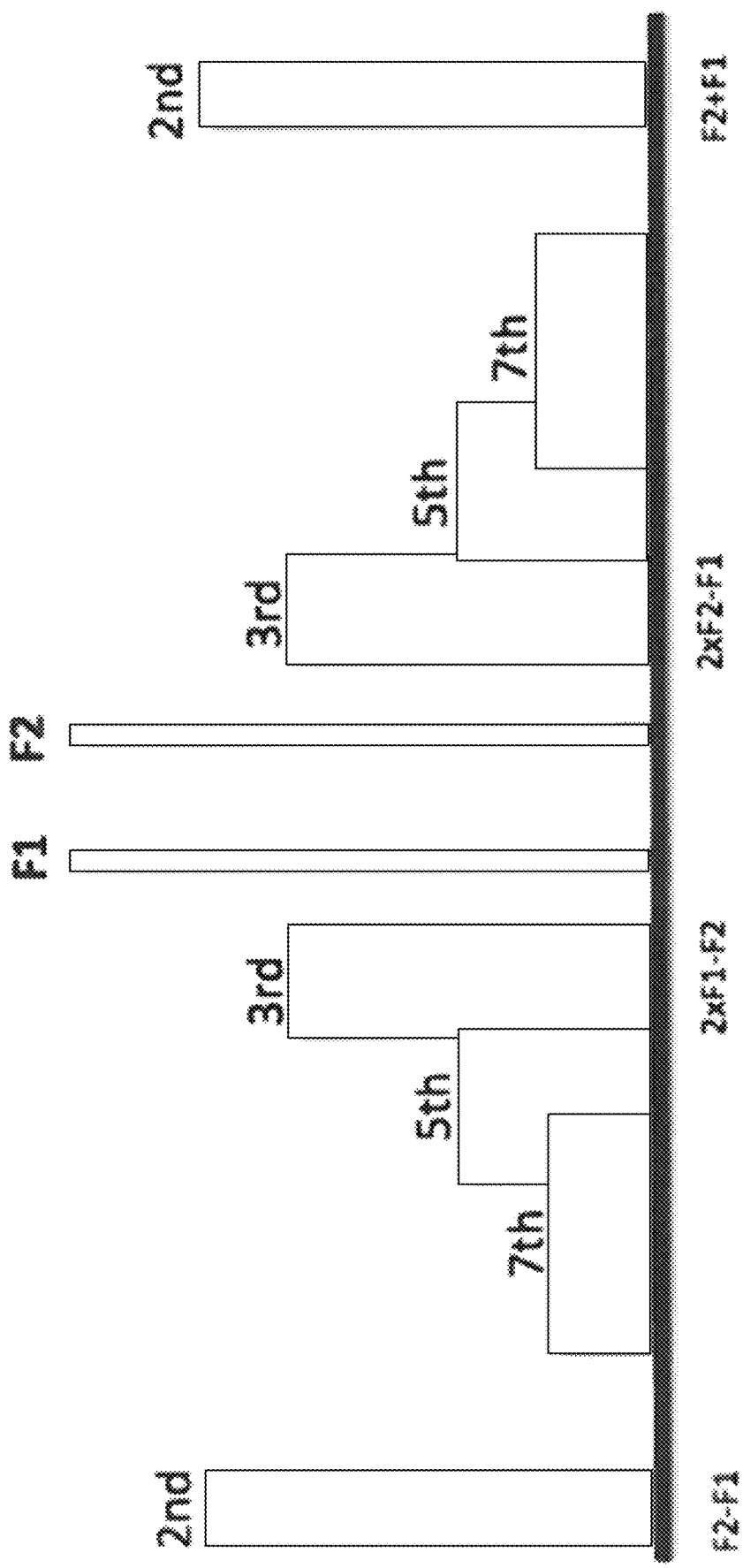
FIGS. 8D and 8E illustrate identification of PIM polarization in accordance with various aspects described herein.
Figure 8E:
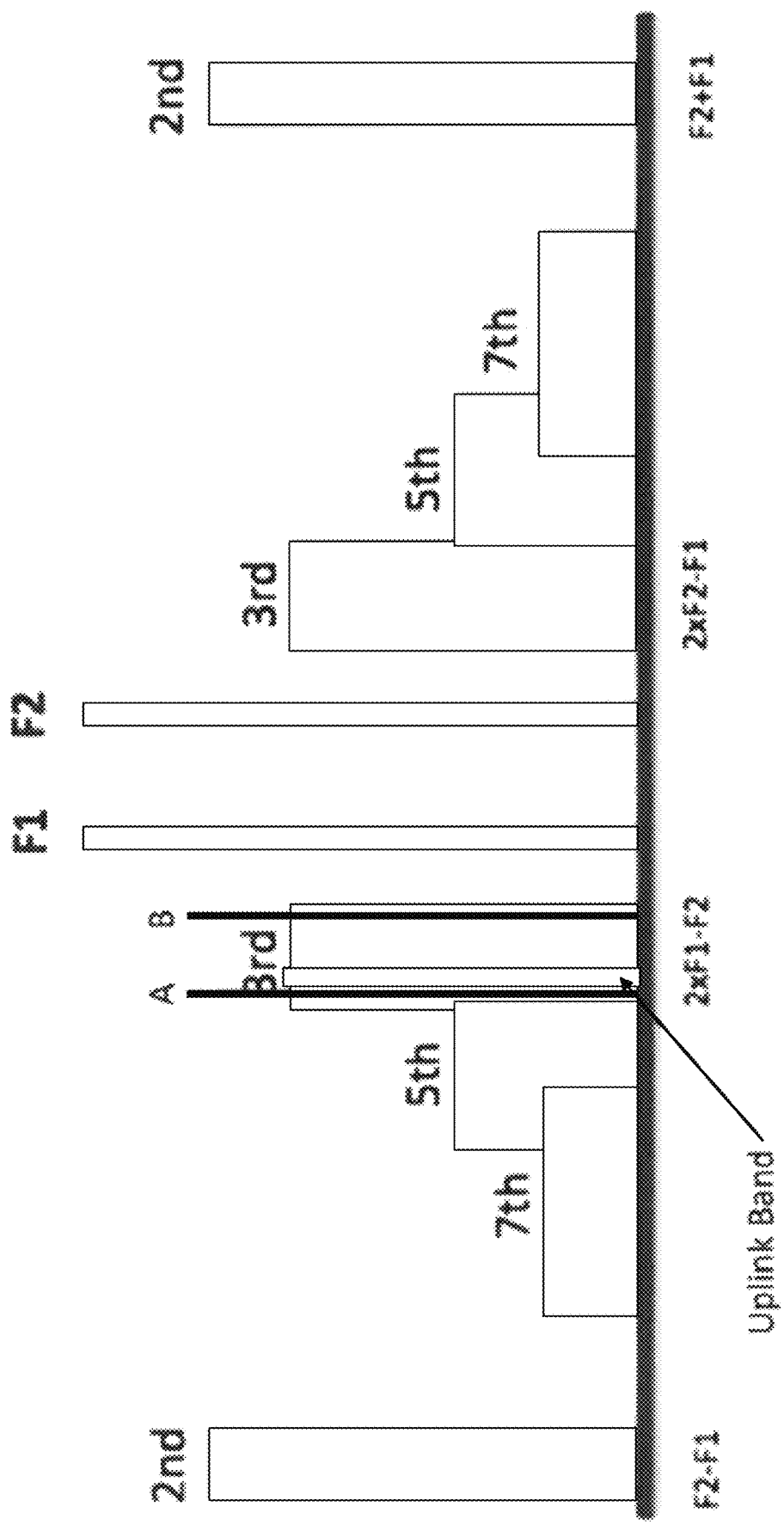

Some examples of mechanical components include antennas, cables, and connectors. The signals can mix or multiply with each other to generate other signals that impact the original intended signal. This results in degraded cellular receiver performance and can negatively impact voice calls and data transmission quality for end users. The bandwidth of a PIM signal is much larger than the bandwidth of original, intended signals. As an example, for two 10 MHz signals, the third order PIM would be 30 MHz wide. As a result, the interfering PIM signal, created by two high power DLs, would always have a larger bandwidth than the affected UL, and there would be regions of the frequency spectrum where only the PIM signal is present, such as the guard bands between assigned communication bands. Performing narrow band measurements in those regions using power detection method(s) described above will provide information regarding the polarization of only the PIM signal. Furthermore, if measurements are performed at two different frequencies A and B within the expected bandwidth of the PIM and outside of the frequency range of other known signals, both results should indicate the same polarization since they represent samples of the same PIM signal. FIGS. 8D and 8E illustrate identification of PIM polarization in accordance with various aspects described herein.

As briefly described above, the motor 702 may control movement of a component/substrate (e.g., the top substrate 530*t* of the polarization shifter 530 or the top substrate 630*t* of the polarization shifter 630). In various embodiments, the motor 702 may control movement of a component/substrate in increments or steps. As an example, for the polarization shifter 530, the motor 702 may control linear movement of the top substrate 530*t* in increments (e.g., 1 mm increments, 2 mm increments, etc.), where each increment may correspond to a certain angular increment or "rotation"—a 1 degree increment, a 2.25 degree increment, a 3 degree increment, a 5.625 degree increment, etc.—of orthogonal signals that, together, span a 90-degree range (corresponding to orthogonality of the signals). As another example, for the polarization shifter 630, the motor 702 may control rotational movement of the top substrate 630*t* in increments (e.g., 1 degree increments, 2 degrees increments, etc.), where each such increment may correspond to a certain angular increment or "rotation"—a 1 degree increment, 2.25 degree increment, a 3 degree increment, a 5.625 degree increment, etc.—of orthogonal signals that, together, span a 90-degree range (corresponding to orthogonality of the signals). In any case, power readings/measurements may then be performed (e.g., in a looped fashion) for such positions. The number of positions may vary depending on reading granularity needed, design parameters, and/or other considerations.

For purposes of illustration, measurements for sixteen (16) positions of a component/substrate are described below, but it should be appreciated and understood that the position loop may be divided in more or fewer positions, such as 40 positions, 32 positions, 13 positions, 8 positions, etc. In one or more embodiments, the control unit 321*c* may configure the monitoring/detection unit 321*d* with desired settings, such as, for example, base frequency (e.g., Freq. A, B, etc.), attenuation, and/or other pertinent working data, and may then cause the motor 702 to drive the drive assembly 704 such that the component/substrate moves to the first of 16 positions. The configuration and/or power reading/measurement process may be initiated or triggered in any suitable manner, such as via external input (e.g., from a user device, base station, etc.) and/or based upon a condition being satisfied (e.g., time of day being reached, power threshold(s) being met, expiration of an initiated timer, etc.). In various embodiments, voltage(s) of orthogonal RF signals may be detected by the monitoring/detection unit 321*d* and obtained/read by the control unit 321*c*. Here, a particular number of (e.g., substantially) simultaneous readings of voltage may be performed for the first position, and such readings may be repeated (e.g., looped) a certain number of times for the first position. For purposes of illustration, the particular number of (e.g., substantially) simultaneous readings may be set to three (3) and the number of repetitions of such readings may be set to give (5), but it is to be appreciated and understood that the control unit 321*c* may perform any other numbers of (e.g., substantially) simultaneous readings and repetitions of such readings for each position. In one or more embodiments, the (e.g., substantially) simultaneous readings may be performed using multiple analog-to-digital (A/D) converters of the control unit 321*c* that may be coupled to the monitoring/detection unit 321*d* and configured to read analog voltage inputs for respective signals. The control unit 321*c* may store the voltage inputs in a data structure—e.g., a table in a memory included in or accessible to the control unit 321*c*. For instance, the control unit 321*c* may store each of five sets of three (e.g., substantially) simultaneous voltage readings in a temporary table, resulting in a 3×5 table. FIG. 9A shows an example orthogonal signal voltage reading table 920 in accordance with various aspects described herein.

In various embodiments, the control unit 321*c* may cause (via control of the motor 702) the component/substrate to move to each position, and may repeat the five sets of three (e.g., substantially) simultaneous voltage readings. The control unit 321*c* may then calculate average power levels based on the sets of (e.g., substantially) simultaneous voltage readings, and store the average power levels in a data structure—e.g., another table in the memory. FIG. 9B shows an example component/substrate position table 922 in accordance with various aspects described herein. Here, the component/substrate position table 922 may include average voltages determined based on the table 920 of FIG. 9A for 16 positions and two different frequencies A and B.

In one or more embodiments, the control unit 321*c* may calculate the averages as follows:

Average (RF_Det_Voltage, position_1)=average of the voltages in row 920*a* in table 920 of FIG. 9A=average (2.6, 2.5, 2.4, 2.6, 2.7)=2.56;

Average (RF_Det_Voltage, position_2)=average of the voltages in row 920*b* in table 920 of FIG. 9A=average (1.2, 1.0, 1.3, 1.1, 1.3)=1.18;

Average (RF_Det_Voltage, position_3)=average of the voltages in row 920*c* in table 920 of FIG. 9A=average (2.3, 2.2, 2.4, 2.4, 2.4)=2.34; and so on.

In various embodiments, the above-described process may be repeated for a different frequency (e.g., Freq. B different from Freq. A). In one or more embodiments, the control unit 321*c* may perform an analysis of the average voltage readings and identify an optimal (or best) position for the component/substrate based on the analysis.

In various embodiments, the control unit 321*c* may calculate, for each position and each frequency (e.g., Freq. A and B), an absolute value "ABS" based on the corresponding measured voltages. Each absolute value may be determined in a variety of manners, such as, for example, the following:

Component/Substrate (position_no, Freq_A_ABS)= (ABS(Component/Substrate (position_no, 1)−Component/Substrate (position_no, 2)+ABS(Component/Substrate (position_no, 3)−2.5)))/2, where, for position 1 and Freq. A in the table 922 of FIG. 9B, the absolute value "ABS"=(ABS (2.56−1.18+ABS(2.34−2.5)))/2=0.77;

Component/Substrate (position_no, Freq_B_ABS)=(ABS (Component/Substrate (position_no, 4)−Component/Substrate (position_no, 5)+ABS(Component/Substrate (position_no, 6)−2.5)))/2, where, for position 1 and Freq. B in the table 922 of FIG. 9B, the absolute value "ABS"=(ABS(2.6−2.5+ABS(2.4−2.5)))/2=0.1; and so on.

In various embodiments, the control unit 321c may compare the ABS values with those of neighboring positions. For instance, for position 3 (third row of values in the table 922 of FIG. 9B), the control unit 321c may compare the ABS value in the third row with the ABS values in the second and fourth rows. In a case where the ABS value in the third row is higher than each of the ABS values in the second and fourth rows, the control unit 321c may compare the ABS value in the third row with a predefined threshold, such as, but not limited to, a noise level. If the ABS value in the third row satisfies (e.g., exceeds) the threshold, the control unit 321c may identify that ABS value as a candidate peak power value. In embodiments where a rotatable component/substrate is involved (e.g., the top substrate 630t of the polarization shifter 630), the component/substrate positions are configured rotationally, and thus respective ABS values in "beginning" and "end" positions may be compared with those of rotational neighbor positions. For example, the ABS value of position 1 (first row of values in the table 922 of FIG. 9B) may be compared with the ABS values in the sixteenth and second rows. The comparison may be performed until all of the ABS values have been compared with those of neighboring positions, and all the candidate peak values are identified.

Once the candidate peak values have been identified for both Freq. A and Freq. B, in various embodiments, the control unit 321c may identify the optimal (or best) position for the component/substrate. This identification may be performed based on comparisons of the candidate peak ABS values for Freq. A and Freq. B. Some example comparisons for identifying the optimal (or best) position are as follows:

If Freq. A and Freq B have the same candidate peak ABS value in a given position, such as, candidate peaks $P_{A2}$, $P_{A9}$, $P_{A14}$, $P_{B5}$, and $P_{B9}$, then the control unit 321c may identify position 9 as being the optimal (or best) component/substrate position;

If Freq. A and Freq B have similar candidate peak ABS values (e.g., within a threshold difference from one another), and if the candidate peak values are: $P_{A2}$, $P_{A9}$, $P_{A14}$, $P_{B5}$, and $P_{B10}$, then the control unit 321c may identify position 9 as being the optimal (or best) component/substrate position in a case where $P_{A9} > P_{B10}$, or the control unit 321c may identify position 10 as being the optimal (or best) component/substrate position in a case where $P_{A9} < P_{B10}$;

If Freq. A and Freq. B do not have similar candidate peak ABS values (e.g., they are not within the threshold difference from one another), and if the candidate peak values are: $P_{A2}$, $P_{A14}$, $P_{B5}$, and $P_{B9}$, then the control unit 321c may identify a default position (e.g., position 1 or a current position of the column) as the optimal (or best) component/substrate position; and If Freq. A and Freq. B have more than one qualifying position, then the control unit 321c may identify the position with the highest peak ABS value as the optimal (or best) component/substrate position.

Based on the identified optimal (or best) position, the control unit 321c may then control the motor 702 to move the component/substrate to that position to facilitate mitigation or avoidance of interference/PIM.

Figure 10A:
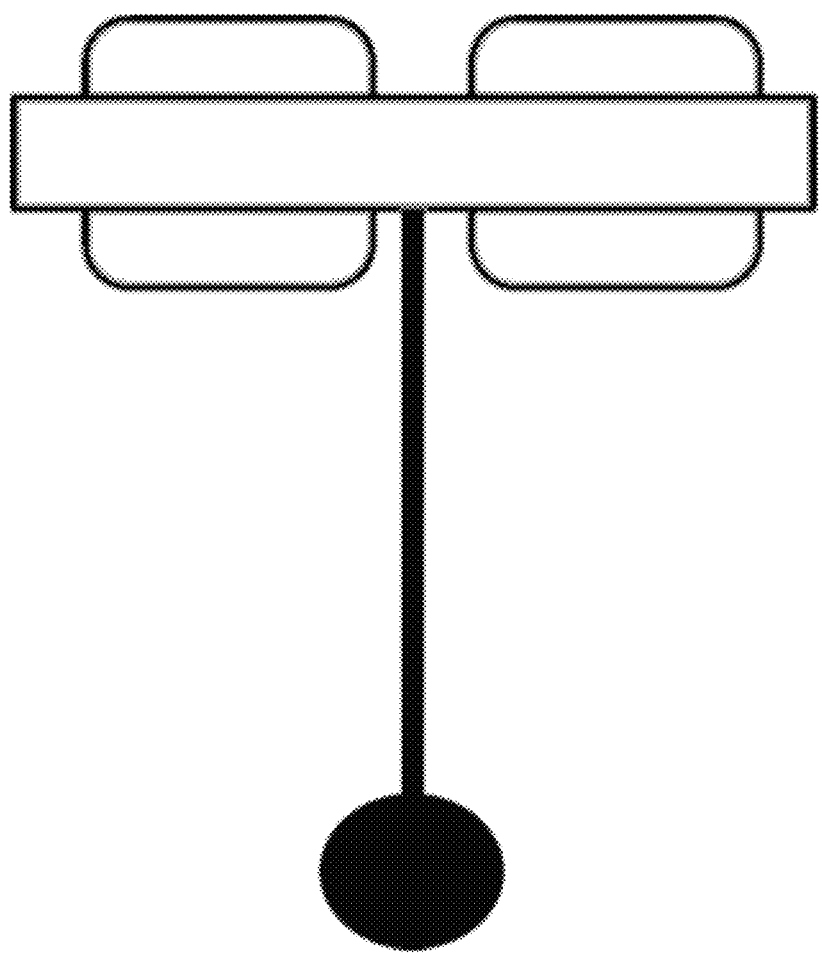
FIGS. 10A and 10B illustrate an example implementation for evaluating polarization shifting in accordance with various aspects described herein.
Figure 10B:
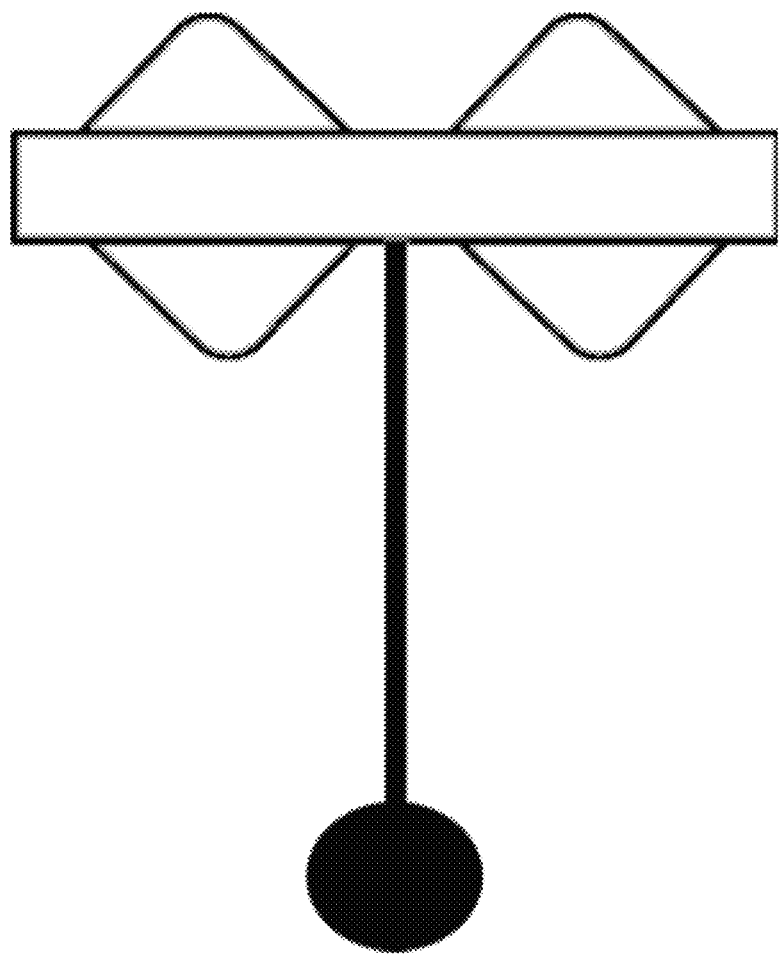
Figure 10C:
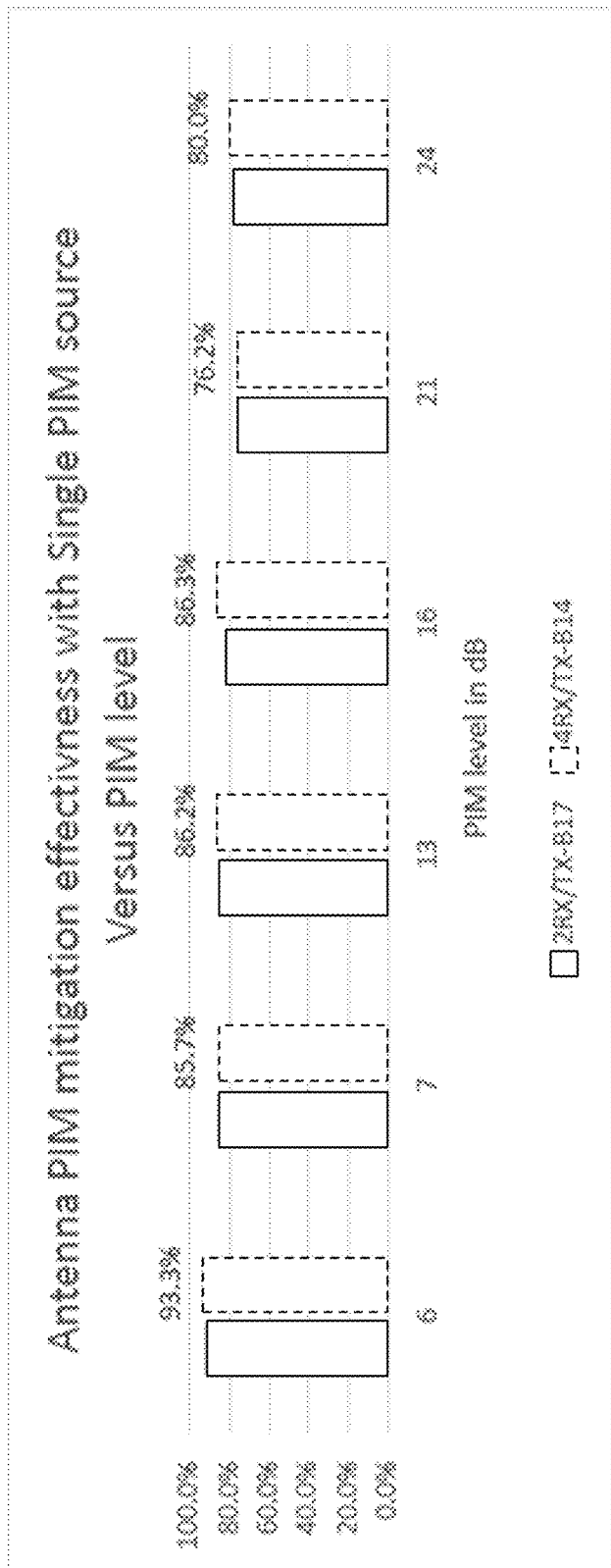
FIGS. 10C and 10D show mitigation results for different sources of PIM in accordance with various aspects described herein.
Figure 10D:
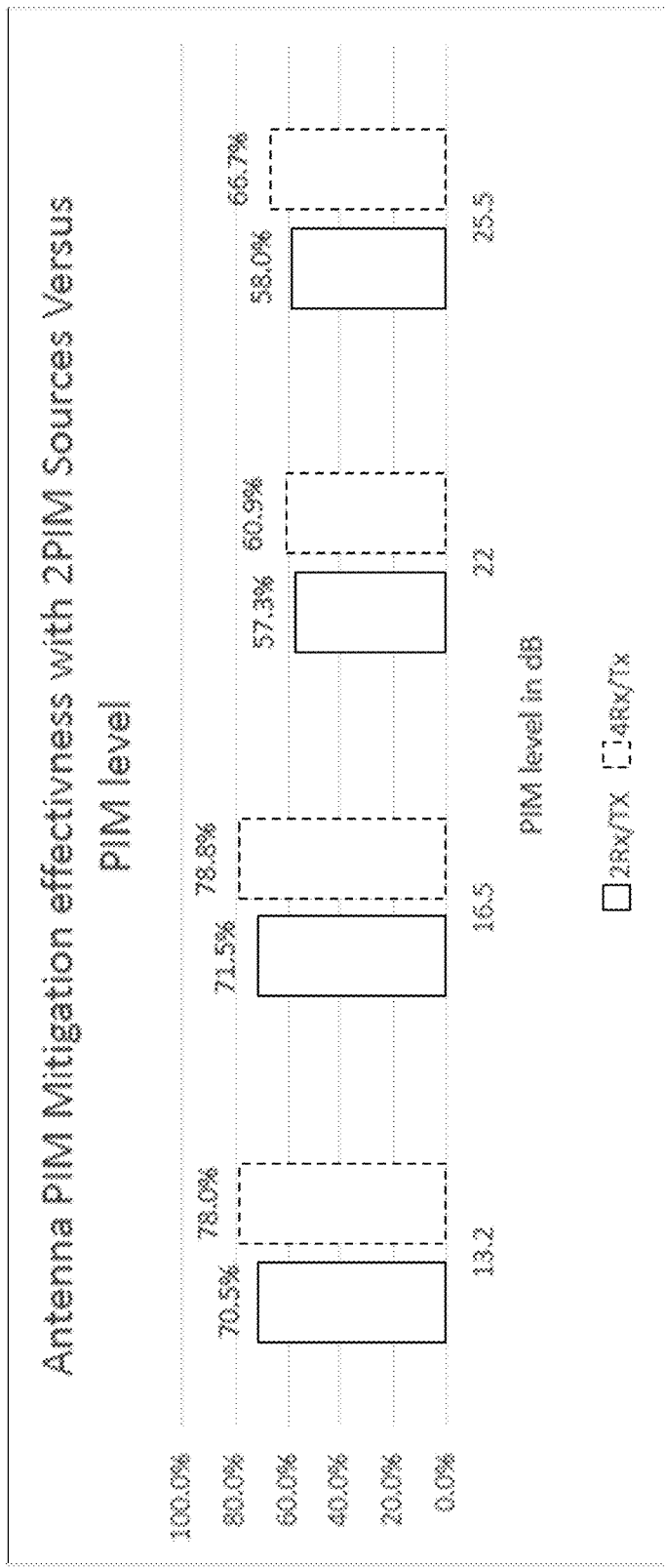

FIGS. 10A and 10B illustrate an example implementation for evaluating polarization shifting in accordance with various aspects described herein. The implementation may include a commercial base station radio having dual band support, with 2 Tx/Rx configured for one of the bands and 4 Tx/Rx for the other band. The radio may have a single (dual-polarized) radiating element in a 2-by-2 implementation and two radiating elements in a 4-by-4 implementation. In evaluating polarization shifting, a PIM source (i.e., vertical steel wool bar) was placed across from the antenna(s) in a known position/orientation. Since the physical rotation of the antenna is equivalent to the rotation of a single radiating element (in the 2-by-2 implementation), such physical rotation was used to simulate or effect rotation of the radiating element. For each rotation, the reflected signal was captured and analyzed with a base band unit and a PIM CPRI analyzer. The PIM level prior to the rotation to an optimal (best) angle/position is compared to the PIM level after such rotation. In order to precisely rotate the antenna by precise amounts, a mounting platform was constructed using a piece of plywood and two panoramic tripod heads. The tripod heads were designed to be used in panoramic photography applications, but work well as a general-purpose rotator with 15-degree stops. Where the PIM source is in a known orientation (e.g., vertically oriented), rotation of the antenna such that a first sub-element of the radiating element is vertically oriented and a second sub-element of the radiating element is horizontally oriented enables a "clean" signal to be picked up from the horizontally oriented sub-element, thereby resulting in mitigation, or avoidance, of the PIM. FIGS. 10C and 10D show mitigation results for different sources of PIM in accordance with various aspects described herein. These results indicate that the techniques employed in various embodiments described herein (in which orthogonal RF signal rotation is performed to mimic physical rotation of radiating elements) are highly effective for PIM mitigation or avoidance.

Figure 11A:
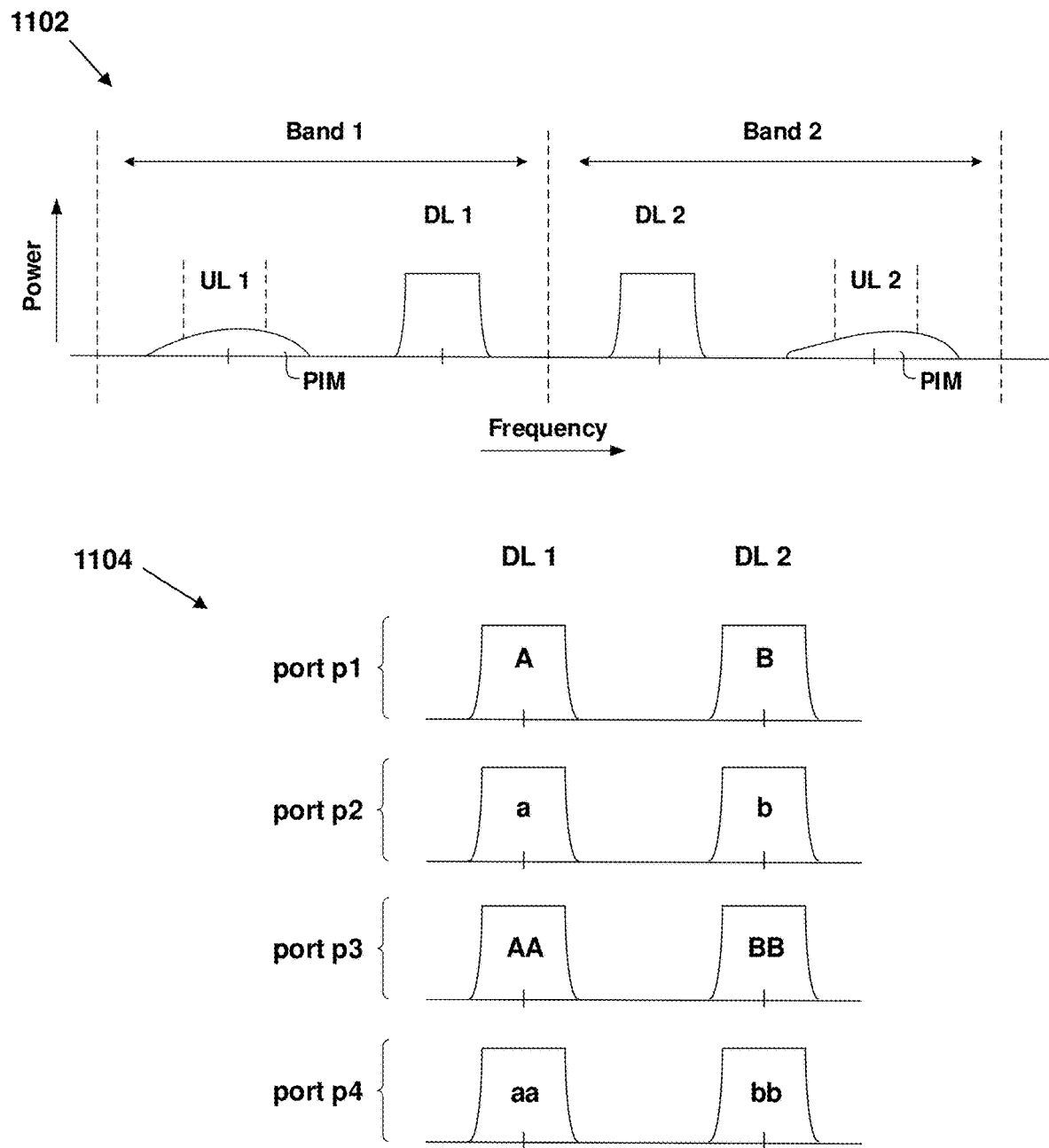
FIG. 11A shows graphical representations of a multi-band (i.e., dual-band) communications system subject to PIM in accordance with various aspects described herein.

To reiterate, PIM can seriously degrade UL performance in a communications system, such as 4G/5G base stations. Transmissions in two or more frequency bands by a base station or by multiple base stations can lead to nonlinear mixing of DL carriers, resulting in an intermodulation product—i.e., PIM. PIM can be internal to a base station and its antenna system or external thereto. Internal PIM may be caused by non-linearities in passive devices (e.g., filters, duplexers, connectors, cables, antenna components, etc.) within a transmit signal path of a multi-band base station. The mixing of DL carriers within each path can result in internal PIM. That is, a given path may suffer from internal PIM simply due to the mixing of DL carriers transmitted in that path. Internal PIM generated by the mixing of DL carriers transmitted in different paths is generally not a problem. External PIM may be generated by an object that is external to a base station and its antenna system—e.g., a non-linear metallic object in the vicinity of an antenna (typically within 10 feet), such as the PIM source 200p of FIG. 2A. DL carriers transmitted over different paths may illuminate an external PIM source and mix to generate PIM externally. Both multi-band and single-band base stations are susceptible to external PIM. Consider a base station operating over two carriers in different bands—e.g., DL 1 and DL 2 (e.g., 1102 of FIG. 11A). For PIM to be generated by a PIM source, both DL carriers must be received by the PIM source. If only one of the DL carriers is received by the PIM source, no PIM will be generated since there will be no intermodulation mixing. Thus, PIM can be avoided if simultaneous reception of either DL 1 or DL 2 by the PIM source is prevented.

In exemplary embodiments, PIM may be avoided or mitigated by modifying or adjusting path/port mapping and/or the polarization of DL signals. In particular, DL swapping and DL swapping and rotation implementations/algorithms are described herein that prevent or reduce the generation of internal or external PIM by altering DL path/port mapping, leveraging DL signal transmission timing differences, and/or manipulating the polarization of one or more of multiple DLs such that DL signals of different frequencies are not received simultaneously (or at the same strength) by a PIM source. While the description hereafter describes examples of DL swapping and DL swapping and rotation involving two carriers, it is to be appreciated and understood that the DL swapping and DL swapping and rotation implementations may be applied in communications systems that operate over three or more carriers. In any case, by preventing the reception by the PIM source of one or more DL carriers, the frequency of the intermodulation product may be altered, thereby avoiding or preventing PIM from being generated and impacting ULs.

To illustrate the DL swapping and DL swapping and rotation implementations, reference is made to MIMO systems in which multiple signals, referred to as constituent signals, are transmitted over each DL carrier. In a 2- or 4-port DL transmission system (2 Tx or 4 Tx), for instance, 2- or 4-port dual-slant cross-polarized (Xpol) antennas may be used (e.g., FIGS. 3A and 11B). In the case of multi-band operation where two carriers (one in each of two bands) DL 1 and DL 2 are each configured to transmit four signals (4 Tx), and where a 4-port antenna (with two columns of dual-slant crossed dipoles) is employed for transmitting over the two bands, we can have the following:

A, a, AA, aa represent constituent signals for band 1 (DL 1);
B, b, BB, bb represent constituent signals for band 2 (DL 2); and
p1, p2, p3, p4 represent the [+45, −45, +45, −45] ports of the Xpol antenna (e.g., from left to right) (1104 of FIG. 11A). Typically, DL signals in such a configuration may be mapped (by default) to transmitter paths and antenna ports as follows:
path 1 to p1=A, B;
path 2 to p2=a, b;
path 3 to p3=AA, BB; and
path 4 to p4=aa, bb,
which can also be written as: [A a AA aa]=[p1 p2 p3 p4], [B b BB bb]=[p1 p2 p3 p4], where path mapping may determine which signals are transmitted via a +45 degree dipole polarization and which signals are transmitted via a −45 degree dipole polarization. Here, the DL carriers may be combined into a multi-carrier signal before they are converted into high power RF signals by signal path blocks. Such signal path blocks may include power amplifiers, filters, duplexers, connectors, cabling to the antenna, etc. and, therefore, can introduce multiple sources of internal PIM. In particular, internal PIM may be generated in path 1 from the mixing of A and B, may be generated in path 2 from the mixing of a and b, and so on. Additionally, the default path and antenna port mapping may also play a role in external PIM generation.

Figure 11B:
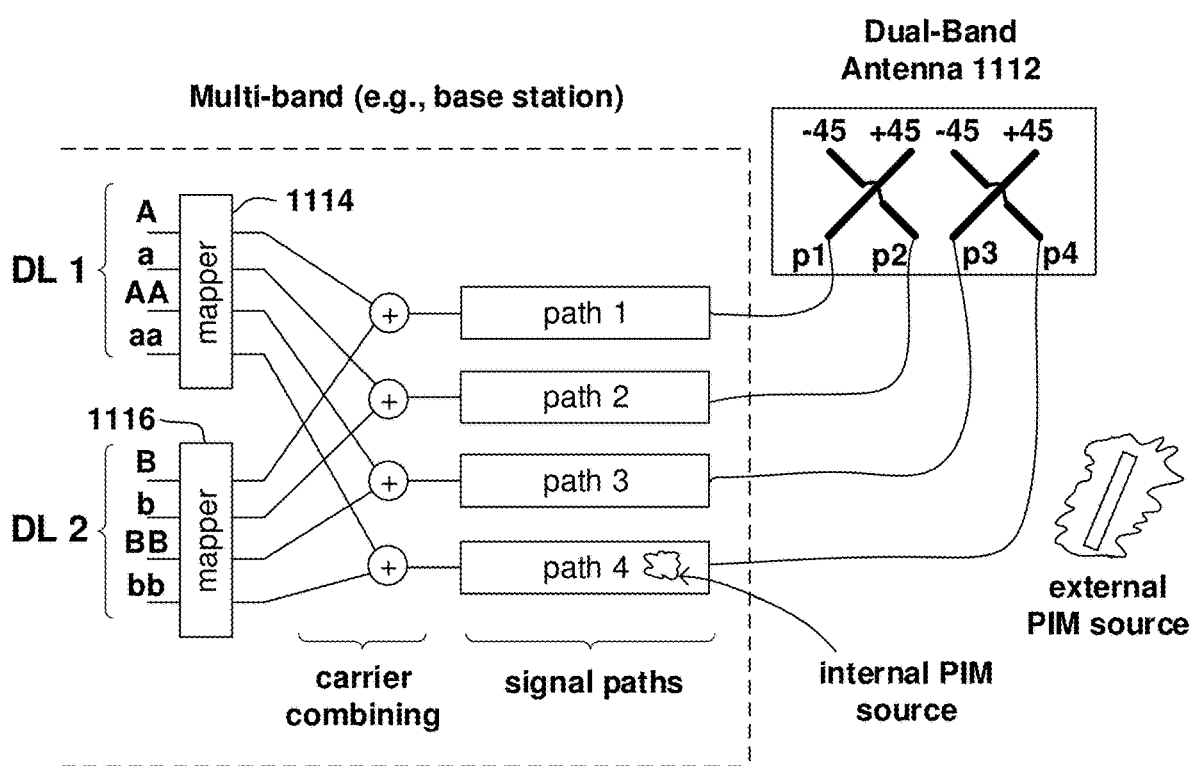
FIG. 11B is a block diagram illustrating an example, non-limiting embodiment of path/port mapping functionality in a downlink signal path of a multi-band communications system in accordance with various aspects described herein.

In exemplary embodiments, mapping block(s)/functionality may be provided in DLs to change or alter path and antenna port mapping. The mapping may be hardcoded or hardwired or may, alternatively, be implemented as a control system (e.g., in hardware, software, or a combination of hardware and software) that selectively maps signals to paths/ports based on detected PIM characteristics, such as the polarization of the PIM. Configuring how the constituent signals of each of the DL carriers are mapped to the paths and antenna ports can affect (or alter) how/whether PIM is generated. FIG. 11B is a block diagram 1110 illustrating an example, non-limiting embodiment of path/port mapping functionality in a downlink signal path of a multi-band communications system in accordance with various aspects described herein. As shown in FIG. 11B, a dual-band antenna 1112 may be communicatively coupled to paths 1, 2, 3, and 4 of a multi-band base station via ports p1, p2, p3, and p4. In various embodiments, the dual band antenna 1112 may be similar to, may be the same as, or may otherwise correspond to the antenna 210 of FIG. 2A or the antenna 310 of FIG. 3A. For instance, the ports p1, p2, p3, and p4 may variously correspond to the ports 314*h*, 314*i*, 315*h*, and 315*i* of the antenna 310 of FIG. 3A. In certain embodiments, the multi-band base station of FIG. 11B may correspond to a radio—e.g., the radio 340 of FIG. 3A, a baseband unit (e.g., one or more distributed units), or any other device or system of a radio access network (RAN). In the above-described default mapping, carrier combining may result in A+B feeding into path 1, a+b feeding in path 2, AA+BB feeding into path 3, and aa+bb feeding into path 4. However, inclusion of mappers 1114 and 1116 into the base station as shown in FIG. 11B permits altered mapping of constituent signals to the paths/antenna ports to affect (or alter) how/whether PIM is generated.

Figure 11C:
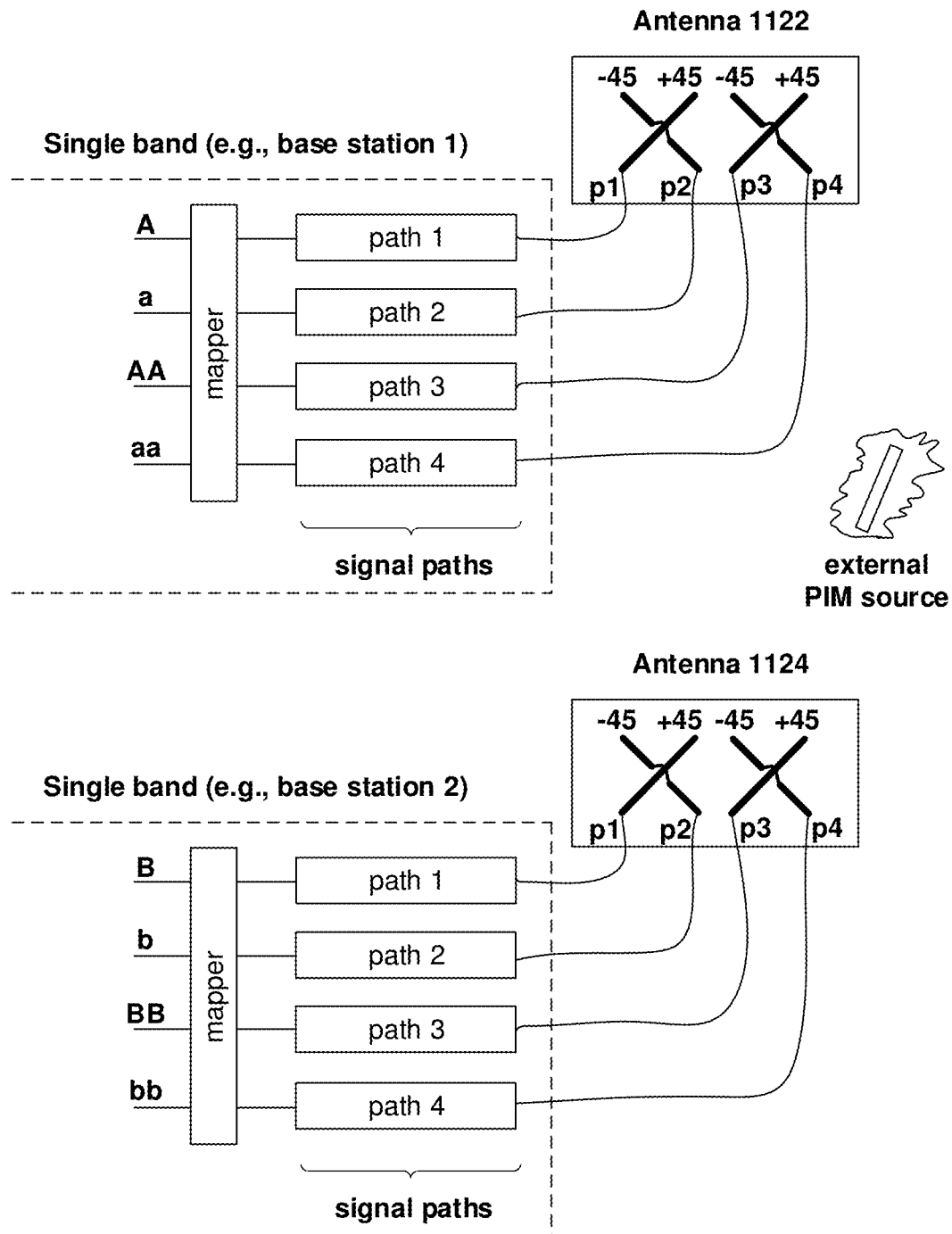
FIG. 11C is a block diagram illustrating an example, non-limiting embodiment of path/port mapping functionality in downlink signal paths of single-band communications systems in accordance with various aspects described herein.

In certain embodiments, mapping block(s) or functionality may similarly be employed in separate single-band base stations or transmitters, each with its own antenna system. FIG. 11C is a block diagram 1120 illustrating an example, non-limiting embodiment of path/port mapping functionality in downlink signal paths of single-band communications systems (including antennas 1122 and 1124) in accordance with various aspects described herein. While internal PIM might not be an issue here since each of the signal path blocks is illuminated by a single carrier, external PIM is nevertheless a problem due to possible illumination of an external PIM source by both carriers. The inclusion of mapping blocks as shown in FIG. 11C may enable mapping of constituent signals to specific paths/antenna ports to affect (or alter) how/whether PIM is generated.

Figure 11D:
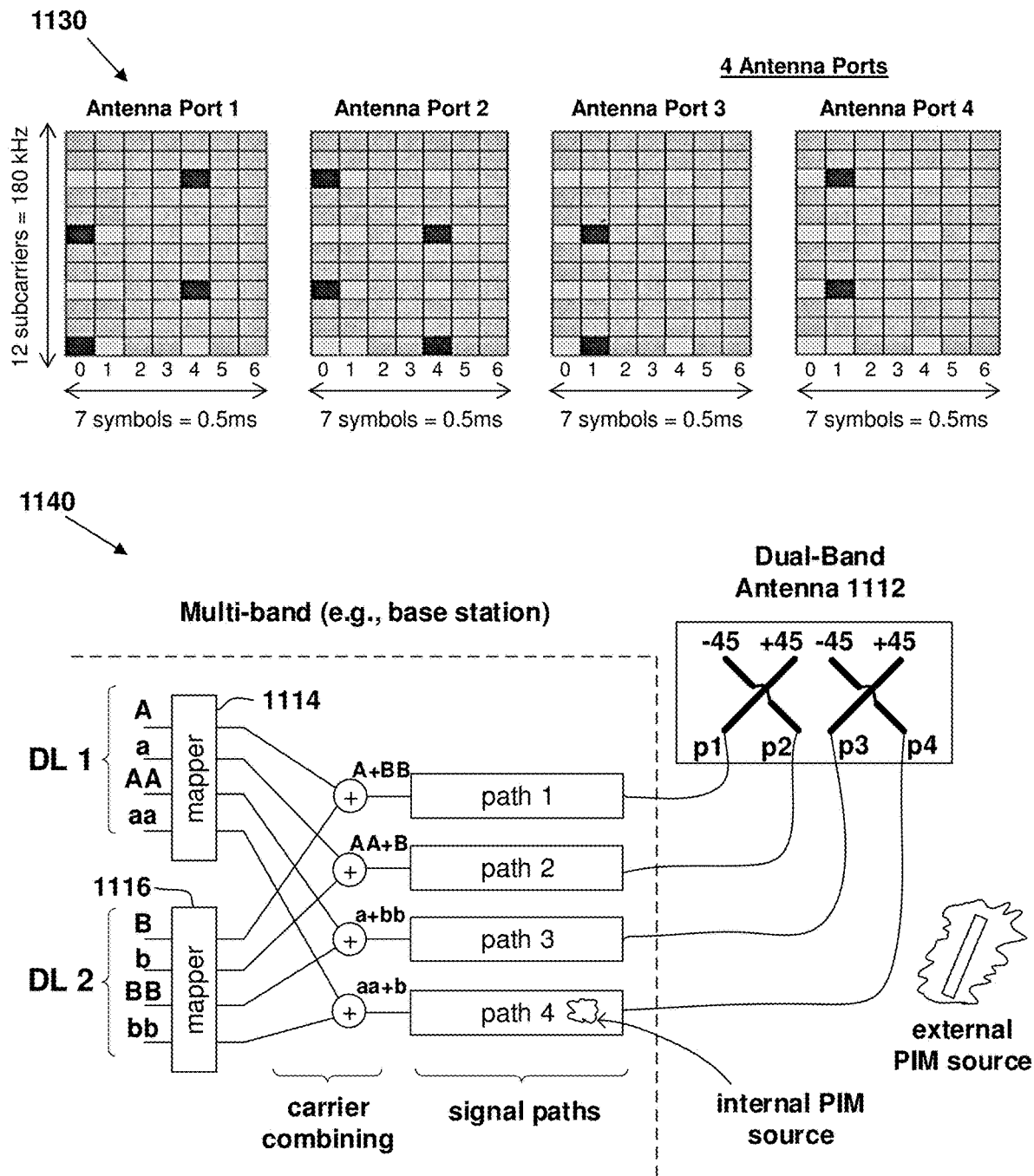
FIG. 11D illustrates an example, non-limiting embodiment of a particular path/port mapping in a downlink signal path of a multi-band communications system in accordance with various aspects described herein.

In exemplary embodiments, the timing of DL signal transmissions can be leveraged in conjunction with the aforementioned path and port mapping to mitigate or avoid PIM. In LTE, for instance, the DL cell specific reference signal (RS) is generally used to support demodulation at UEs. RS may be transmitted at different times on different antenna ports. FIG. 11D illustrates an example, non-limiting embodiment of a particular path/port mapping in a downlink signal path of a multi-band communications system in accordance with various aspects described herein. The communications system 1140 shown may correspond to the system 1110 of FIG. 11B. Reference number 1130 of FIG. 11D illustrates RS timing for a 4 Tx mode. As shown, RS is transmitted in symbols 0 and 4 via antenna ports 1 and 2 (i.e., early transmissions) and on symbols 1 via antenna ports 3 and 4 (i.e., late transmissions). With reference to the abovementioned constituent signal terminology, RS for DL 1 is transmitted early in A and a and late in AA and aa. Similarly, RS for DL 2 is transmitted early in B and b and late in BB and bb. Here, adding the letters e and/to these signal names to designate early/late transition timing, and using default path and antenna port mapping, yields:

p1=Ae, Be;
p2=ae, be;
p3=AA1, BB1; and
p4=aa1, bb1.

If a PIM source, whether internal or external, receives the RS of DL 1 and DL 2 at the same time, PIM may be generated from the mixing of these RS. However, if the PIM source receives the RS from DL 1 and RS from DL 2 at different times, PIM can be avoided. PIM that is generated from the mixing of RS is referred to herein as RS PIM. While RS signals are not the only DL signals that mix and generate PIM, the impact of RS PIM is significant to the overall degradation of the UL because RS PIM can introduce interference every 3 out of every 7 time slots, regardless of the amount of DL traffic or number of active users. Therefore, RS PIM can impact the reception of every UL message that is received by a given base station.

Under the aforementioned default or standard path and port mapping, RS from DL 1 and DL 2 are transmitted at the same time on all paths. Thus, if there are internal PIM sources in any of the four signal paths, PIM will be generated. Exemplary DL swapping embodiments address this issue and avoid generation of internal PIM due to RS by altering path mapping based on the timing of RS signals for each of the ports—i.e. as follows (1140 of FIG. 11D):

p1=Ae, BB1;
p2=AA1, Be;
p3=ae, bb1; and
p4=aa1, be.

With this exemplary path mapping, the generation of RS PIM can be avoided altogether since RS from DL 1 and DL 2 are prevented from being simultaneously active in any of the paths. In this way, knowledge of RS timing can be used to map the DL constituent signals to particular paths/ports to avoid generation of RS PIM.

It is to be appreciated and understood that the DL swapping implementation/algorithm is not limited to mitigating intermodulation from passive sources. In various embodiments, DL swapping can be employed to reduce intermodulation caused by active component(s), including, but not limited to, diodes, transistors, power amplifiers, and any other devices in the transmit signal path. It is also to be appreciated and understood that other path mapping schemes may be utilized to eliminate or reduce RS PIM generation.

Figure 11E:
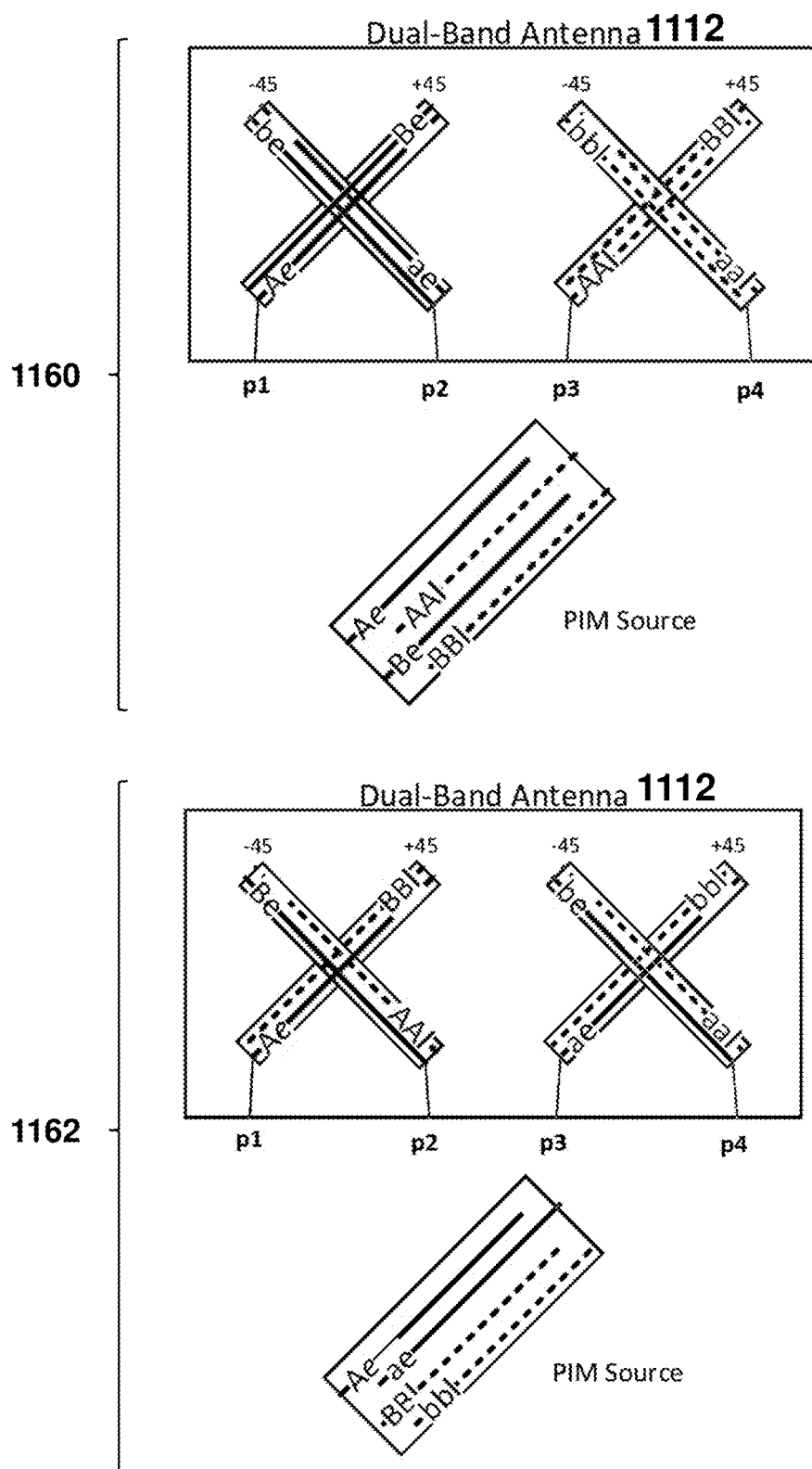
FIG. 11E illustrates a dual-band antenna with default path/port mapping in comparison with altered path/port mapping in accordance with various aspects described herein.

To reiterate, external PIM sources are typically linearly polarized, meaning that the electric field generated by the source has a dominant orientation. For the PIM source to generate a significant amount of PIM, it needs to be a "good antenna"—i.e., capable of receiving the DLs effectively, mixing them, and then radiating the mixed signals. Dipole- and monopole-like structures, such as pipes, ducts, and roof flashing mounted in the vicinity of an antenna, make for good antennas, and therefore, are good PIM sources. The electric field of PIM generated by any of these objects will be linearly polarized (a polarization that matches the orientation of the physical structure of the object). Thus, the amount of energy received by the PIM source from each of the DL signals will depend on the relative polarization of the PIM source with respect to the polarization of the DL signals. Consider a simple example where an external PIM source, with a +45 degree polarization, is located in front of an antenna. Because of its orientation, the PIM source will pick up energy transmitted by the +45 dipole ports of the antenna. FIG. 11E illustrates a dual-band antenna with default path/port mapping in comparison with altered path/port mapping in accordance with various aspects described herein. With the aforementioned default path and antenna port mapping, the PIM source will be illuminated by the DL signals Ae, AA1, Be, and BB1, and not by ae, aa1, be, or bb1 (1160 of FIG. 11E). Since the PIM source is illuminated by two early and two late transmissions, RS PIM will be generated. In exemplary embodiments of DL swapping, knowledge of RS timing can be used in conjunction with the known polarizations of antenna ports to facilitate avoidance of RS PIM. In various embodiments, alteration of path/port mapping based on the timing of RS signals and port polarization may be as follows:

p1 (+45)=Ae, BB1;
p2 (−45)=AA1, Be;
p3 (+45)=ae, bb1; and
p4 (−45)=aa1, be (1162 of FIG. 11E).

With this mapping, DL 1 may transmit early on the +45 degree polarization and late on the −45 degree polarization. Similarly, DL 2 may transmit late on the +45 degree polarization and early on the −45 degree polarization. This results in the +45 degree polarized PIM source receiving only early transmissions from DL 1 and late transmissions from DL 2. Since RS is not received simultaneously by the PIM source, RS PIM may therefore be avoided. This may be the case whether the PIM source is oriented at a +45 degree tilt or a −45 degree tilt.

Figure 11F:
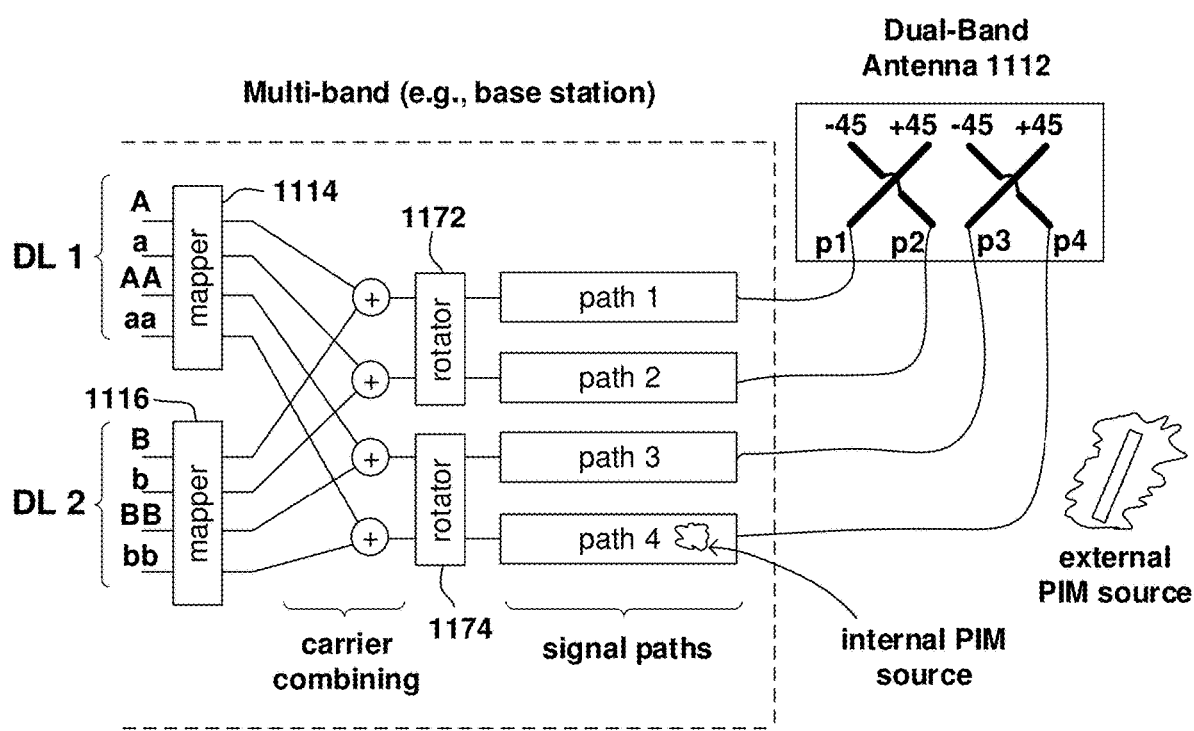
FIG. 11F is a block diagram illustrating an example, non-limiting embodiment of path/port mapping functionality employed in conjunction with polarization rotation functions in a downlink signal path of a multi-band communications system in accordance with various aspects described herein.

In various embodiments, DL swapping may be adapted to address external PIM sources oriented in other angles or polarizations (i.e., other than at a +45 degree tilt or a −45 degree tilt). In exemplary embodiments, DL polarization may be rotated to be orthogonal to the determined orientation/polarization of an external PIM source. FIG. 11F is a block diagram 1170 illustrating an example, non-limiting embodiment of path/port mapping functionality (1114, 1116) employed in conjunction with polarization rotation functions (1172, 1174) in a downlink signal path of a multi-band communications system in accordance with various aspects described herein. The communications system 1170 shown may correspond to the system 1140 of FIG. 11D, but with the addition of rotator functionality 1172, 1174. In various embodiments, the polarization of DL 1 may be rotated by rotator 1172 such that early RS are aligned with the PIM source and late RS are perpendicular to the PIM source, or vice versa. Additionally, or alternatively, the polarization of DL 2 may be rotated by rotator 1174 such that late RS are aligned with the PIM source and early RS are perpendicular to the PIM source, or vice versa. Polarization rotation may be performed by mixing the DL signals destined for each of the crossed-dipoles. In certain embodiments, rotators 1172 and 1174 may each be implemented using digital signal processing techniques (e.g., based on the equations $202p/202q/202r$ of FIGS. 2B-2D or equivalents of equations $202p/202q/202r$).

Figure 11G:
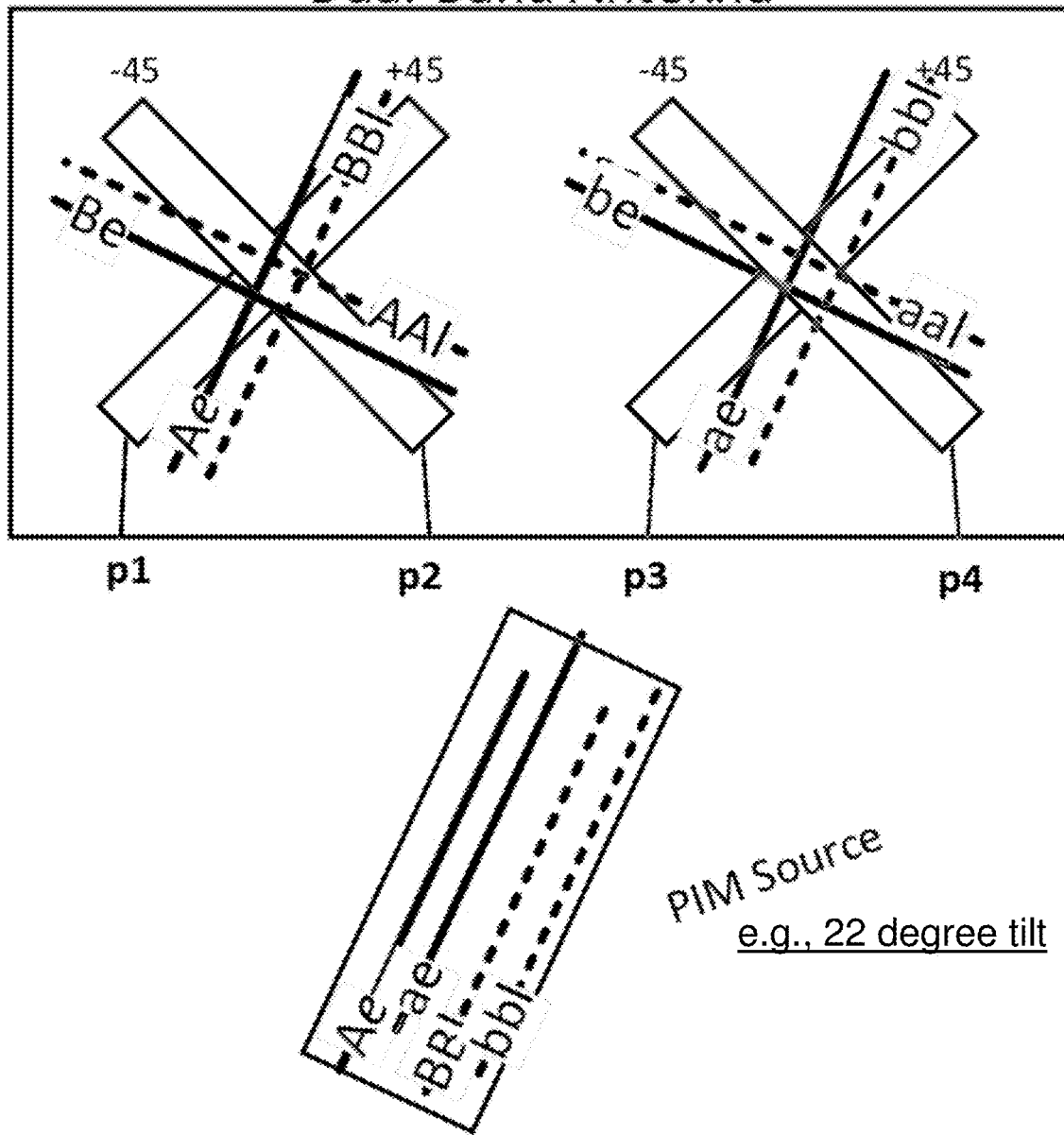
FIG. 11G illustrates a dual-band antenna with altered path/port mapping employed with polarization rotation in accordance with various aspects described herein.

FIG. 11G illustrates a dual-band antenna with altered path/port mapping employed with polarization rotation in accordance with various aspects described herein. As an illustration of DL swapping and rotation, consider a case where an external PIM source with a determined tilt of 22 degrees is located in front of the antenna (e.g., 1180 of FIG. 11G). Here, DL signal constituents may be remapped, and the polarizations of DL 1 and DL 2 may be rotated to match the 22 degree tilt of the PIM source. By virtue of these manipulations, the PIM source may only receive early RS from DL 1 and late RS from DL 2 (i.e., DLs at different times), thereby avoiding generation of RS PIM. In this way, knowledge of RS timing can be used in conjunction with known antenna port polarizations and a determined PIM source polarization to (i) map the DL constituent signals to particular paths/ports and/or (ii) rotate the DL polarizations so as to facilitate avoidance generation of RS PIM.

It is to be appreciated and understood that rotation of the polarizations of DL signals (1172, 1174, etc.) can be performed in any suitable manner, such as in the RF domain (e.g., via the RPM 220 or 320) or via physical rotation of crossed-dipoles of an antenna.

It is also to be appreciated and understood that the quantities of base stations, DLs or carriers, constituent signals per DL, carrier combiners, paths, mappers, rotators, antennas, crossed-dipole pairs, PIM sources, etc. shown in one or more of FIGS. 11B-11D and 11F are merely exemplary. That is, the systems shown in FIGS. 11B-11D and 11F may include any quantities of (e.g., more or fewer) base stations, DLs or carriers, constituent signals per DL, carrier combiners, paths, mapper blocks, rotators, antennas, crossed-dipole pairs, PIM sources, etc.

Figure 12A:
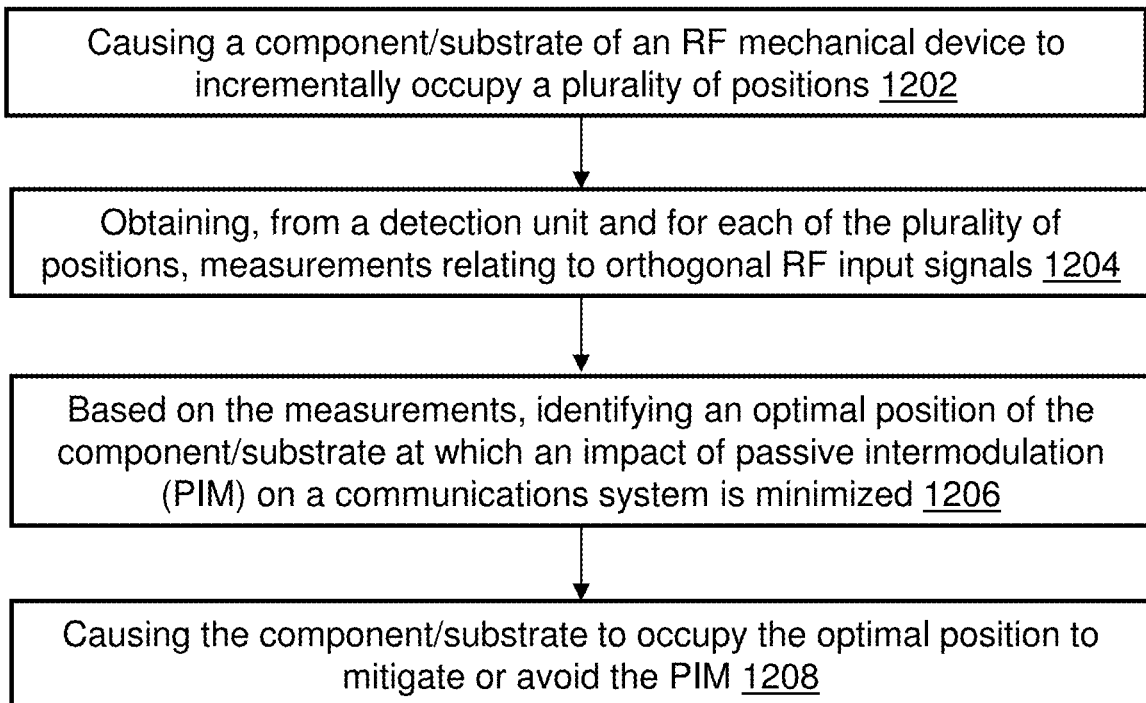
FIG. 12A depicts an illustrative embodiment of a method in accordance with various aspects described herein.

FIG. 12A depicts an illustrative embodiment of a method 1200 in accordance with various aspects described herein. In some embodiments, one or more process blocks of FIG. 12A can be performed by a control unit, such as the control unit 321c. In some embodiments, one or more process blocks of FIG. 12A may be performed by another device or a group of devices separate from or including the control unit, such as the monitoring/detection unit(s) 321d, the RPM 320, etc.

At 1202, the method can include causing a component/substrate of an RF mechanical device to incrementally occupy a plurality of positions. For example, the control unit 321c can, similar to that described elsewhere herein, perform one or more operations that include causing a component/substrate of an RF mechanical device (e.g., the top substrate 530t of the polarization shifter 530 or the top substrate 630t of the polarization shifter 630) to incrementally occupy a plurality of positions. In various embodiments, the component/substrate may thus be moved in increments such that the component/substrate incrementally occupies different linear/rotational positions in a continuous or sequential manner, where measurements from orthogonal RF input signals may be made at each of the incremental steps to identify the optimal (or best) position for the component/substrate.

At 1204, the method can include obtaining, from a detection unit and for each of the plurality of positions, measurements relating to orthogonal RF input signals. For example, the control unit 321c can, similar to that described elsewhere herein, perform one or more operations that include obtaining, from a detection unit and for each of the plurality of positions, measurements relating to orthogonal RF input signals.

At 1206, the method can include, based on the measurements, identifying an optimal position of the component/substrate at which an impact of passive intermodulation (PIM) on a communications system is minimized. For example, the control unit 321c can, similar to that described elsewhere herein, perform one or more operations that include, based on the measurements, identifying an optimal position of the component/substrate at which an impact of passive intermodulation (PIM) on a communications system is minimized.

At 1208, the method can include causing the component/substrate to occupy the optimal position to mitigate or avoid the PIM. For example, the control unit 321c can, similar to that described elsewhere herein, perform one or more operations that include causing the component/substrate to occupy the optimal position to mitigate or avoid the PIM.

While for purposes of simplicity of explanation, the respective processes are shown and described as a series of blocks in FIG. 12A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12B:
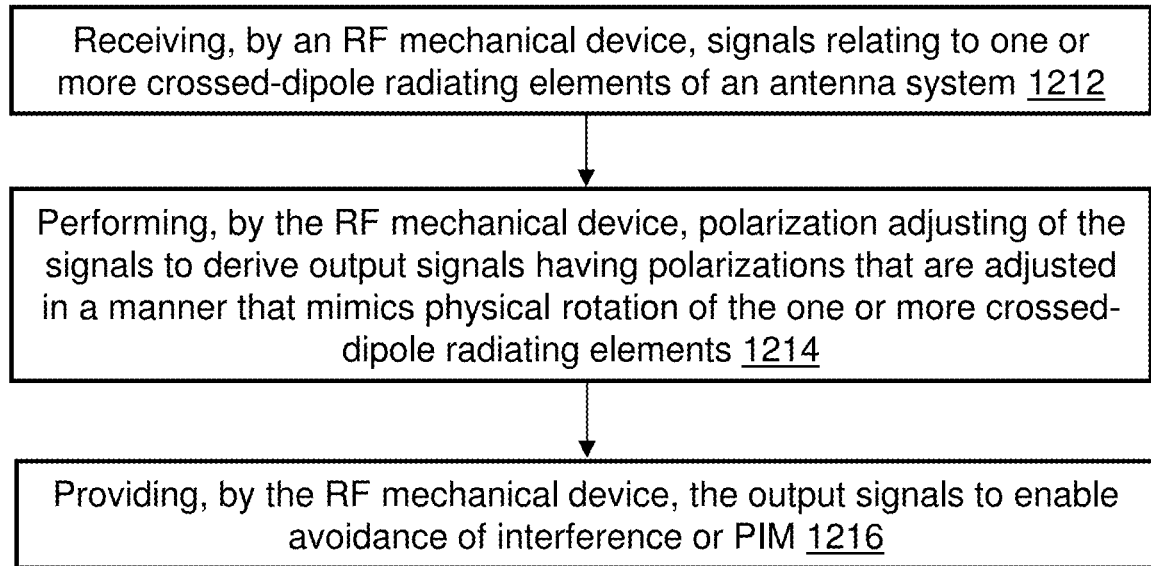
FIG. 12B depicts an illustrative embodiment of a method in accordance with various aspects described herein.

FIG. 12B depicts an illustrative embodiment of a method 1210 in accordance with various aspects described herein. In some embodiments, one or more process blocks of FIG. 12B can be performed by an RF mechanical device.

At 1212, the method can include receiving, by an RF mechanical device, signals relating to one or more crossed-dipole radiating elements of an antenna system. For example, similar to that described elsewhere herein, an RF mechanical device may receive signals relating to one or more crossed-dipole radiating elements of an antenna system.

At 1214, the method can include performing, by the RF mechanical device, polarization adjusting of the signals to derive output signals having polarizations that are adjusted in a manner that mimics physical rotation of the one or more crossed-dipole radiating elements. For example, similar to that described elsewhere herein, the RF mechanical device may perform polarization adjusting of the signals to derive output signals having polarizations that are adjusted in a manner that mimics physical rotation of the one or more crossed-dipole radiating elements.

At 1216, the method can include providing, by the RF mechanical device, the output signals to enable avoidance of interference or PIM. For example, similar to that described elsewhere herein, the RF mechanical device may provide the output signals to enable avoidance of interference or PIM.

While for purposes of simplicity of explanation, the respective processes are shown and described as a series of blocks in FIG. 12B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 12C depicts an illustrative embodiment of a method 1220 in accordance with various aspects described herein. In some embodiments, one or more process blocks of FIG. 12C can be performed by a double trombone shifter device, such as the double trombone shifter device 530.

At 1222, the method can include receiving, by a double trombone shifter device, signals relating to one or more crossed-dipole radiating elements of an antenna system. For example, similar to that described elsewhere herein, the double trombone shifter device 530 may receive signals relating to one or more crossed-dipole radiating elements of an antenna system.

At 1224, the method can include performing, by the double trombone shifter device, polarization adjusting of the signals to derive output signals having polarizations that are adjusted in a manner that mimics physical rotation of the one or more crossed-dipole radiating elements. For example, similar to that described elsewhere herein, the double trombone shifter device 530 may perform polarization adjusting of the signals to derive output signals having polarizations that are adjusted in a manner that mimics physical rotation of the one or more crossed-dipole radiating elements.

At 1226, the method can include providing, by the double trombone shifter device, the output signals to enable avoidance of interference or PIM. For example, similar to that described elsewhere herein, the double trombone shifter device 530 may provide the output signals to enable avoidance of interference or PIM.

While for purposes of simplicity of explanation, the respective processes are shown and described as a series of blocks in FIG. 12C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

FIG. 12D depicts an illustrative embodiment of a method 1230 in accordance with various aspects described herein. In some embodiments, one or more process blocks of FIG. 12D can be performed by a radio 340 of FIG. 3A, a baseband unit (e.g., one or more distributed units), or any other device or system of a radio access network (RAN).

At 1232, the method can include obtaining data regarding interference or passive intermodulation (PIM) originating from one or more interference sources. For example, similar to that described elsewhere herein, data regarding interference or passive intermodulation (PIM) originating from one or more interference sources may be obtained.

At 1234, the method can include electronically adjusting polarizations of signals relating to radiating elements of an antenna system, the electronically adjusting being performed for multiple frequency bands and facilitating mitigation of the interference or the PIM. For example, similar to that described elsewhere herein, polarizations of signals relating to radiating elements of an antenna system may be electronically adjusted, the electronically adjusting being performed for multiple frequency bands and facilitating mitigation of the interference or the PIM.

While for purposes of simplicity of explanation, the respective processes are shown and described as a series of blocks in FIG. 12D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In various embodiments, a polarization rotation system may include a radio frequency (RF) mechanical device, and a plurality of reciprocal ports for the RF mechanical device, the plurality of reciprocal ports including a first pair of reciprocal ports as inputs for the RF mechanical device, and a second pair of reciprocal ports as outputs for the RF mechanical device, the RF mechanical device being configured to perform polarization rotation of signals to enable avoidance of interference.

In some implementations of these embodiments, the polarization rotation is performed in an RF domain, the interference comprises passive intermodulation (PIM), and the signals comprise input signals and output signals of the RF mechanical device.

In some implementations of these embodiments, the first pair of reciprocal ports interfaces with crossed-dipole radiating elements of an antenna system, and the second pair of reciprocal ports interfaces with a remote radio unit (RRU) or a remote radio head (RRH).

In some implementations of these embodiments, the RF mechanical device is configured to perform the polarization rotation for transmit (Tx) signals, receive (Rx) signals, or both, and the polarization rotation mimics physical rotation of crossed-dipole radiating elements of an antenna system.

In some implementations of these embodiments, the polarization rotation further comprises an additional RF mechanical device, and a set of reciprocal ports for the additional RF mechanical device, the set of reciprocal ports including reciprocal ports as inputs for the additional RF mechanical device, and reciprocal ports as outputs for the additional RF mechanical device, the additional RF mechanical device being configured to perform polarization rotation of signals to enable avoidance of interference.

In some implementations of these embodiments, the polarization rotation system is implemented in an antenna system, in a radio, or in a standalone system that interfaces the antenna system and the radio.

In various embodiments, a method may include receiving, by a radio frequency (RF) mechanical device, signals relating to one or more crossed-dipole radiating elements of an antenna system, performing, by the RF mechanical device, polarization rotation of the signals to derive output signals having polarizations that are rotated in a manner that mimics physical rotation of the one or more crossed-dipole radiating elements, and providing, by the RF mechanical device, the output signals to enable avoidance of interference.

In some implementations of these embodiments, the polarization rotation is performed in an RF domain, and the interference comprises passive intermodulation (PIM).

In some implementations of these embodiments, the providing comprises providing the output signals to a remote radio unit (RRU) or a remote radio head (RRH).

In some implementations of these embodiments, the RF mechanical device is configured to perform the polarization rotation for transmit (Tx) signals, receive (Rx) signals, or both.

In some implementations of these embodiments, the RF mechanical device is implemented in the antenna system, in a radio, or in a standalone system that interfaces the antenna system and the radio.

In some implementations of these embodiments, each crossed-dipole radiating element of the one or more crossed-dipole radiating elements operates in multiple frequency bands.

In some implementations of these embodiments, the RF mechanical device has a symmetrical configuration.

In various embodiments, a communications system may include an antenna having multiple arrays of orthogonally-polarized radiating elements, and a device arranged to communicatively couple with one or more arrays of the multiple arrays of orthogonally-polarized radiating elements, the device being configured to perform polarization rotation of signals relating to the one or more arrays, the polarization rotation mimicking physical rotation of the one or more arrays and enabling mitigation of interference.

In some implementations of these embodiments, the polarization rotation is performed in a radio frequency (RF) domain, and the interference comprises passive intermodulation (PIM).

In some implementations of these embodiments, the device is configured to perform the polarization rotation for transmit (Tx) signals, receive (Rx) signals, or both, and the signals comprise input signals and output signals of the device.

In some implementations of these embodiments, the polarization rotation is integrated in the antenna.

In some implementations of these embodiments, the polarization rotation is integrated in a remote radio unit (RRU) or a remote radio head (RRH).

In some implementations of these embodiments, the polarization rotation is at least partially performed using a motor, a drive assembly, or a combination thereof.

In some implementations of these embodiments, the device comprises one or more waveguides, one or more cavities, or combinations thereof.

In various embodiments, an apparatus may include a pair of hybrid couplers, and a dual shifter, the dual shifter being mechanically adjustable to effect polarization rotation of signals relating to a dual-polarized pair of crossed-dipole elements, the polarization rotation mimicking physical rotation of the dual-polarized pair of crossed-dipole elements and enabling avoidance of interference.

In some implementations of these embodiments, the polarization rotation is performed in a radio frequency (RF) domain, and the interference comprises passive intermodulation (PIM).

In some implementations of these embodiments, the apparatus may further comprise a lower substrate having disposed thereon a first pair of transmission lines, and an upper substrate having disposed thereon a second pair of transmission lines, wherein the first and second pairs of transmission lines form at least a portion of the dual shifter.

In some implementations of these embodiments, the pair of hybrid couplers and the dual shifter are arranged in a symmetrical configuration.

In some implementations of these embodiments, the dual shifter comprises a double trombone shifter that is mechanically adjustable in a linear manner or a dual overlapping arch shifter that is mechanically adjustable in a rotational manner.

In some implementations of these embodiments, the apparatus may further comprise a motor and a drive assembly configured to mechanically adjust the dual shifter to effect the polarization rotation.

In various embodiments, a polarization rotator may include a lower substrate having disposed thereon first and second hybrid couplers, a first transmission line coupled to the first hybrid coupler, and a second transmission line coupled to the second hybrid coupler. The polarization rotator may further include an upper substrate adjacent to the lower substrate and having disposed thereon third and fourth transmission lines, the third transmission line at least partially overlapping the first and second transmission lines to form a first coupled line, the fourth transmission line at least partially overlapping the first and second transmission lines to form a second coupled line, the upper substrate being displaceable relative to the lower substrate to effect polarization rotation of orthogonal signals inputted to the first hybrid coupler, and to provide polarization rotated signals at outputs of the second hybrid coupler to facilitate avoidance of interference.

In some implementations of these embodiments, displacement of the upper substrate relative to the lower substrate provides a double simultaneous phase shifting effect that results in the polarization rotation.

In some implementations of these embodiments, arrangement of the first, second, third, and fourth transmission lines form a double trombone shifter.

In some implementations of these embodiments, either or both of the first hybrid coupler and the second hybrid coupler comprises a 180 degree hybrid coupler.

In some implementations of these embodiments, each of the first hybrid coupler and the second hybrid coupler comprises a 90 degree hybrid coupler.

In some implementations of these embodiments, the polarization rotator may further comprise a motor and a drive assembly coupled to the upper substrate.

In some implementations of these embodiments, the polarization rotator is implemented in an antenna, in a radio, or in a standalone device that interfaces the antenna and the radio, and the interference comprises passive intermodulation (PIM).

In various embodiments, a method may include receiving, by a double trombone shifter device, signals relating to one or more crossed-dipole radiating elements of an antenna system, performing, by the double trombone shifter device, polarization rotation of the signals to derive output signals having polarizations that are rotated in a manner that results in a virtual physical rotation of the one or more crossed-dipole radiating elements, and providing, by the double trombone shifter device, the output signals to enable avoidance of interference.

In some implementations of these embodiments, the double trombone shifter device has a symmetrical configuration.

In some implementations of these embodiments, the double trombone shifter device comprises a pair of 90 degree hybrid couplers.

In some implementations of these embodiments, the polarization rotation is performed in a radio frequency (RF) domain.

In some implementations of these embodiments, the performing the polarization rotation involves use of a motor and a drive assembly.

In some implementations of these embodiments, the providing the output signals comprises providing the output signals to a radio.

In some implementations of these embodiments, the double trombone shifter device is implemented in the antenna system, in a radio, or in a standalone device that interfaces the antenna system and the radio, and the interference comprises passive intermodulation (PIM).

In various embodiments, a method may include obtaining data regarding interference originating from one or more interference sources, and electronically rotating polarizations of signals relating to crossed-dipole radiating elements of an antenna system, the antenna system operating in multiple frequency bands, the electronically rotating being performed for a select number of frequency bands of the multiple frequency bands and facilitating mitigation of the interference.

In some implementations of these embodiments, the electronically rotating is performed for transmit (Tx) signals, receive (Rx) signals, or both.

In some implementations of these embodiments, the electronically rotating is performed in a same or a different manner for transmit (Tx) signals and receive (Rx) signals.

In some implementations of these embodiments, the electronically rotating for the select number of frequency bands is performed in a same or a different manner for signals in different bands of the multiple frequency bands.

In some implementations of these embodiments, the signals comprise constituent signals of downlink (DL) carriers, the method further comprising altering a mapping of the constituent signals to DL paths and ports of the antenna system, the altering the mapping and the electronically rotating being based on timing associated with the constituent signals, polarizations of the ports of the antenna system, polarization of a passive intermodulation (PIM) source, or a combination thereof.

In some implementations of these embodiments, the electronically rotating is performed in a remote radio unit (RRU), a remote radio head (RRH), a Common Public Radio Interface (CPRI) device, a baseband unit, or another device in a radio access network (RAN), and the interference comprises passive intermodulation (PIM).

In various embodiments, an apparatus may include a processing system associated with an antenna system and configured to perform operations, comprising receiving data regarding interference, and electronically manipulating, in a radio frequency (RF) domain, signals to rotate polarizations thereof to facilitate mitigation or avoidance of the interference, the signals relating to crossed-dipole radiating elements of the antenna system, the antenna system operating in multiple frequency bands, the electronically manipulating being performed for at least two frequency bands of the multiple frequency bands.

In some implementations of these embodiments, the electronically manipulating is performed for transmit (Tx) signals, receive (Rx) signals, or both.

In some implementations of these embodiments, the apparatus is implemented in a remote radio unit (RRU), a remote radio head (RRH), or a baseband unit.

In some implementations of these embodiments, the apparatus is implemented in a Common Public Radio Interface (CPRI) device.

In some implementations of these embodiments, the electronically manipulating is performed without requiring any physical rotation of the crossed-dipole radiating elements or a housing of the antenna system.

In some implementations of these embodiments, the signals include orthogonal RF signals, and the electronically manipulating involves projection of the orthogonal RF signals in a different set of axes.

In some implementations of these embodiments, the interference comprises passive intermodulation (PIM), and the electronically manipulating for the at least two frequency bands is performed in a same or a different manner.

In various embodiments, a device may include a processing system configured to detect interference originating from one or more interference sources, and perform virtual rotation of crossed-dipole radiating elements of an antenna system by rotating, in a radio frequency (RF) domain, polarizations of signals relating to the crossed-dipole radiating elements, the antenna system operating in multiple frequency bands, the rotating the polarizations being performed for a select number of frequency bands of the multiple frequency bands and facilitating mitigation of the interference.

In some implementations of these embodiments, the signals include orthogonal RF signals, and the rotating the polarizations involves projection of the orthogonal RF signals in a different set of axes.

In some implementations of these embodiments, the rotating the polarizations is performed for transmit (Tx) signals, receive (Rx) signals, or both.

In some implementations of these embodiments, the rotating the polarizations is performed without requiring any movement of the crossed-dipole radiating elements or a housing of the antenna system.

In some implementations of these embodiments, the device is implemented in a remote radio unit (RRU), a remote radio head (RRH), or a baseband unit.

In some implementations of these embodiments, the device is implemented in a Common Public Radio Interface (CPRI) system.

In some implementations of these embodiments, the rotating the polarizations for the select number of frequency bands is performed in a same or a different manner for signals in different bands of the multiple frequency bands, and the interference comprises passive intermodulation (PIM).

Figure 13:
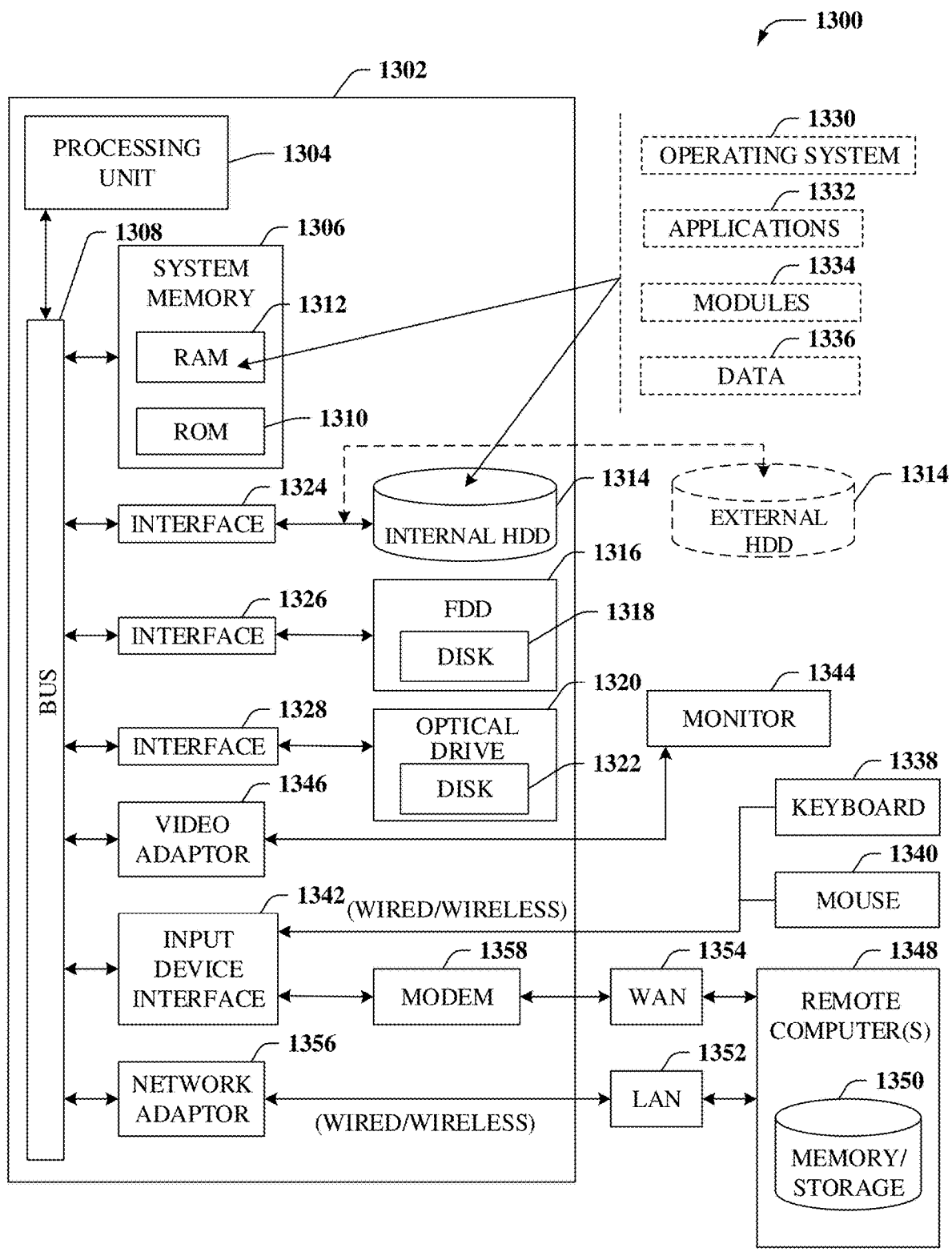
FIG. 13 is a block diagram of an example, non-limiting embodiment of a computing environment in accordance with various aspects described herein.

Turning now to FIG. 13, there is illustrated a block diagram of a computing environment in accordance with various aspects described herein. In order to provide additional context for various embodiments of the embodiments described herein, FIG. 13 and the following discussion are intended to provide a brief, general description of a suitable computing environment 1300 in which the various embodiments of the subject disclosure can be implemented. In particular, computing environment 1300 can be used in the implementation of network elements 150, 152, 154, 156, access terminal 112, base station or access point 122, switching device 132, media terminal 142, one or more (or a combination) of the control and monitoring/detection units described above with respect to FIGS. 3A-3C, component(s) of one or more of the systems of FIGS. 11B-11D and 11F, etc. Each of these devices can be implemented via computer-executable instructions that can run on one or more computers, and/or in combination with other program modules and/or as a combination of hardware and software. For example, computing environment 1300 can facilitate, in whole or in part, detection of interference/PIM in a communications system and performing of action(s) relating to polarization shifting to enable mitigation or avoidance of the interference/PIM.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 13, the example environment can comprise a computer 1302, the computer 1302 comprising a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also comprise a high-speed RAM such as static RAM for caching data.

The computer 1302 further comprises an internal hard disk drive (HDD) 1314 (e.g., EIDE, SATA), which internal HDD 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The HDD 1314, magnetic FDD 1316 and optical disk drive 1320 can be connected to the system bus 1308 by a hard disk drive interface 1324, a magnetic disk drive interface 1326 and an optical drive interface 1328, respectively. The hard disk drive interface 1324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can comprise a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. It will also be appreciated that in alternative embodiments, a monitor 1344 can also be any display device (e.g., another computer having a display, a smart phone, a tablet computer, etc.) for receiving display information associated with computer 1302 via any communication means, including via the Internet and cloud-based networks. In addition to the monitor 1344, a computer typically comprises other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically comprises many or all of the elements described relative to the computer 1302, although, for purposes of brevity, only a remote memory/storage device 1350 is illustrated. The logical connections depicted comprise wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the LAN 1352 through a wired and/or wireless communications network interface or adapter 1356. The adapter 1356 can facilitate wired or wireless communication to the LAN 1352, which can also comprise a wireless AP disposed thereon for communicating with the adapter 1356.

When used in a WAN networking environment, the computer 1302 can comprise a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, which may be used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. One or more embodiments can employ various AI-based schemes for carrying out various embodiments thereof. Moreover, a classifier can be employed. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches comprise, e.g., naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The foregoing embodiments can be combined in whole or in part with the embodiments described in any of U.S. Patent Publication No. 2022/0069855 (published on Mar. 3, 2022) and co-pending U.S. patent application Ser. No. 17/709,724 (filed on Mar. 31, 2022). For instance, embodiments of one or more of the aforementioned U.S. publication and application can be combined in whole or in part with embodiments of the subject disclosure. For example, one or more features and/or embodiments described in one or more of the aforementioned U.S. publication and application can be used in conjunction with (or as a substitute for) one or more features and/or embodiments described herein, and vice versa. Accordingly, all sections of the aforementioned U.S. publication and application are incorporated herein by reference in their entirety.

What is claimed is:

1. A polarization rotation system, comprising:
    a radio frequency (RF) mechanical device; and
    a plurality of reciprocal ports for the RF mechanical device, the plurality of reciprocal ports including a first pair of reciprocal ports as inputs for the RF mechanical device, and a second pair of reciprocal ports as outputs for the RF mechanical device, the RF mechanical device being configured to perform polarization rotation of signals to enable avoidance of interference.

2. The polarization rotation system of claim 1, wherein the polarization rotation is performed in an RF domain, wherein the interference comprises passive intermodulation (PIM), and wherein the signals comprise input signals and output signals of the RF mechanical device.

3. The polarization rotation system of claim 1, wherein the first pair of reciprocal ports interfaces with crossed-dipole radiating elements of an antenna system, and wherein the second pair of reciprocal ports interfaces with a remote radio unit (RRU) or a remote radio head (RRH).

4. The polarization rotation system of claim 1, wherein the RF mechanical device is configured to perform the polarization rotation for transmit (Tx) signals, receive (Rx) signals, or both, and wherein the polarization rotation mimics physical rotation of crossed-dipole radiating elements of an antenna system.

5. The polarization rotation system of claim 1, further comprising:
    an additional RF mechanical device; and
    a set of reciprocal ports for the additional RF mechanical device, the set of reciprocal ports including reciprocal ports as inputs for the additional RF mechanical device, and reciprocal ports as outputs for the additional RF mechanical device, the additional RF mechanical device being configured to perform polarization rotation of signals to enable avoidance of interference.

6. The polarization rotation system of claim 1, wherein the polarization rotation system is implemented in an antenna system, in a radio, or in a standalone system that interfaces the antenna system and the radio.

7. A method, comprising:
    receiving, by a radio frequency (RF) mechanical device, signals relating to one or more crossed-dipole radiating elements of an antenna system;
    performing, by the RF mechanical device, polarization rotation of the signals to derive output signals having polarizations that are rotated in a manner that mimics physical rotation of the one or more crossed-dipole radiating elements; and
    providing, by the RF mechanical device, the output signals to enable avoidance of interference.

8. The method of claim 7, wherein the polarization rotation is performed in an RF domain, and wherein the interference comprises passive intermodulation (PIM).

9. The method of claim 7, wherein the providing comprises providing the output signals to a remote radio unit (RRU) or a remote radio head (RRH).

10. The method of claim 7, wherein the RF mechanical device is configured to perform the polarization rotation for transmit (Tx) signals, receive (Rx) signals, or both.

11. The method of claim 7, wherein the RF mechanical device is implemented in the antenna system, in a radio, or in a standalone system that interfaces the antenna system and the radio.

12. The method of claim 7, wherein each crossed-dipole radiating element of the one or more crossed-dipole radiating elements operates in multiple frequency bands.

13. The method of claim 7, wherein the RF mechanical device has a symmetrical configuration.

14. A communications system, comprising:
- an antenna having multiple arrays of orthogonally-polarized radiating elements; and
- a device arranged to communicatively couple with one or more arrays of the multiple arrays of orthogonally-polarized radiating elements, the device being configured to perform polarization rotation of signals relating to the one or more arrays, the polarization rotation mimicking physical rotation of the one or more arrays and enabling mitigation of interference.

15. The communications system of claim 14, wherein the polarization rotation is performed in a radio frequency (RF) domain, and wherein the interference comprises passive intermodulation (PIM).

16. The communications system of claim 14, wherein the device is configured to perform the polarization rotation for transmit (Tx) signals, receive (Rx) signals, or both, and wherein the signals comprise input signals and output signals of the device.

17. The communications system of claim 14, wherein the polarization rotation is integrated in the antenna.

18. The communications system of claim 14, wherein the polarization rotation is integrated in a remote radio unit (RRU) or a remote radio head (RRH).

19. The communications system of claim 14, wherein the polarization rotation is at least partially performed using a motor, a drive assembly, or a combination thereof.

20. The communications system of claim 14, wherein the device comprises one or more waveguides, one or more cavities, or combinations thereof.

* * * * *